United States Patent
Chang

(10) Patent No.: US 9,826,034 B2
(45) Date of Patent: *Nov. 21, 2017

(54) AUTOMATED COLLABORATION FOR PEER-TO-PEER ELECTRONIC DEVICES

(71) Applicant: Maximilian A. Chang, Saratoga, CA (US)

(72) Inventor: Maximilian A. Chang, Saratoga, CA (US)

( * ) Notice: Subject to any disclaimer, the term of this patent is extended or adjusted under 35 U.S.C. 154(b) by 498 days.

This patent is subject to a terminal disclaimer.

(21) Appl. No.: 14/331,155

(22) Filed: Jul. 14, 2014

(65) Prior Publication Data

US 2015/0207873 A1 Jul. 23, 2015

Related U.S. Application Data

(63) Continuation of application No. 14/158,349, filed on Jan. 17, 2014, now Pat. No. 8,782,122.

(51) Int. Cl.
*G06F 15/16* (2006.01)
*H04L 29/08* (2006.01)

(52) U.S. Cl.
CPC ................. *H04L 67/1048* (2013.01)

(58) Field of Classification Search
CPC ... G06F 3/14; H04L 12/2803; H04L 12/2805; H04L 12/2807; H04L 12/2809; H04L 12/2812; H04L 12/2814; H04L 12/2827; H04L 2012/2847; H04L 2012/2849; H04L 65/00; H04L 67/104; H04L 67/1048; H04L 67/1061; H04L 67/1063; H04L 67/1065; H04L 67/1068; H04L 67/125; H04L 67/16; H04L 67/306; H04N 21/25891;
(Continued)

(56) References Cited

U.S. PATENT DOCUMENTS 6,349,352 B1  2/2002  Lea
6,874,127 B2 * 3/2005 Newell ................ G06F 1/163
706/14

(Continued)

OTHER PUBLICATIONS

Kwon et al. "Device Collaboration System Based on Context-Aware Architecture in Smart Environment." FutureTech 2011, Part II, CCIS 185, pp. 256-263, 2011.*

*Primary Examiner* — Christopher Biagini
(74) *Attorney, Agent, or Firm* — Fish & Richardson P.C.

(57) ABSTRACT

Automated collaboration for peer-to-peer electronic devices, in which a user profile is registered for a peer-to-peer network. The user profile defines rules for automated collaboration among electronic devices connected to the peer-to-peer network. An electronic device connected to the peer-to-peer network discovers a new electronic device joining the peer-to-peer network. The electronic device sends, to the new electronic device, the user profile and automatically, without user input at the electronic device or the new electronic device, negotiates with the new electronic device to determine how the electronic device and the new electronic device will collaboratively work together to meet the rules specified in the user profile. Based on the negotiation, the electronic device collaborates with the new electronic device in a manner that results in the new electronic device handling at least a portion of an event at the new electronic device.

20 Claims, 28 Drawing Sheets

(58) Field of Classification Search
CPC ......... H04N 21/4126; H04N 21/43615; H04N 21/47202; H04N 21/482; H04N 7/152
See application file for complete search history.

(56) References Cited

U.S. PATENT DOCUMENTS

| | | | |
|---|---|---|---|
| 7,016,888 B2 * | 3/2006 | Slemmer | G05B 13/028 |
| | | | 706/47 |
| 7,284,046 B1 * | 10/2007 | Kreiner | H04L 67/303 |
| | | | 455/414.1 |
| 7,577,750 B2 | 8/2009 | Shen | |
| 7,647,394 B2 | 1/2010 | Rao | |
| 7,792,915 B2 | 9/2010 | Berkey | |
| 7,814,207 B2 | 10/2010 | White | |
| 7,899,915 B2 * | 3/2011 | Reisman | G06F 17/30873 |
| | | | 709/227 |
| 8,190,275 B2 | 5/2012 | Chang | |
| 8,577,988 B2 | 11/2013 | Choi | |
| 2006/0026302 A1 * | 2/2006 | Bennett | H04L 29/06027 |
| | | | 709/246 |
| 2006/0149850 A1 * | 7/2006 | Bowman | G11B 27/10 |
| | | | 709/231 |
| 2008/0141303 A1 * | 6/2008 | Walker | H04N 21/4334 |
| | | | 725/39 |
| 2008/0235731 A1 * | 9/2008 | Bryant | H04N 5/44543 |
| | | | 725/44 |
| 2013/0021535 A1 | 1/2013 | Kim | |
| 2013/0024197 A1 | 1/2013 | Jang | |
| 2013/0024882 A1 | 1/2013 | Lee | |
| 2013/0027289 A1 | 1/2013 | Choi | |
| 2013/0027617 A1 | 1/2013 | Choi | |
| 2013/0072251 A1 | 3/2013 | Kim | |
| 2013/0073293 A1 | 3/2013 | Jang | |

* cited by examiner

| | |
|---|---|
| User Name/Identifier | John |
| User Profile Priority | 1 |
| Guest Profile Allowed | Yes |
| Music Preference | Classic, Light Rock, Jazz |
| Mood Preference | Happy |
| Use Seasonal Theme | Yes (enables themes for Christmas, Thanksgiving, Valentine, Halloween, etc.) |
| Preferred Video Display Device | TV #1 in Living Room |
| Preferred Audio Device | Stereo #1 in Living Room |
| Preferred Video Recording Device | DVR #1 in Living Room |
| Preferred Photo or Slideshow Display Device | 1$^{st}$ Priority: Digital Frame #2 in Master Bedroom<br>2$^{nd}$ Priority: TV #1 |
| Preferred Video Viewing Preference | 1$^{st}$ Priority: Camcorder<br>2$^{nd}$ Priority: TV #1 |
| Video Preemption | TV program to be recorded in DVR if preempted. Recorded program to play on TV when TV becomes available. |
| Photo or Slideshow Viewing Source Preference | 1$^{st}$ Priority: Digital Camera #1<br>2$^{nd}$ Priority: Digital Camera #2 |
| Music Source Preference | 1$^{st}$ Priority: PC Server #1<br>2$^{nd}$ Priority: MP3 Player #1 |
| Smartphone Preference | 1$^{st}$ Priority: Smartphone #1<br>2$^{nd}$ Priority: Smartphone #2 |
| Social Network Viewing Preference | 1$^{st}$ Priority: Facebook<br>2$^{nd}$ Priority: Twitter |
| Facebook Media Playback Preference | Photos and Videos playback in reverse chronological order |
| Social Network Feed Viewing Preference | 1$^{st}$ Priority: HDMI dongle to TV<br>2$^{nd}$ Priority: Digital Frame #2 |
| Wake Up Service Preference | - Follow alarm setting in Smartphone #1 Monday through Friday<br>- Upon wake up, play Facebook photos/videos on TV #1<br>- Then display today's calendar on TV #1<br>- Then display any relevant power point associated with today's calendar events on TV #1 |
| TV Viewing Time Preference | No TV #1 between 11 pm and 6 am Sunday through Thursday |

| User Name/Identifier | John Jr. |
|---|---|
| User Profile Priority | 2 |
| Guest Profile Allowed | Yes |
| Smartphone Preference | Smartphone #3 |
| Photo or Video Viewing Source Preference | Smartphone #3 |
| Preferred Photo or Video Display Device | Tablet #3 |

| Media Class | Mandatory Formats | Optional Formats |
|---|---|---|
| Image | JPEG | PNG, GIF, TIFF |
| Audio | LPCM | AC3, AAC, MP3, WMA9, ATRAC3plus |
| Video | MPEG2 | MPEG1, MPEG4, VC1, MPV1 |

```
DISCOVER A NEW DEVICE THAT HAS A USER PROFILE ASSOCIATED
WITH A NETWORK OTHER THAN THE PEER-TO-PEER NETWORK
1202
```

↓

```
QUERY WHETHER THE NEW DEVICE WOULD LIKE TO ACCEPT THE
REGISTERED PROFILE FOR THE PEER-TO-PEER NETWORK OR
NEGOTIATE A TEMPORARY GUEST PROFILE      1204
```

↓

```
BASED ON A REQUEST TO NEGOTIATE A TEMPORARY GUEST
PROFILE, ACCESS THE USER PROFILE OF THE NEW DEVICE
1206
```

↓

```
ANALYZE THE USER PROFILE OF THE NEW DEVICE AND THE
REGISTERED PROFILE WITH RESPECT TO GUEST PROFILE RULES
DEFINED IN THE REGISTERED PROFILE      1208
```

↓

```
BASED ON THE ANALYSIS, DEFINE A TEMPORARY GUEST PROFILE
FOR THE PEER-TO-PEER NETWORK
1210
```

↓

```
REGISTER THE TEMPORARY GUEST PROFILE FOR THE PEER-TO-
PEER NETWORK
1212
```

↓

```
DETECT THE NEW DEVICE LEAVING
THE PEER-TO-PEER NETWORK
1214
```

↓

```
BASED ON DETECTION THAT NEW DEVICE HAS LEFT, REMOVE THE
TEMPORARY GUEST PROFILE AND REVERT TO THE PREVIOUSLY-
REGISTERED PROFILE                 1216
```

```
┌─────────────────────────────────────────────────────────────┐
│ DETERMINE A LOCATION OF A USER WITHIN A PROPERTY IN WHICH   │
│      THE PEER-TO-PEER NETWORK IS LOCATED                    │
│                                                        1702 │
└─────────────────────────────────────────────────────────────┘
                              │
                              ▼
┌─────────────────────────────────────────────────────────────┐
│  DETERMINE HOW TO HANDLE A TASK BASED ON THE USER           │
│      PROFILE AND THE DETERMINED LOCATION                    │
│                                                        1704 │
└─────────────────────────────────────────────────────────────┘
                              │
                              ▼
┌─────────────────────────────────────────────────────────────┐
│        HANDLE THE TASK BASED ON THE DETERMINATION           │
│                                                        1706 │
└─────────────────────────────────────────────────────────────┘
```

FIG. 17

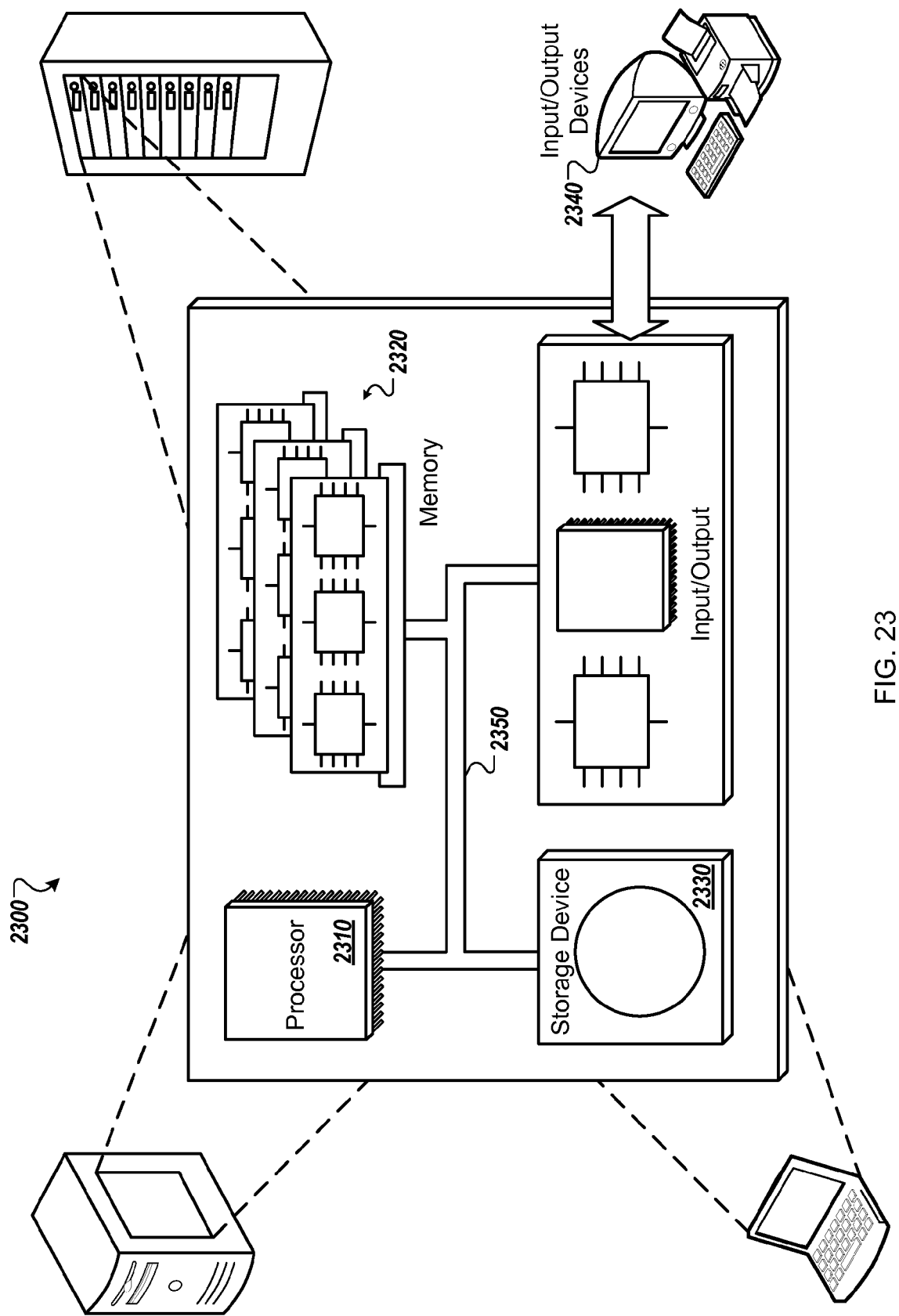

AUTOMATED COLLABORATION FOR PEER-TO-PEER ELECTRONIC DEVICES

RELATED APPLICATIONS

This application is a continuation and claims priority under 35 U.S.C. §120 to U.S. patent application Ser. No. 14/158,349, filed Jan. 17, 2014, the entire content of which is hereby incorporated by reference.

FIELD

The present disclosure generally relates to automated collaboration for peer-to-peer electronic devices.

BACKGROUND

Consumer electronic devices are manufactured to manage the storage, transport, and consumption of digital media, including music, video, photos, etc. Consumer electronic devices also are equipped with Internet connectivity, via either a wired connection or a wireless connection. Devices from different manufacturers have varying features and inter-connectivity capabilities. In the home entertainment arena, these devices include televisions (TVs), stereo systems, digital frames, camcorders, digital cameras, remote controls, smartphones, and tablet devices, just to name a few. Devices from different manufacturers may not work together or it may be challenging to set up suitable device configurations in order to achieve interoperability.

SUMMARY

Techniques are described for automated collaboration between peer-to-peer electronic devices.

In one aspect, an electronic device includes a communication module configured to enable the electronic device to communicate with other electronic devices over a peer-to-peer network, an output unit configured to provide output for media operations handled by the electronic device, and at least one processor configured to execute software or firmware that is embedded in the electronic device and that provides peer-to-peer intelligence for performing automated collaboration among electronic devices connected to the peer-to-peer network. The at least one processor is configured to execute the software or firmware and perform the peer-to-peer intelligence by establishing, using the communication module, a connection to the peer-to-peer network and determining whether a user profile that defines rules for automated collaboration among electronic devices connected to the peer-to-peer network exists for the peer-to-peer network. Based on a determination that a user profile does not exist for the peer-to-peer network, the at least one processor prompts, using the output unit, for user input that defines a user profile that defines rules for automated collaboration among electronic devices connected to the peer-to-peer network and, based on the prompting, receives user input that specifies rules for automated collaboration among electronic devices connected to the peer-to-peer network. The at least one processor defines a user profile for the peer-to-peer network based on the user input that specifies rules for automated collaboration among electronic devices connected to the peer-to-peer network and registers, for the peer-to-peer network, the user profile as the user profile that defines rules for automated collaboration among electronic devices connected to the peer-to-peer network. The at least one processor also detects a first event that results in performance of a particular type of action using one or more electronic devices connected to the peer-to-peer network and, based on the user profile, handles the first event at the electronic device by causing performance of the particular type of action at the electronic device. The at least one processor further discovers a new electronic device joining the peer-to-peer network. The new electronic device is different than and separate from the electronic device. Based on discovering the new electronic device joining the peer-to-peer network, the at least one processor sends, to the new electronic device and over the peer-to-peer network using the communication module, the user profile registered for the peer-to-peer network and automatically, without user input at the electronic device or the new electronic device, negotiates with the new electronic device to determine how the electronic device and the new electronic device will collaboratively work together to meet the rules specified in the user profile registered for the peer-to-peer network. In addition, the at least one processor detects a second event that results in performance of the particular type of action using one or more electronic devices connected to the peer-to-peer network. The second event is different from and occurs after the first event. Based on the negotiation with the new electronic device, the at least one processor collaborates with the new electronic device in a manner that results in the new electronic device handling at least a portion of the second event at the new electronic device by performing at least part of the particular type of action at the new electronic device. In another aspect, a method may include one or more of the operations described as being performed by the at least one processor. In yet another aspect, a computer-readable storage medium may be operable to cause a processor to perform one or more of the operations described as being performed by the at least one processor.

Implementations may include one or more of the following features. For instance, the at least one processor may collaborate with the new electronic device in a manner that results in the new electronic device handling all of the second event at the new electronic device by performing the particular type of action at the new electronic device.

In some implementations, the at least one processor may collaborate with the new electronic device in a manner that results in the new electronic device handling a first portion of the second event at the new electronic device by performing a first part of the particular type of action at the new electronic device and handle a second portion of the second event at the electronic device by causing performance of a second part of the particular type of action at the electronic device. In these implementations, the at least one processor may handle the first event at the electronic device by displaying image content associated with the particular type of action at the electronic device and outputting audio content associated with the particular type of action at the electronic device. Further, in these implementations, the at least one processor may collaborate with the new electronic device in a manner that results in the new electronic device handling the first portion of the second event at the new electronic device by outputting audio content associated with the particular type of action at the new electronic device and handle the second portion of the second event at the electronic device by displaying image content associated with the particular type of action at the electronic device.

In addition, the at least one processor may detect, as the first event, a first user input command to output content using one or more devices connected to the peer-to-peer network and detect, as the second event, a second user input command to output content using one or more devices connected to the peer-to-peer network. The at least one processor may detect, as the first event, that a particular device has joined the peer-to-peer network and detect, as the second event, that the particular device has rejoined the peer-to-peer network subsequent to being removed from the peer-to-peer network after the handling of the first event at the electronic device. The at least one processor also may detect, as the first event, a first instance of a timing event tracked by one or more devices connected to the peer-to-peer network and detect, as the second event, a second instance of the timing event tracked by one or more devices connected to the peer-to-peer network. The second instance of the timing event may occur after the first instance of the timing event. The at least one processor further may detect, as the first event, receipt of a first communication of a particular type by one or more devices connected to the peer-to-peer network and detect, as the second event, receipt of a second communication of the particular type by one or more devices connected to the peer-to-peer network. The second communication may be different than the first communication and may be received subsequent to receipt of the first communication.

In some examples, the at least one processor may receive, from the new electronic device using the communication module, an indication of a change to the user profile registered for the peer-to-peer network that was made based on user input provided to the new electronic device and update, at the electronic device, the user profile registered for the peer-to-peer network based on the indication of the change received from the new electronic device. In these examples, the at least one processor may automatically, without user input at any of the electronic devices connected to the peer-to-peer network, negotiate with the electronic devices connected to the peer-to-peer network to determine how the electronic devices connected to the peer-to-peer network will collaboratively work together to meet the rules specified in the updated user profile registered for the peer-to-peer network.

In some implementations, the at least one processor may update, at the electronic device, the user profile registered for the peer-to-peer network in a manner that results in a change to how the particular type of action is handled by the peer-to-peer network and detect a third event that results in performance of the particular type of action using one or more devices connected to the peer-to-peer network. The third event may be different from and may occur after the first event and the second event. In these implementations, based on the negotiation with the electronic devices connected to the peer-to-peer network to determine how the electronic devices connected to the peer-to-peer network will collaboratively work together to meet the rules specified in the updated user profile registered for the peer-to-peer network, the at least one processor may collaborate with the new electronic device and a third electronic device in a manner that results in the new electronic device and the third electronic device collaboratively handling the second event at the new electronic device and the third electronic device by perform a first part of the particular type of action at the new electronic device and performing a second part of the particular type of action at the third electronic device.

In some examples, the at least one processor may update, at the electronic device, the user profile registered for the peer-to-peer network in a manner that results in a change to how the particular type of action is handled by the peer-to-peer network and the at least one processor may detect a third event that results in performance of the particular type of action using one or more devices connected to the peer-to-peer network. The third event may be different from and may occur after the first event and the second event. In these examples, based on the negotiation with the electronic devices connected to the peer-to-peer network to determine how the electronic devices connected to the peer-to-peer network will collaboratively work together to meet the rules specified in the updated user profile registered for the peer-to-peer network, the at least one processor may handle the third event at the electronic device by causing performance of the particular type of action at the electronic device.

In some implementations, the at least one processor may define a user profile for the peer-to-peer network that includes rules for automated collaboration that are controlled by capabilities of electronic devices connected to the peer-to-peer network. In these implementations, the at least one processor may exchange, with the new electronic device, capabilities of the electronic device and the new electronic device, evaluate the exchanged capabilities against the rules for automated collaboration that are controlled by capabilities of electronic devices connected to the peer-to-peer network, and determine how the electronic device and the new electronic device will collaboratively work together based on the evaluation of the exchanged capabilities against the rules for automated collaboration that are controlled by capabilities of electronic devices connected to the peer-to-peer network.

In some examples, the at least one processor may detect a conflict between the new electronic device and the electronic device each requesting handling of the particular type of action and resolve the detected conflict in a manner specified in the peer-to-peer intelligence for resolving conflicts. In these examples, the at least one processor may receive, from electronic devices connected to the peer-to-peer network other than the electronic device and the new electronic device, votes for how to resolve the detected conflict between the electronic device and the new electronic device and resolve the detected conflict based on the votes received from electronic devices connected to the peer-to-peer network other than the electronic device and the new electronic device.

In some implementations, the at least one processor may detect a conflict between the new electronic device and the electronic device each requesting handling of the particular type of action and resolve the detected conflict in a manner specified in the peer-to-peer intelligence for resolving conflicts. In these implementations, the at least one processor may access a first priority associated with the electronic device and a second priority associated with the new electronic device, compare the first priority with the second priority, and resolve the detected conflict based on the comparison of the first priority with the second priority.

In some examples, the at least one processor may detect multiple user profiles on electronic devices connected to the peer-to-peer network and analyze rules specified in the multiple user profiles for conflicts in how electronic devices connected to the peer-to-peer network should collaboratively work together to meet the rules specified in the multiple user profiles. Based on the analysis, the at least one processor may identify a conflict in how electronic devices connected to the peer-to-peer network should collaboratively work together to meet the rules specified in the multiple user profiles. In these examples, the at least one processor may negotiate with electronic devices connected to the peer-to-peer network to determine how to handle the identified conflict and handle a task performed by one or more electronic devices in the peer-to-peer network based on the negotiation on how to handle the identified conflict.

In some implementations, the at least one processor may discover a third electronic device joining the peer-to-peer network. The third electronic device may be different from the electronic device and the new electronic device and the third electronic device may have a different user profile associated with a network other than the peer-to-peer network. In these implementations, the at least one processor may query whether the third electronic device would like to accept the registered user profile for the peer-to-peer network or negotiate a temporary guest profile. Based on a request to negotiate a temporary guest profile, the at least one processor may access information from the different user profile of the third electronic device and analyze the accessed information from the different user profile of the third electronic device and the registered user profile for the peer-to-peer network with respect to guest profile rules defined in the registered user profile for the peer-to-peer network. Based on the analysis of the accessed information from the different user profile and the registered user profile with respect to the guest profile rules, the at least one processor may define a temporary guest profile for the peer-to-peer network and register, for the peer-to-peer network, the temporary guest profile. In these implementations, the at least one processor may detect the third electronic device leaving the peer-to-peer network and, based on the detection of the third electronic device leaving the peer-to-peer network, removing the temporary guest profile and reverting to the previously-registered user profile for the peer-to-peer network.

In addition, the at least one processor may monitor, over time, use of electronic devices connected to the peer-to-peer network and analyze preferences of one or more users of the peer-to-peer network, a current date and time, capabilities of electronic devices in the peer-to-peer network, and the monitored use of the electronic devices connected to the peer-to-peer network. Based on the analysis of the preferences of one or more users of the peer-to-peer network, the current date and time, the capabilities of electronic devices in the peer-to-peer network, and the monitored use of the electronic devices connected to the peer-to-peer network, the at least one processor may determine a user-specific experience for a user of the peer-to-peer network and perform an action based on the determined user-specific experience for the user of the peer-to-peer network.

Further, the at least one processor may determine a location of a user within a property in which the peer-to-peer network is located and determine how to handle a task based on the registered user profile for the peer-to-peer network and the determined location of the user within the property. The at least one processor may handle the task based on the determination of how to handle the task.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

FIGS. 1 and 23 are diagrams of exemplary systems.
FIGS. 2, 6, 10, 12, 14, 17, 19, and 21 are flowcharts of exemplary processes.
FIGS. 3A and 3B illustrate exemplary user profiles.
FIG. 4 illustrates a table of exemplary media classes and corresponding media formats.

Like reference numbers represent corresponding parts throughout.

DETAILED DESCRIPTION

Techniques are described for employing an intelligent application layer embedded in consumer electronic devices, which jointly operate over a peer-to-peer network to automatically deliver a user specific media creation and sharing experience through real-time peer-to-peer negotiation and collaboration among the devices. In some examples, a user specifies and updates desired media creation and sharing preferences through a peer-to-peer network accessible and personalized user profile, which can be accessed by the consumer electronic devices at any time.

Figure 1:
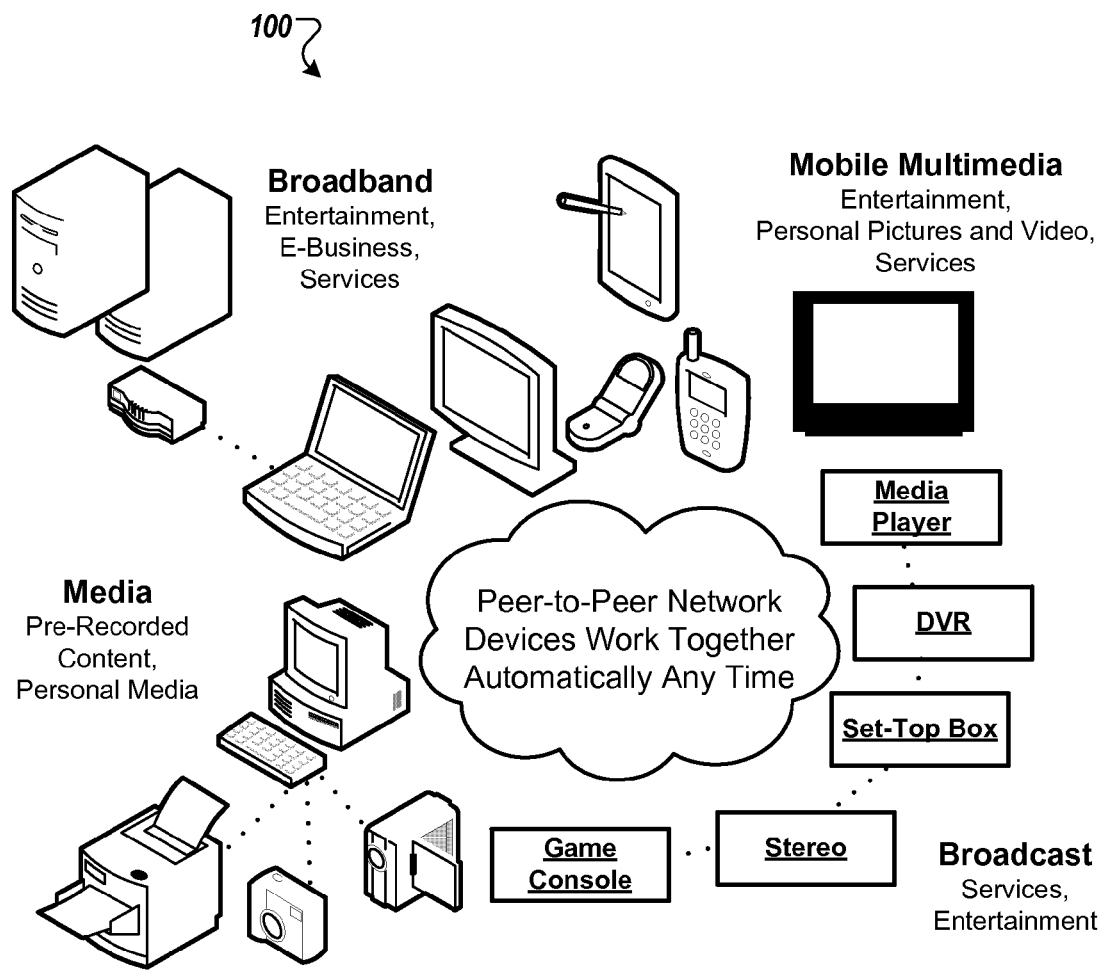

FIG. 1 illustrates an example system 100 of electronic devices that are connected in a peer-to-peer network. In some implementations, the system 100 provides peer-to-peer home entertainment automation. Specifically, the system 100 provides universal media interoperability between consumer electronic devices and enables consumer electronic devices to act as intelligent peers in a peer-to-peer network to automatically negotiate and collaborate with one another in order to achieve a specific objective. By providing application level peer-to-peer intelligence, which can be embedded in consumer electronic devices for use in handling digital content in a home or business environment, these devices are equipped to negotiate with one another to determine an optimal way to automatically deliver user desired media functionality, such as media creation or sharing requested by the user via a user profile that is defined by the user and that is registered with devices connected to the peer-to-peer network.

The intelligence required for each peer device may be implemented in software or firmware and embedded in each individual electronic device. The techniques described may be independent of any lower level layer networking and communication protocols. In some examples, the Universal Plug and Play (UPnP) architecture and Digital Living Network Alliance (DLNA) architecture are used as the underlying peer-to-peer communication platform. Under the UPnP and DLNA architecture, the electronic devices utilize Transmission Control Protocol (TCP)/Internet Protocol (IP) as the network layer and use Dynamic Host Configuration Protocol (DHCP) or Auto-IP for device addressing. Each device may incorporate the capability of a UPnP device, as well as a UPnP Control Point for flexibility. Device discovery on a peer-to-peer network may be accomplished using Simple Service Discovery Protocol (SSDP) and device and service descriptions are communicated in Extensible Markup Language (XML) format using Hypertext Transfer Protocol (HTTP). Peer communications between devices including commands to execute a function at another peer device may take place using Simple Object Access Protocol (SOAP) and HTTP. Event messaging between peers may take place using General Event Notification Architecture (GENA). The electronic device may use any suitable media format, including any one of the media formats specified by DLNA, such as Joint Photographic Experts Group (JPEG), Linear Pulse-Code Modulation (LPCM), or Moving Picture Experts Group (MPEG) 2, or any other suitable formats.

Under the UPnP architecture, devices are designed to support zero-configuration, invisible networking, and automatic discovery. A device may dynamically join a network, obtain an IP address, convey its capabilities, and learn about the presence and capabilities of other devices on the peer-to-peer network. A device may leave a UPnP network smoothly and automatically without leaving any unwanted states behind. UPnP networking is media independent and UPnP devices may be implemented using any programming language and on any operating system.

UPnP distinguishes between two types of hardware: a control point and a device. A control point is responsible for communicating with all the devices it controls and devices generally communicate with other devices via control points. In some implementations, each device in the system 100 operates as a UPnP control point and device, which empowers each device with full peer-to-peer communication capabilities.

The foundation of UPnP networking is IP addressing. Each device has a DHCP client and searches for a DHCP server when the device is first connected to the network. If a DHCP server is available, the network is managed and the device uses the IP address assigned to it by the DHCP server. If no DHCP server is available, which is generally the case for the peer-to-peer networks described throughout this disclosure, the device uses Auto IP to get an IP address. Auto IP defines a process of how a device intelligently chooses an IP address from a set of reserved addresses.

Given an IP address, the device continues UPnP networking by performing discovery. When a device is added to the network, the UPnP protocol allows that device to advertise its services to other devices on the network. Simultaneously, the newly added device, acting also as a control point, uses the UPnP protocol to search for devices of interest on the same network. The exchange in both cases is a discovery message containing specifics about the device or one of its services, e.g., its type, identifier, and a URL pointer to more detailed information.

The device continues UPnP networking by performing description. After a device is added to a network and discovered by others, descriptions about the device, other nested devices within the device, and services associated with the device are made known to other devices. The UPnP description for a device is expressed in XML and includes manufacturer specific information, such as the model name and number, serial number, manufacturer name, and URLs to manufacturer specific web sites. The XML description also includes a list of any embedded devices or services, as well as URLs for control, eventing, and presentation. For each service, the description includes a list of the commands, or actions, to which the service responds, and parameters, or arguments for each action. The description for a service also includes a list of variables which model the state of the service at run time, and are described in terms of their data type, range, and event characteristics.

The device continues UPnP networking by performing control. Each device, acting as both a UPnP device and control point, may send actions to another device's services. To accomplish this, a device sends a suitable control message to the control URL for the service (provided in the device description) of another device. Control messages are expressed in XML using SOAP. Like function calls, in response to the control message, the service of the called device returns action-specific values. The effects of the action, if any, are modeled by changes in the variables that describe the run-time state of the service.

The device continues UPnP networking by performing eventing. A UPnP description for a service includes a list of actions the service responds to and a list of variables that model the state of the service at run time. The service publishes updates when these variables change, and a device may subscribe to receive this information. The service publishes updates by sending event messages. Event messages include the names of one or more state variables and the current value of those variables. These event messages are also expressed in XML. A special initial event message is sent when a device first subscribes; this event message includes the names and values for all evented variables and allows the subscribing device to initialize its model of the state of the service. All subscribing devices are sent all event messages, subscribing devices receive event messages for all evented variables that have changed, and event messages are sent no matter why the state variable changes (either in response to a requested action or because the state the service is modeling changed). In this regard, eventing enables each peer device to monitor the progress of achieving the desired user functions by other peer devices. Eventing also allows each device to negotiate with other peer devices to make determinations on the optimal way to execute a specific task. Event messaging between peers may take place using GENA.

In some examples, the devices in the system 100 take advantage of the DLNA architecture to further streamline the media sharing and consumption experience. In these examples, the devices in the system 100 follow the media format standards as set forth by DLNA. FIG. 4 includes a table 400 that specifies the media format standards set forth by DLNA. Further, the devices in the system 100 may follow the DLNA architecture to allow media information to be passed from one device to another device "out of band", without having to follow the UPnP communication protocol to use TCP/IP for media transport.

In some implementations, a user profile is created for a user who specifies a set of desired media functions in a home or business environment. A user profile provides a set of rules for the electronic devices to follow and to collaborate in order to deliver the desired user functions. FIGS. 3A and 3B, which are described in more detail below, illustrate example user profiles.

In these implementations, the user profile may be specified via an HTML-based web user interface and registered into the peer-to-peer network. Every device on the network receives a copy of the user profile. The user profile is strictly followed as peer devices negotiate and collaborate with one another in order to deliver a desired user function as specified in the user profile. The user profile settings may be changed by a user at any time via a browser interface and any such changes are immediately broadcast from the peer device where the changes are entered to all other peer devices on the same network.

Further, in these implementations, when peer devices (such as TVs, camcorders, smartphones and/or cellular phones, digital frames, media players (e.g., Compact Disc (CD), Digital Versatile Disc (DVD), or Blu-ray players), remote controls, digital cameras, tablet devices, personal computers (PCs), digital video recorders (DVRs), game consoles, network storage devices, etc.) are brought into the network and automatically discovered by one another, each of the peer devices fetches the user profile and begins a series of independent determinations to determine how to collaboratively work together to achieve the functions requested by the user as specified in the user profile. The peer devices negotiate with one another to achieve the objective all without user intervention. Each peer device makes a determination based on its own capabilities, its current state, capabilities of other peer devices on the same network, current states of other peer devices on the same network, other parameters, such as time of day, and the desired outcome as specified in the user profile. Each device may negotiate with other peer devices iteratively in order to achieve the desired media function. In addition, each device may continuously monitor the user's media experience and make adjustment as needed according to the user profile and user input in order to optimize overall user experience.

In some examples, the user profile may be created and entered into the peer-to-peer network via a web user interface made possible by the presentation layer of UPnP. In these examples, a device may retrieve a page from a URL, load the page into a web browser, and allow a user to control the device or browse current settings from a web browser. Any user profile updates entered via the web interface may be propagated to other peer devices using UPnP. The propagation of user profile updates allows all devices in the peer-to-peer network to synchronize their local copy of the user profile. Any other device with a suitable web interface also may be used by the user to enter user profile data, which may then be propagated to all other devices on the peer-to-peer network.

The techniques described throughout with respect to using a user profile for automated collaboration of electronic devices connected to a peer-to-peer network may be useful for any consumer who wishes to achieve a seamless media consumption experience in a living room or a business environment. Given the fact that an average consumer is flooded with all kinds of consumer electronics devices from all kinds of manufacturers and where device interoperability is challenging, the described techniques may allow a consumer to easily interconnect their equipment, readily share digital content, and seamlessly create and share new media, all without human intervention. All the user may have to do is to create a user profile, which lays out the user preferences in media consumption and sharing, and the described electronic devices may take care of the rest. The user may not have to determine compatibility between consumer electronic devices themselves, engage in wiring and connectivity issues, or read technical instructions for each device. Instead, all the user may have to do is to describe his media consumption preferences in a user profile from a simple web interface and the described electronic devices may do the rest.

Figure 2:
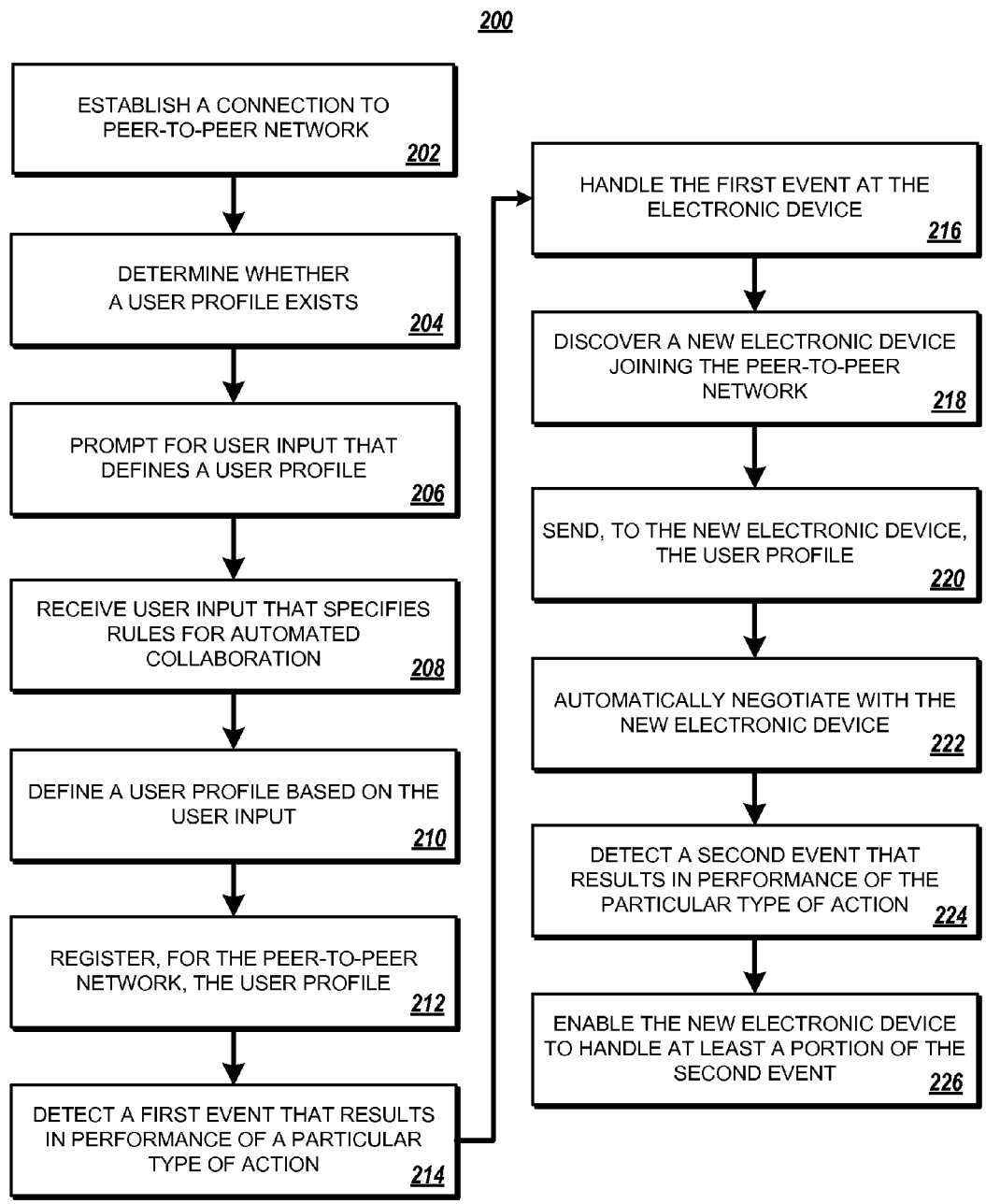

FIG. 2 illustrates an example process 200 for providing automated device collaboration. The operations of the process 200 are described generally as being performed by an electronic device, such as one of the electronic devices included in the system 100. The operations of the process 200 may be performed by multiple electronic devices connected to a peer-to-peer electronic network or may be performed by one or more processors included in one or more electronic devices.

The electronic device establishes a connection to a peer-to-peer network (202). For instance, the electronic device establishes a connection to an in-home peer-to-peer network that is local to a property in which the network resides. The connection may be made through a wired or wireless Internet (or other protocol) communication module of the electronic device. The connection may be established in accordance with the UPnP and DLNA architectures.

The electronic device determines whether a user profile exists for the peer-to-peer network (204). For example, the electronic device checks whether a user profile has been registered for the peer-to-peer network. In this example, the electronic device may check its own electronic storage for a user profile and wait for user profile information from other electronic device connected to the peer-to-peer network. If the electronic device does not store a user profile and does not receive a user profile from another device within a threshold period of time, the electronic device may determine that a user profile does not exist for the peer-to-peer network. In addition, the electronic device may ask other electronic devices connected to the peer-to-peer network for a registered user profile and determine whether a user profile exists for the peer-to-peer network based on responses received. If the electronic device is the only device connected to the peer-to-peer network and does not have a user profile in storage, the electronic device determines that a user profile does not exist.

The electronic device prompts for user input that defines a user profile based on a determination that a user profile does not exist for the peer-to-peer network (206). For instance, the electronic device outputs an alert that prompts a user to provide input needed to define a user profile for the peer-to-peer network.

In some implementations, the peer-to-peer network must be set up and at least one profile established by a user before use. While there are many ways to initially set up a peer-to-peer network, the peer-to-peer network may initially set up a first device before other peer devices join the network. For example, a TV may be the initial device in the network. To set up the network, the user launches a web browser and points the browser to the URL unique to the TV, which is embedded in the peer-to-peer intelligence described throughout this disclosure.

The electronic device receives user input that specifies rules for automated collaboration (208). For example, the electronic device receives, through a user input mechanism, such as a keyboard, a mouse, and/or a touchscreen interface, user input that specifies rules the user would like to enforce on the peer-to-peer network and preferences the user has for actions on the peer-to-peer network. In this example, the electronic device may take the user through a series of questions related to options for automated collaboration on the network and receive the user input as answers to the questions.

In some implementations, the electronic device receives, through a web browser interface, user input assigning a unique device name identifier (such as "TV #1") to the electronic device and sets up one or more user profiles. Each profile describes desired user scenarios for a particular user. The profile with the highest priority (e.g., Priority 1) has precedence over all lower priority (Priority 2 or more) user profiles. For instance, in FIGS. 3A and 3B, two profiles are illustrated. One profile is illustrated for user "John" with higher priority (1) and the other profile is for user "John Jr." with lower priority (2).

The electronic device defines a user profile based on the received user input (210). For instance, the electronic device processes the received user input and stores profile data for the user profile based on the processing of the user input. The electronic device may directly store the user input or may alter the user input into a format that is used by electronic devices to achieve desired user scenarios.

The electronic device may store its assigned device name identifier (e.g., "TV #1") in its internal storage and this name identifier may be used to uniquely identify the electronic device within the peer-to-peer network. As other devices (such as a camcorder or DVR) embedded with the peer-to-peer intelligence described throughout this disclosure join the network and get discovered, the user may use the browser to assign unique name identifiers to the other devices so that all devices in the peer-to-peer network are uniquely identified by their name identifiers.

FIGS. 3A and 3B illustrate example user profiles that may be defined by the electronic device. As shown in FIG. 3A, a user profile 300 includes twenty fields that define parameters of the user profile 300. As shown, a user name or identifier field stores the user name or identifier (e.g., John) associated with the user profile 300. A user profile priority field stores a priority level of the user profile 300 in the peer-to-peer network. As shown, the user profile 300 has a first priority among the user profiles that may be present in the peer-to-peer network.

A guest profile allowed field stores an indication of whether guest profiles are allowed or not allowed. As shown, the user profile 300 allows guest profiles. A music preference field stores music preferences of the user associated with the user profile 300. The music preferences field may be used to select music that best matches the music preferences when the user desired functionality indicates a desire to play music, but does not explicitly indicate which music to play. As shown, the user profile 300 indicates music preferences of classic, light rock, and jazz.

A mood preference field stores mood preferences of the user associated with the user profile 300. The mood preferences field may be used to perform automated functionality that best matches the mood preferences of the user when the user desired functionality indicates a generic action with the specifics of the action to be automatically determined based on the mood preferences. For example, a generic action may be to play a movie with the selection of the movie being made based on the mood preferences. In this example, a comedy may be selected based on the mood preferences being "Happy" and a tragedy may be selected based on the mood preferences being "Sad." As shown, the user profile 300 indicates a mood preference of "Happy."

A use seasonal theme field stores an indication of whether seasonal themes (e.g., Holiday, Thanksgiving, Valentine, Halloween, etc.) are allowed in performing automated collaboration. As shown, the user profile 300 indicates that seasonal themes are allowed. A preferred video display device field stores an indication of which display device is preferred for video display. The user profile 300 stores a device identifier for TV #1 in the Living Room to indicate the preferred video display device.

A preferred audio device field stores an indication of which audio device is preferred for audio output. The user profile 300 stores a device identifier for Stereo #1 in the Living Room to indicate the preferred audio device. A preferred video recording device field stores an indication of which video recording device is preferred for video recording. The user profile 300 stores a device identifier for DVR #1 in the Living Room to indicate the preferred video recording device.

A preferred photo or slideshow display device field stores an indication of which device is preferred for output of photos or a slideshow. The user profile 300 stores a first device identifier for Digital Frame #2 in the Master Bedroom to indicate a first priority preferred photo or slideshow display device and a second device identifier for TV #1 to indicate a second priority preferred photo or slideshow display device. The device priority level may be used to resolve conflicts in automated functionality and/or identify a backup device when the preferred device is not connected to the peer-to-peer network at the time of a task.

A preferred video viewing preference field stores a preference of which video to view and a priority associated with the video viewing preferences. The user profile 300 stores a first device identifier for a Camcorder to indicate a first priority video viewing preference and a second device identifier for TV #1 to indicate a second priority video viewing preference.

A video preemption field stores one or more rules for what actions occur in the peer-to-peer network when video is automatically preempted. As shown, the user profile 300 indicates that a preempted television program is to be recorded by the DVR and then the recorded program is to resume play on the TV when the TV becomes available.

A preferred photo or slideshow viewing source preference field stores a preference of which photos or slideshows to view and a priority associated with the photo or slideshow viewing source preferences. The user profile 300 stores a first device identifier for Digital Camera #1 to indicate a first priority photo or slideshow viewing source preference and a second device identifier for Digital Camera #2 to indicate a second priority photo or slideshow viewing source preference.

A preferred music source preference field stores a preference of which music source to use and a priority associated with the music source preferences. The user profile 300 stores a first device identifier for PC Server #1 to indicate a first priority music source preference and a second device identifier for MP3 Player #1 to indicate a second priority music source preference.

A preferred smartphone preference field stores a preference of which smartphone to use and a priority associated with the smartphone preferences. The user profile 300 stores a first device identifier for Smartphone #1 to indicate a first priority smartphone preference and a second device identifier for Smartphone #2 to indicate a second priority smartphone preference.

A preferred social network viewing preference field stores a preference of which social network to view and a priority associated with the social network viewing preferences. The user profile 300 stores a first social network preference of Facebook to indicate a first priority social network viewing preference and a second social network preference of Twitter to indicate a second priority social network viewing preference.

A social network media playback preference field stores one or more rules for social network media playback. As shown, the user profile 300 indicates that photos and videos playback in reverse chronological order.

A preferred social network feed viewing preference field stores a preference of which social network feed to view and a priority associated with the social network feed viewing preferences. The user profile 300 stores a first indication of HDMI Dongle to TV to indicate a first priority social network feed viewing preference and a second indication of Digital Frame #2 to indicate a second priority social network feed viewing preference.

A wakeup service preference field stores one or more rules for what actions occur in a wakeup service routine. As shown, the user profile 300 indicates that, following an alarm setting in Smartphone #1 on Monday through Friday, the peer-to-peer network is to, upon wakeup, play social network photos and videos on TV #1, then display the user's calendar on TV #1, and then display, on TV #1, any relevant power point presentations associated with today's calendar events.

A TV viewing time preference field stores one or more rules for TV viewing time. As shown, the user profile 300 indicates that no TV viewing is allowed between eleven PM and six AM Sunday through Thursday.

As shown in FIG. 3B, a user profile 350 includes six fields that define parameters of the user profile 350. As shown, a user name or identifier field stores the user name or identifier (e.g., John Jr.) associated with the user profile 350. A user profile priority field stores a priority level of the user profile 350 in the peer-to-peer network. As shown, the user profile 350 has a second priority among the user profiles that may be present in the peer-to-peer network. In this regard, the user profile 350 has a lower priority than the user profile 300 and functionality specified by the user profile 300 may preempt functionality specified by the user profile 350.

A guest profile allowed field stores an indication of whether guest profiles are allowed or not allowed. As shown, the user profile 350 allows guest profiles.

A preferred smartphone preference field stores a preference of which smartphone to use. The user profile 350 stores a device identifier for Smartphone #3 to indicate a smartphone preference.

A preferred photo or video viewing source preference field stores a preference of which photo or video to view. The user profile 350 stores a device identifier for Smartphone #3 to indicate a photo or video viewing source preference.

A preferred photo or video display device field stores a preference of which photo or video display device to use. The user profile 350 stores a device identifier for Tablet #3 to indicate a preferred photo or video display device.

The electronic device registers, for the peer-to-peer network, the user profile (212). For example, the electronic device stores the user profile as a registered version and sends the user profile to other devices connected to the peer-to-peer network. In this example, the other devices connected to the peer-to-peer network receive the user profile and store the received user profile as a registered user profile in their own storage. If no other electronic devices are connected to the peer-to-peer network at the time of registration, the electronic device stores the user profile as a registered version and waits for other devices to join the peer-to-peer network at which time the electronic device sends the user profile to the other devices.

In some implementations, a browser interface serves as an administration interface for a user to view or modify his profiles and to view all peer devices presently active in the network. While the user may always launch the browser on the initial device (e.g., TV #1) to perform various administrative functions, the user is free to launch the browser on any other active peer devices (such as a DVR) to perform the same administrative functions. Once a user profile is set up or changes made to a profile, the profile or the changes made to a profile may be automatically propagated to all other active peer devices on the network. When a peer device exits the network (for example, when a user takes his smartphone outside the house), the device saves a copy of the profile(s) for future use. When the device rejoins the network, the device automatically synchronizes its profile(s) with the latest profile(s) from other active devices in the network.

The electronic device detects a first event that results in performance of a particular type of action (214). For instance, the electronic device may detect a first user input command to output content (e.g., a movie, a song, etc.) using one or more devices connected to the peer-to-peer network. The electronic device also may detect that a particular device (e.g., a camcorder, a digital camera, a smartphone, etc.) has joined the peer-to-peer network as the first event. The electronic device further may detect a first instance of a timing event (e.g., an alarm trigger) tracked by one or more devices connected to the peer-to-peer network. In addition, the electronic device may detect receipt of a first communication of a particular type (e.g., an electronic mail message, a text (e.g., SMS) message, a post on a social network, etc.) by one or more devices connected to the peer-to-peer network.

The electronic device handles the first event at the electronic device in accordance with the registered user profile (216). For instance, the electronic device handles the first event by performing one or more actions associated with the first event. The actions may include displaying and/or audibly outputting content. The electronic device handles the entirety of the first event because the electronic device determines that it is the best device to handle all of the actions associated with the first event in accordance with the user profile registered at the time of the first event.

The electronic device discovers a new electronic device joining the peer-to-peer network (218). For instance, the electronic device detects that a new electronic device has established a connection to the peer-to-peer network. The discovery may be performed in accordance with the UPnP and DLNA architectures.

The electronic device sends, to the new electronic device, the registered user profile (220). For instance, the electronic device accesses the registered user profile from its electronic storage and sends, over the peer-to-peer network to the new electronic device, the accessed user profile.

The electronic device automatically negotiates with the new electronic device to determine how the electronic device and the new electronic device will collaboratively work together to meet the rules specified in the user profile registered for the peer-to-peer network (222). For example, the user profile for the peer-to-peer network may include rules for automated collaboration that are controlled by capabilities (e.g., screen size, audio output quality, connectivity speed, processing power, battery life, etc.) of electronic devices connected to the peer-to-peer network. In this example, the electronic device may exchange, with the new electronic device, capabilities of the electronic device and the new electronic device, evaluate the exchanged capabilities against the rules for automated collaboration that are controlled by capabilities of electronic devices connected to the peer-to-peer network, and determine how the electronic device and the new electronic device will collaboratively work together based on the evaluation of the exchanged capabilities against the rules for automated collaboration that are controlled by capabilities of electronic devices connected to the peer-to-peer network.

In some implementations, the electronic device detects a conflict between the new electronic device and the electronic device each requesting handling of a particular type of action. In these implementations, the electronic device may resolve to the conflict in a variety of ways. For example, the electronic device may resolve the detected conflict in a manner specified in the peer-to-peer intelligence for resolving conflicts. In this example, the electronic device may receive, from devices connected to the peer-to-peer network other than the electronic device and the new electronic device, votes for how to resolve the detected conflict between the electronic device and the new electronic device and resolve the detected conflict based on the votes received from devices connected to the peer-to-peer network other than the electronic device and the new electronic device. Further, in this example, the electronic device and the new electronic device agree to abide by the votes of the other devices and the device receiving the most votes accepts responsibility for performing the particular type of action.

In another example, the electronic device may access a first priority associated with the electronic device and a second priority associated with the new electronic device, compare the first priority with the second priority, and resolve the detected conflict based on the comparison of the first priority with the second priority. In this example, the first and second priorities may be assigned by a user in the user profile and the electronic device resolves the conflict in favor of the device with the higher priority. The first and second priorities also may relate to timing priorities associated with how long ago the devices joined the peer-to-peer network. In some cases, devices that joined the network more recently will be given higher priority and, in other cases, devices that have been part of the network for a longer duration will be given higher priority.

The electronic device detects a second event that results in performance of the particular type of action (224). The detection of the second event may be similar to the detection of the first event described above. The second event may be the same event as the first event, but at a later time (e.g., a first user input command to play a movie and a second user input command to play the same movie). Or, the second event may result in the same type of action as the first event, but be different than the first event (e.g., receipt of a first electronic mail message that causes display of an alert interface and receipt of a second, different electronic mail message that also causes display of the alert interface).

The electronic device collaborates with the new electronic device in a manner that results in the new electronic device handling at least a portion of the second event at the new electronic device by performing at least part of the particular type of action at the new electronic device (226). For instance, the electronic device may collaborate with the new electronic device in a manner that results in the new electronic device handling all of the second event at the new electronic device by performing all of the particular type of action at the new electronic device. Alternatively, in some examples, the electronic device may collaborate with the new electronic device in a manner that results in the new electronic device handling a first portion of the second event at the new electronic device by performing a first part of the particular type of action at the new electronic device. In these examples, the electronic device handles a second portion of the second event at the electronic device by performing a second part of the particular type of action at the electronic device. For instance, the first and second events may relate to outputting content that has a video component and an audio component. The electronic device may output the video component and the audio component for the first event, but output only the video component for the second event. For the second event, the new electronic device outputs the audio component because the collaboration between the new electronic device and the electronic device revealed that the new electronic device has superior speakers as compared to the electronic device.

In some implementations, the electronic device detects the first and second events itself (e.g., receives the user input or message related to the first and second events) and collaborates with the new electronic device by requesting that the new electronic device handle a part or all of the particular type of action. In other implementations, another electronic device detects the first and second events (e.g., receives the user input or message related to the first and second events) and broadcasts the detection of the first and second events on the peer-to-peer network. In these implementations, the electronic device collaborates with the new electronic device by simply taking no action related to the second event or handling only a part of the second event. The electronic device also may exchange communications with the new electronic device in collaborating how to handle the second event (e.g., by sending a request to the new electronic device to handle the second event).

Figure 5:
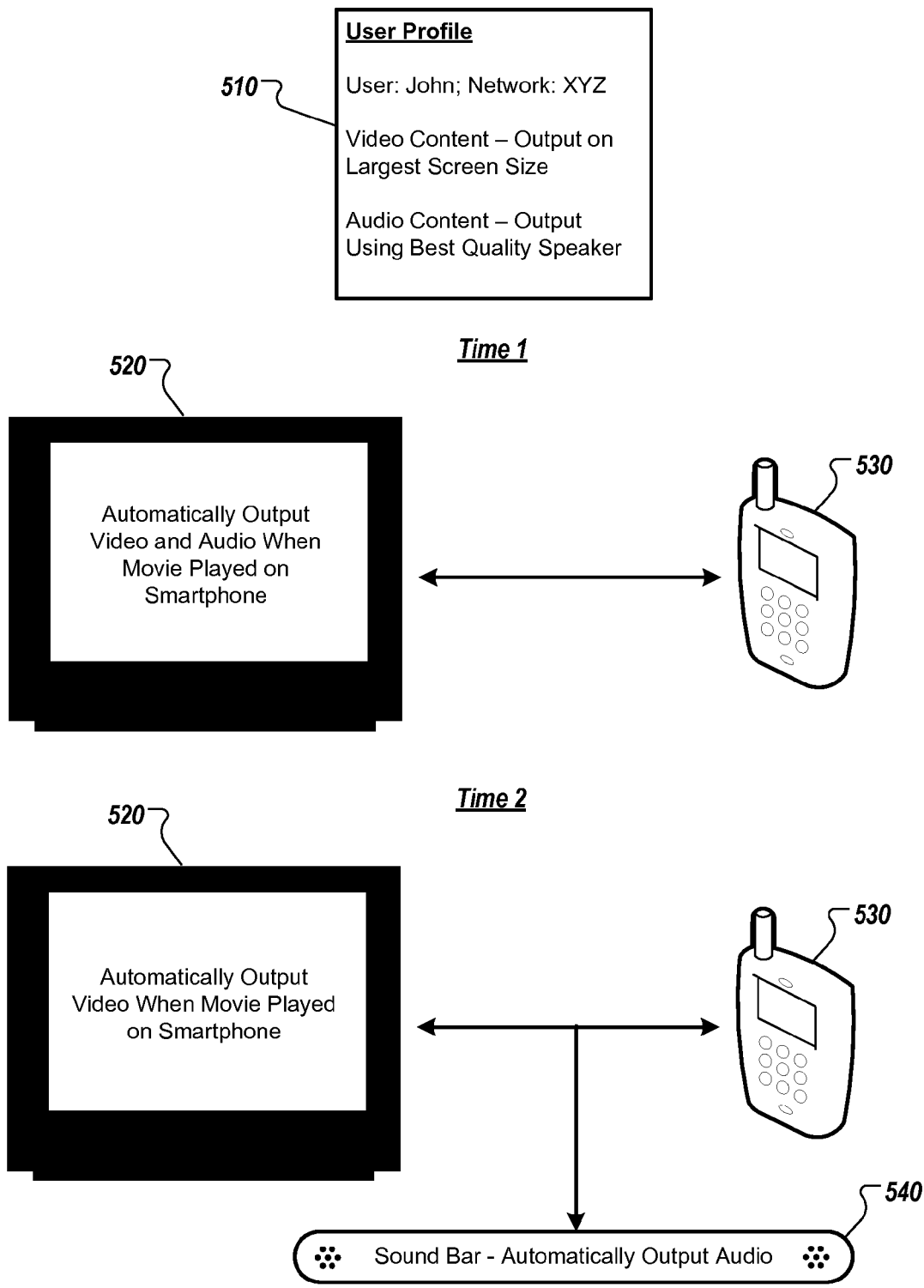
FIGS. 5, 7-9, 11A, 11B, 13A, 13B, 15, 16, 18, 20, and 22A-22C are diagrams illustrating exemplary peer-to-peer device operation.

FIG. 5 illustrates an example of electronic devices performing automated collaboration based on preferences specified in a user profile. As shown, a user profile 510 indicates that the user profile 510 is associated with user "John" and a peer-to-peer network "XYZ." The user profile 510 indicates that video content on any device connected to the peer-to-peer network is to be output by the device on the peer-to-peer network that has the largest screen size. The user profile 510 also indicates that audio content on any device connected to the peer-to-peer network is to be output by the device on the peer-to-peer network that has the highest quality speaker.

At a first time (Time 1 in FIG. 5), an initialization has been performed by a TV 520 and a smartphone 530. In this regard, the TV 520 and the smartphone 530 are already on the network and both are connected via an Ethernet, Wi-Fi, or other wireless connections. The user profile 510 resides on both the TV 520 and the smartphone 530. The TV 520 and the smartphone 530 perform a negotiation process that involves exchanging capabilities with each other and assessing the exchanged capabilities against the user profile 510 to determine which device should output video content and which device should output audio content. In this regard, the TV 520 sends, to the smartphone 530, a screen size of its display and a quality rating for its speakers and the smartphone 530 sends, to the TV 520, a screen size of its display and a quality rating for its speakers. Each of the TV 520 and the smartphone 530 independently compare the received screen size and quality rating against its own screen size and quality rating and make a determination that the TV 520 is the device that should output video content and audio content to best meet the desired functionality of the user profile 510 because the TV 520 has the larger screen size and higher quality speakers. The TV 520 and the smartphone 530 exchange communications to confirm the agreement that the TV 520 is the device that should output video content and audio content.

At the first time, the smartphone 530 receives input to output a movie that includes video and audio. As shown, based on the negotiation between the TV 520 and the smartphone 530 (which may occur before or after the input to output the movie is received), the smartphone 530 determines that the TV 520 should output video content and audio content for the movie and sends the video content and the audio content for the movie to the TV 520 with a request to output the video content and the audio content. The TV 520 receives the video content, the audio content, and the request and begins outputting the video and audio of the movie selected on the smartphone 530. Other than user input to define the user profile 510 and select the movie on the smartphone 530, all of the actions shown and described with respect to FIG. 5 occur automatically without user input or intervention.

At a second time (Time 2 in FIG. 5), the TV 520 and the smartphone 530 discover the sound bar 540 joining the peer-to-peer network. In this regard, when the sound bar 540 is connected to the network, the TV 520 and the smartphone 530 simultaneously discover the sound bar 540 and the sound bar 540 simultaneously discovers the presence of the TV 520 and the smartphone 530 on the same network. The sound bar 540 communicates, to the TV 520 and the smartphone 530, its device and service descriptions while the TV 520 and the smartphone 530 communicate, to the sound bar 540, their respective device and service descriptions.

The TV 520, the smartphone 530, and the sound bar 540 then perform a user profile synchronization process. During the user profile synchronization process, the sound bar 540 obtains the latest user profile 510 from either the TV 520 or the smartphone 530 and stores a local copy of the user profile 510 in its electronic storage.

The TV 520, the smartphone 530, and the sound bar 540 then perform a status synchronization process. During the status synchronization process, the TV 520 updates the smartphone 530 and the sound bar 540 that it is currently playing video and audio content of a movie. The smartphone 530 updates the TV 520 and the sound bar 540 that it is sending video and audio content of the movie to the TV 520. The sound bar 540 updates the TV 520 and the smartphone 530 that it is on standby and not currently providing audio output.

The TV 520, the smartphone 530, and the sound bar 540 then identify desired user functions. In this regard, all three devices look up the user profile 510 and recognize the desired user scenario is to output video content on the device that has the largest screen size and output audio content on the device that has the highest quality speaker.

The TV 520, the smartphone 530, and the sound bar 540 then engage in peer negotiations. The TV 520 sends, to the smartphone 530 and the sound bar 540, a screen size of its display and a quality rating for its speakers, the smartphone 530 sends, to the TV 520 and the sound bar 540, a screen size of its display and a quality rating for its speakers, and the sound bar 540 sends, to the TV 520 and the smartphone 530, a quality rating for its speakers. Each of the TV 520, the smartphone 530, and the sound bar 540 independently compare the received screen sizes and quality ratings against its own screen size and quality rating and make a determination that, to best meet the desired functionality of the user profile 510, the TV 520 is the device that should output video content and the sound bar 540 is the device that should output audio content because the TV 520 has the largest screen size and the sound bar 540 has the highest quality speakers. The TV 520, the smartphone 530, and the sound bar 540 exchange communications to confirm the agreement that the TV 520 is the device that should output video content and the sound bar 540 is the device that should output audio content. Based on the agreement, the smartphone 530 maintains sending of video content for the movie to the TV 520 and begins sending audio content for the movie to the sound bar 540. Alternatively, the smartphone 530 may send video and audio content to each of the TV 520 and the sound bar 540 and the TV 520 may only output the video content based on the negotiated agreement and the sound bar 540 may only output the audio content based on the negotiated agreement (or the inability of the sound bar 540 to output video content). As shown in FIG. 5, based on the discovery of the sound bar 540, the peer-to-peer network automatically, without any user input, changes the audio source of the movie being watched to the device that best meets the preferences defined in the user profile 510.

To the extent the movie was not playing when the sound bar 540 joined the network and was discovered by the TV 520 and the smartphone 530, the TV 520, the smartphone 530, and the sound bar 540 would perform a similar synchronization and negotiation process as described above, but would not take any immediate action. Rather, the TV 520, the smartphone 530, and the sound bar 540 would be maintained in ready states and, the next time a movie is selected for output on the smartphone 530, the TV 520 would automatically output the video content for the movie and the sound bar 540 would automatically output the audio content for the movie.

Figure 6:
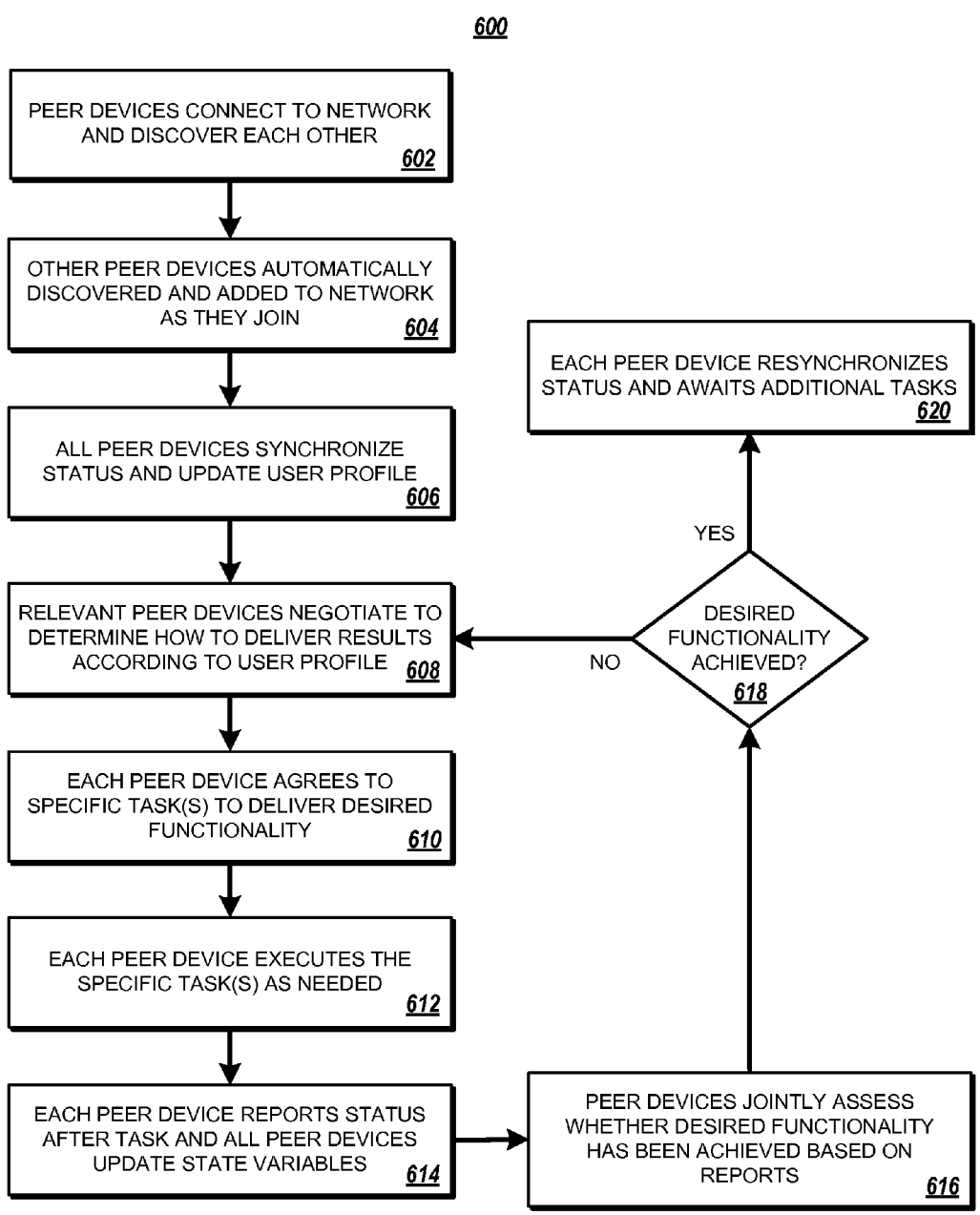

FIG. 6 illustrates an example process 600 for providing automated device collaboration in a peer-to-peer network. Regardless of the specific user functions desired, the embedded software and/or firmware in each device may follow the process as outlined in FIG. 6. The operations of the process 600 are described generally as being performed by electronic devices, such as the electronic devices included in the system 100. The operations of the process 600 may be performed by one or more processors included in one or more electronic devices.

The electronic devices connect to a peer-to-peer network and discover each other (602). For example, at least two peer devices connect to the peer-to-peer network such that at least two peer devices are connected to the network. In some examples, the peer-to-peer network is based on the UPnP and DLNA architecture and the connections are made in accordance with UPnP and DLNA protocols. In these examples, a first peer device and a second peer device may utilize the underlying platform to discover the presence of each other and exchange data as part of the discovery and connection process.

The electronic devices automatically discover other peer devices and add the discovered peer devices to the network as they join (604). For instance, other peer devices may be added to the network dynamically and discovered automatically by other peer devices already on the network. The automatic discovery may occur in accordance with UPnP and DLNA protocols.

The electronic devices connected to the peer-to-peer network synchronize status and update the user profile (606). For example, all peer devices periodically synchronize status with each other and also synchronize user profile data. The user profile already may be entered by the user using a web interface via any of the peer devices equipped with web presentation functionality.

The electronic devices negotiate to determine how to deliver results according to the user profile (608). For instance, peer devices relevant to currently desired user functions are identified and start to negotiate with one another to determine the optimal way to achieve the desired user functions.

Each of the electronic devices agrees to one or more specific tasks to deliver desired functionality (610). For example, each relevant peer device agrees to a specific task it needs to perform in order to achieve the desired results. In this example, the task may be acknowledging status, reporting status, performing an action, or simply performing an idle task.

Each of the electronic devices executes the one or more specific tasks as needed (612). For instance, each relevant peer device executes the task it has agreed to perform in the negotiation.

Each of the electronic devices reports status after a task and all peer devices update state variables (614). For example, each relevant peer device reports the status of its task execution. In this example, the reporting may be in the form of an event message or changes to one or more state variables.

The electronic devices jointly assess whether desired functionality has been achieved based on the reports (616). For instance, each relevant peer device examines the status from other reporting peer devices and determines whether the desired user function has been completed.

The electronic devices jointly determine if desired functionality has been achieved based on the assessment (618). For example, each relevant peer device reports the result of its determination of whether the desired user function has been completed and the relevant peer devices collectively determine whether the desired user functionality has been achieved. In this example, the relevant peer devices may determine that the desired user functionality has been achieved when all (or a majority) of the relevant peer devices report a determination that the desired user functionality has been achieved. The relevant peer devices may determine that the desired user functionality has not been achieved when any (or a majority) of the relevant peer devices report a determination that the desired user functionality has not been achieved.

If the desired user function has not been completed, then the relevant peer devices return to operations associated with reference numeral 608 to resynchronize each other's status and begin an iterative cycle until the desired user function is completed.

If the desired user function has been completed, each of the electronic devices resynchronizes status and awaits additional tasks (620). For instance, the relevant peer devices that have jointly completed the task resynchronize completion status with all other relevant peer devices and return to standby states in anticipation of a new event or new device joining the network.

Figure 7:
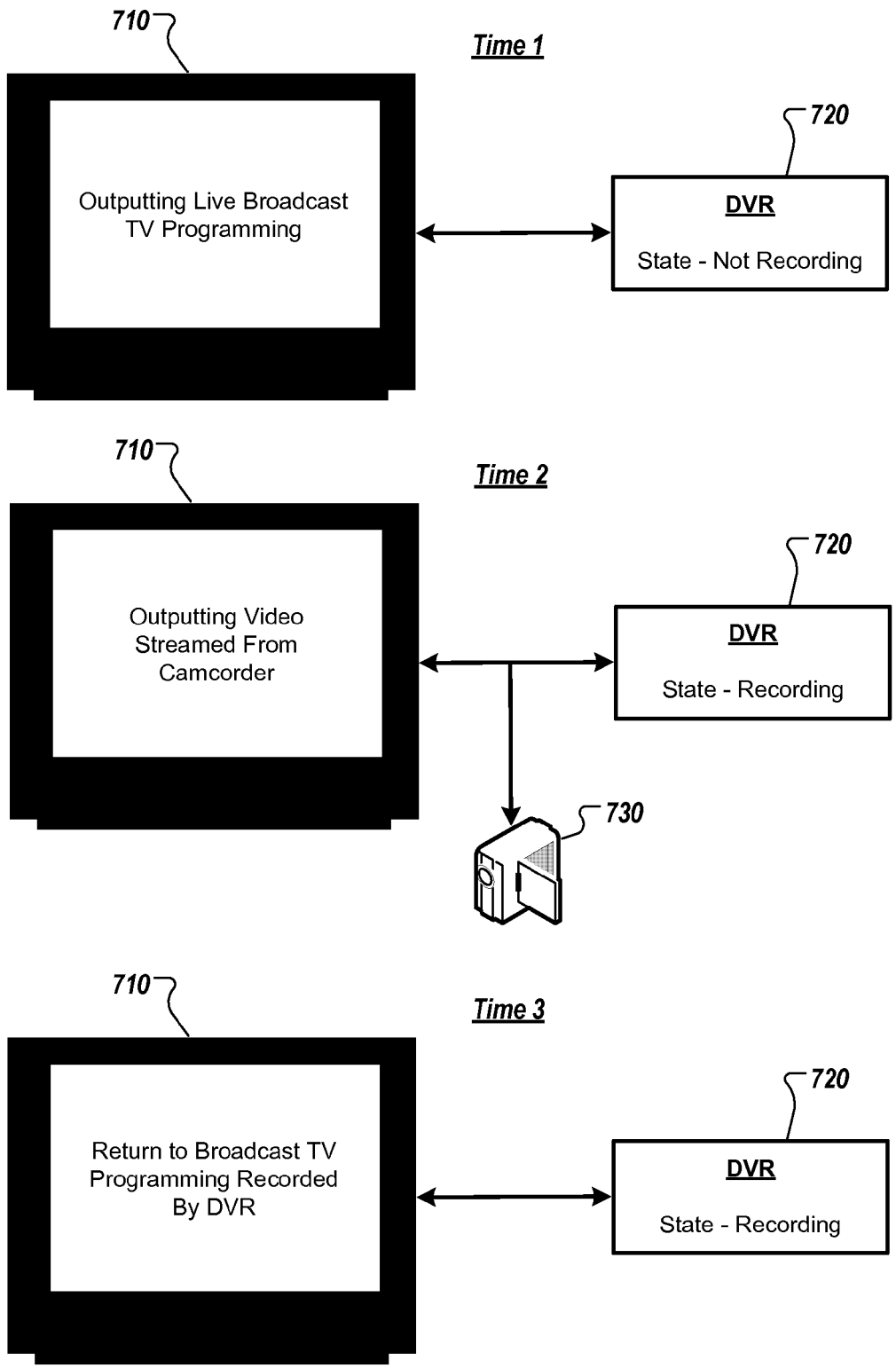

FIG. 7 illustrates an example of electronic devices performing automated collaboration based on preferences specified in a user profile. In this example, a camcorder preempts a television program when the camcorder is present.

As shown, a home environment includes three connected consumer electronic devices with each device having the peer-to-peer intelligence described throughout this disclosure embedded therein. The electronic devices are a TV 710 with an Internet connection, a DVR 720 with an Internet connection, and a camcorder 730 with a wireless Internet connection.

In this example, a user has already specified in his user profile the desired use scenarios when these three devices are connected. For instance, FIG. 3A illustrates an example user profile that defines the desired use scenarios when these three devices are connected. The desired user scenario is that, when the camcorder 730 is discovered on this home, peer-to-peer network, the user wants to suspend whatever is already playing on TV 710, allow the DVR 720 to temporarily start recording the program currently playing on TV 710, and allow the video recorded in the camcorder 730 to automatically stream to the TV 710. This scenario allows the user to immediately enjoy the video already recorded on his camcorder 730 on the TV 710 while redirecting and storing whatever television program he was watching to a DVR 720.

At a first time (Time 1 in FIG. 7), an initialization has been performed by the TV 710 and the DVR 720. In this regard, the TV 710 and the DVR 720 are already on the network and both are connected via an Ethernet, Wi-Fi, or other wireless connections. The user has previously entered his user profile information via a web interface using TV 710. The user profile resides on both the TV 710 and the DVR 720. At the first time, the TV 710 outputs live, broadcast television programming and the DVR 720 is maintained in a state where it is not recording the live, broadcast television programming being output on the TV 710.

At a second time (Time 2 in FIG. 7), the TV 710 and the DVR 720 discover the camcorder 730 joining the peer-to-peer network. In this regard, when the camcorder 730 is brought to the vicinity of the network and connected to the network via a Wi-Fi connection, the TV 710 and the DVR 720 simultaneously discover the presence of the camcorder 730 and the camcorder 730 simultaneously discovers the presence of the TV 710 and the DVR 720 on the same network. The camcorder 730 communicates, to the TV 710 and the DVR 720, its device and service descriptions while the TV 710 and the DVR 720 communicate, to the camcorder 730, their respective device and service descriptions.

The TV 710, the DVR 720, and the camcorder 730 then perform a user profile synchronization process. During the user profile synchronization process, the camcorder 710 obtains the latest user profile from either the TV 710 or the DVR 720 and stores a local copy of the user profile in its electronic storage.

The TV 710, the DVR 720, and the camcorder 730 then perform a status synchronization process. During the status synchronization process, the TV 710 updates the camcorder 730 and the DVR 720 that it is currently playing a particular television program. The DVR 720 updates the TV 710 and the camcorder 730 that it is on standby and there are no active recording sessions.

The TV 710, the DVR 720, and the camcorder 730 then identify desired user functions. In this regard, all three devices look up the user profile and recognize the desired user scenario is to play the camcorder 730 video on the TV 710 as the top priority and that any program currently playing on the TV 710 is to be preempted and redirected to the DVR 720.

The TV 710, the DVR 720, and the camcorder 730 then engage in peer negotiations. The camcorder 730 negotiates with the TV 710 to determine when the camcorder 730 may begin streaming its video recording to the TV 710. The TV 710 negotiates with the camcorder 730 that it is currently playing a television program and requests the camcorder 730 to hold its request. The TV 710 negotiates with the DVR 720 to begin recording the currently playing television program on the DVR 720. The DVR 720 replies that it is currently idle and is able to immediately accept the request from the TV 710. The DVR 720 starts recording the currently playing television program.

The TV 710 then replies to the camcorder 730 that it is now available to play video and the camcorder 730 immediately starts streaming its video recording to the TV 710. During the desired user scenario (as shown in FIG. 7 at Time 2), the TV 710 and the camcorder 730 continuously monitor the progress of video streaming from the camcorder 730 to the TV 710, including monitoring any possible user input, such as fast forward, pause, stop, or rewind.

In some examples, the camcorder 730 detects that it has reached the end of the recording and updates the TV 710 and the DVR 720 of this condition. In these examples, the TV 710 negotiates with the DVR 720 to start playing, on the TV 710, the preempted television program recorded on the DVR 720. The DVR 720 replies to the request of the TV and begins playing, on the TV 710, the television program just recorded.

At a third time (Time 3 in FIG. 7), the camcorder 730 exits the network. The TV 710 and the DVR 720 both detect the departure of the camcorder 730 and remove the presence of the camcorder 730 from their respective internal data stores. If the camcorder 730 reached the end of the recording prior to exiting the network, the TV 710 simply continues to output the recorded television program from the DVR 720 and the DVR 720 continues to record the television program until the TV 710 reaches live, broadcast television programming or another action is taken to stop recording (e.g., the recording is stopped by user input or the user changes the television channel). If the camcorder 730 had not reached the end of the recording prior to exiting the network and the TV 710 was outputting video streamed from the camcorder 730 at the time of the camcorder 730 exiting the network, the TV 710 negotiates with the DVR 720 to start playing, on the TV 710, the preempted television program recorded on the DVR 720. The DVR 720 replies to the request of the TV 710 and begins playing, on the TV 710, the television program just recorded while continuing to record the television program until the TV 710 reaches live, broadcast television programming or another action is taken to stop recording (e.g., the recording is stopped by user input or the user changes the television channel).

Figure 8:
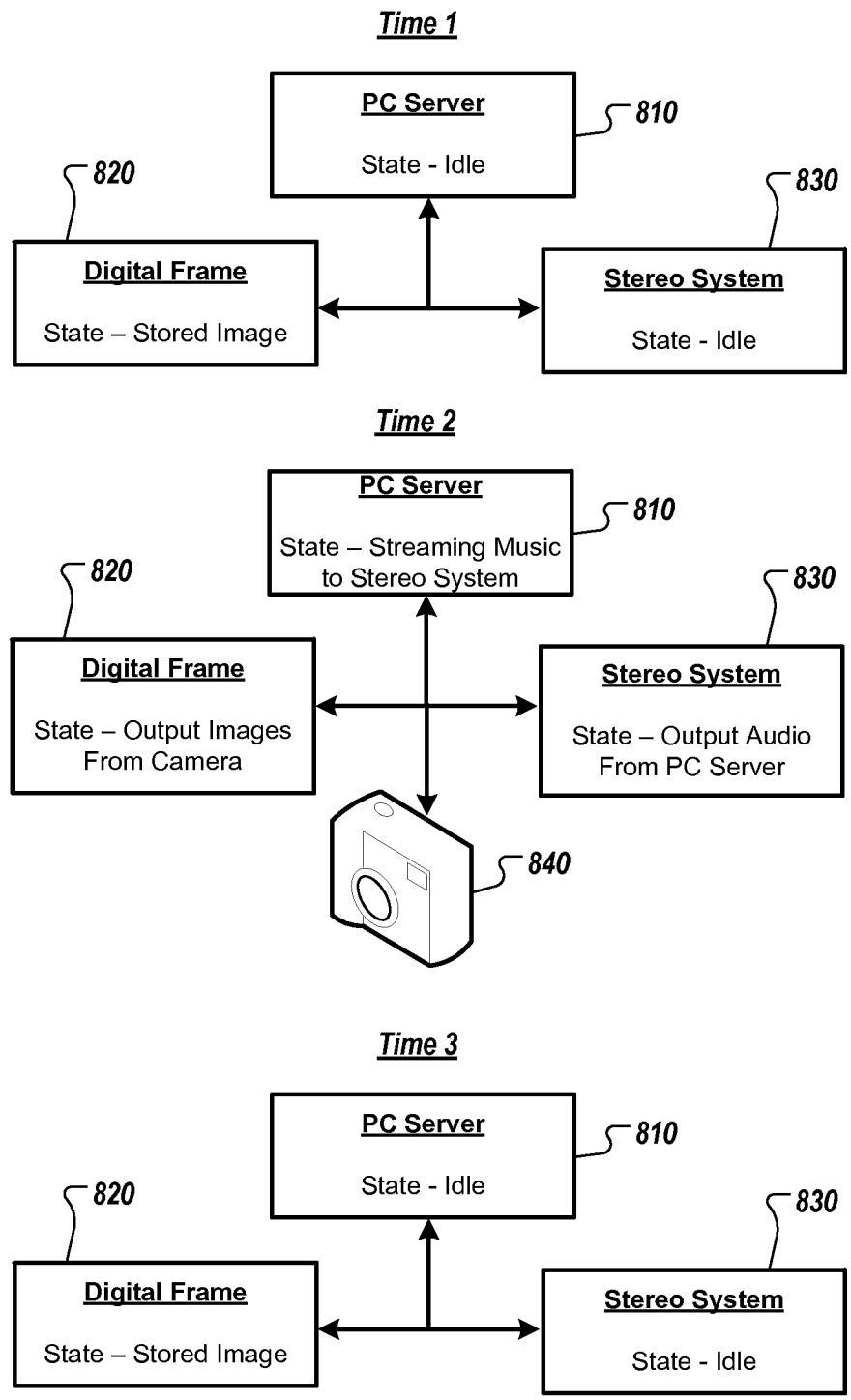

FIG. 8 illustrates another example of electronic devices performing automated collaboration based on preferences specified in a user profile. In this example, the peer-to-peer network automatically creates a slide show on a digital frame.

As shown, a home environment includes four connected consumer electronic devices with each device having the peer-to-peer intelligence described throughout this disclosure embedded therein. The devices include a digital frame 820 with an Internet connection, a PC server 810 with a music library and an Internet connection, a digital camera 840 with a wireless Internet connection, and a stereo system 830 with an Internet connection.

A user has already specified in his user profile the desired use scenarios when these four devices are connected. For example, the user profile 300 shown in FIG. 3A is an example of a user profile that defines the desired use scenarios when these four devices are connected. A desired user scenario is that when the digital camera 840 is discovered on the home network, the user wants to automatically create a slide show consisting of photos stored in the digital camera 840 and music stored in the PC server 810, and play the resulting slide show using the digital frame 820 and the stereo system 830.

At a first time (Time 1 in FIG. 8), the digital frame 820, the PC server 810, and stereo system 830 are already on the network and all are connected via an Ethernet connection. A user has previously entered his user profile information (e.g., the user profile 300 in FIG. 3A) via a web interface using the digital frame 820. The user profile resides on all three devices. At the first time (Time 1 in FIG. 8), the PC server 810 and the stereo system 830 are maintained in idle states and monitoring for tasks on the peer-to-peer network. The digital frame 820 outputs an image stored in memory of the digital frame 820.

At a second time (Time 2 in FIG. 8), the digital camera 840 is brought to the vicinity of the network and connected to the network via a Wi-Fi connection. At the second time (Time 2 in FIG. 8), the digital frame 820, the PC server 810, and the stereo system 830 simultaneously discover the presence of the digital camera 840 and the digital camera 840 simultaneously discovers the presence of the other three devices on the same network. The digital camera 840 communicates, to the other three devices, its device and service descriptions while the other three devices communicate, to the digital camera 840, their respective device and service descriptions.

The digital camera 840 also obtains the latest user profile from the digital frame 820, the stereo system 830, or the PC server 810, and stores a copy of the user profile in its storage. The digital frame 820 updates the digital camera 840, the stereo system 830, and the PC server 810 that it is currently outputting a stored image as a default operation. The PC server 810 and the stereo system 830 update the other devices on the peer-to-peer network that they are in an idle state.

The PC server 810, the digital frame 820, the stereo system 830, and the digital camera 840 then identify desired user functions. In this regard, all four devices look up the user profile and recognize the desired user scenario is to create a slide show by fetching the photos from the digital camera 840, fetching music from the PC server 810 music library, playing the slide show of photos on the digital frame 820, and using the stereo system 830 to play background music from the PC server 810.

The PC server 810, the digital frame 820, the stereo system 830, and the digital camera 840 then engage in peer negotiation. The digital camera 840 requests the digital frame 820 to download all photos for the slideshow to the digital frame 820 when it is ready. Alternatively, the digital camera 840 may send photos one at a time to the digital frame 820 as the slideshow progresses until there are no more photos to send. The digital frame 820 requests the digital camera 840 to be on standby. The digital frame 820 looks up the user profile to determine the type of music the user desires as background music for the slide show. The user profile indicates that the user has indicated a preference to follow a current seasonal theme. The digital frame 820 determines that Valentine's Day is just around the corner (e.g., the nearest holiday to the current date) and the digital frame 820 requests the PC server 810 to identify love songs available for music streaming. The PC server 810 looks up the metadata in its music library, identifies a series of love songs, and gets them ready for streaming to the stereo system 830.

The stereo system 830 acknowledges to the PC server 810 that it is ready to begin streaming music from the PC server 810. The PC server 810 acknowledges to the digital frame 820 that it is ready to begin. The digital frame 820 acknowledges to the digital camera 840 to begin downloading photos to the digital frame 820.

As shown, a slide show based on seasonal music is generated as photos from the digital camera are displayed on the digital frame 820 while background music consisting of love songs is played over the stereo system 830. All four devices continuously monitor the progress of photo downloading and music streaming, including monitoring any possible user input, such as fast forward, pause, stop, or rewind.

The digital frame 820 detects that it has reached the end of the photos and notifies the PC server 810 and the stereo system 830 of this condition. The digital frame 820 stops the slide show, the PC server 810 stops streaming music, and the stereo system 830 stops playing music, as the slide show is concluded.

At a third time (Time 3 in FIG. 8), the digital camera 840 exits the network. The digital frame 820, the PC server 810, and the stereo system 830 all detect the departure of the digital camera 840 and remove the presence of the digital camera 840 from their respective internal data store. As shown, the PC server 810 and the stereo system 830 each return to an idle state and the digital frame 820 returns to outputting the image stored in the memory of the digital frame 820.

Figure 9:
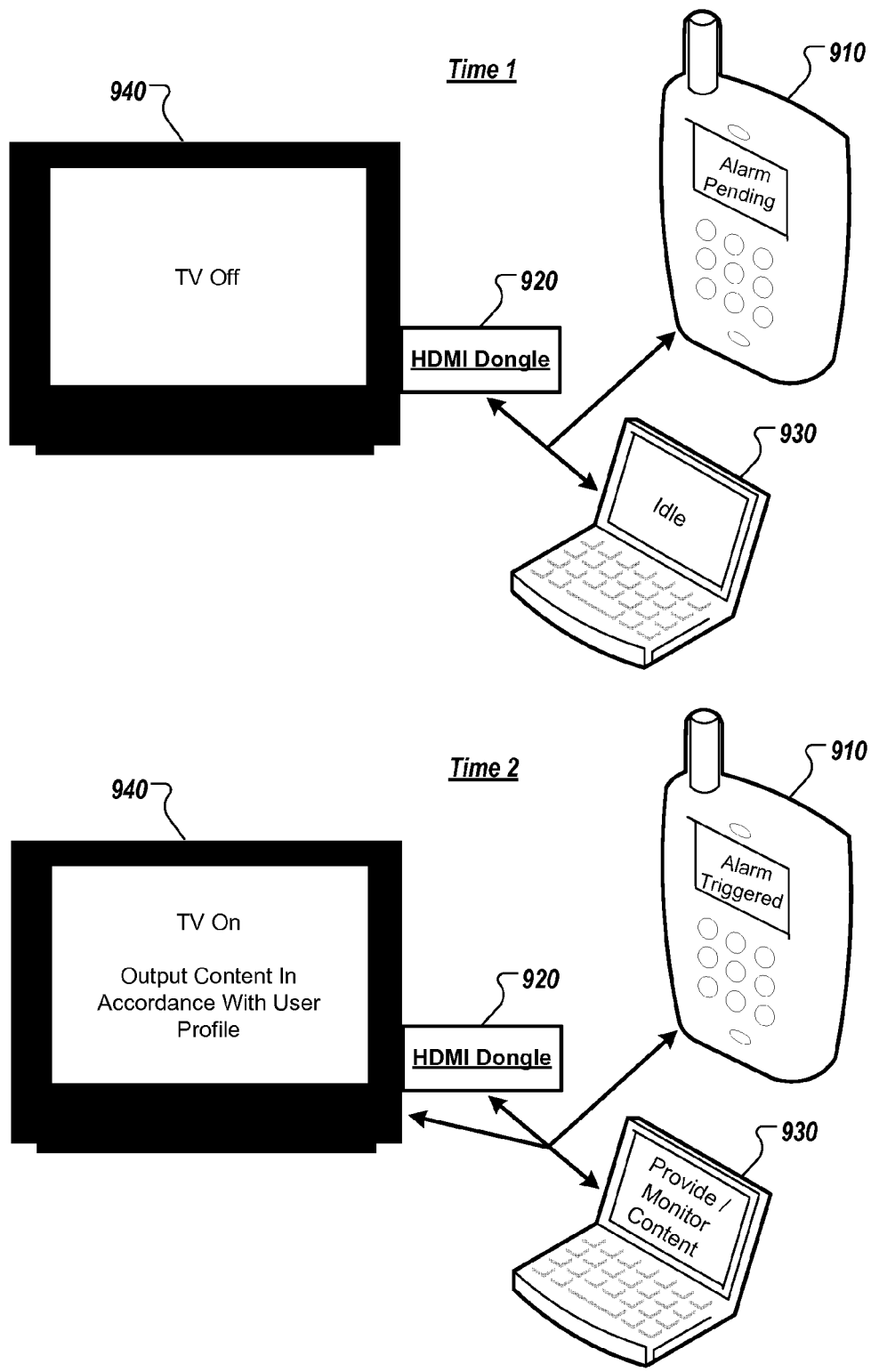

FIG. 9 illustrates yet another example of electronic devices performing automated collaboration based on preferences specified in a user profile. In this example, the peer-to-peer network performs a wake up service that includes dynamic device addition and removal.

As shown, a home environment includes four connected consumer electronic devices with each device having the peer-to-peer intelligence described throughout this disclosure embedded therein. The embedded intelligence may include software, firmware, an application, or any other form of programmable instructions. The four devices include an HDMI dongle 920 connected to a TV 940, the TV 940 (Internet connected), a smartphone 910 (Internet connected), and a laptop computer 930 (Internet connected).

A user has already specified in his user profile the desired wake up service scenarios when the smartphone 910 alarm is triggered Monday through Friday in the morning. For example, the user profile 300 shown in FIG. 3A is an example of a user profile that defines the desired use scenarios when the smartphone 910 alarm is triggered Monday through Friday in the morning. The desired user scenario is that, when the alarm clock is triggered in the smartphone 910 in the morning Monday through Friday, the TV 940 is automatically turned on and starts to play the user's photos and videos embedded in the user's social network (e.g., Facebook) newsfeed on the TV 940, followed by a display on the TV 940 of the user's calendar for the day, followed by a display on the TV 940 of a power point presentation associated with a particular meeting scheduled for that date.

At a first time (Time 1 in FIG. 9), the HDMI dongle 920 and the laptop computer 930 are already on the network and all are connected via an Ethernet or a wireless connection. The user has previously entered his user profile information (e.g., the user profile 300 shown in FIG. 3A) via a web interface, such as via the laptop computer 930. The user profile resides on the HDMI dongle 920 and the laptop computer 930. At the first time (Time 1 in FIG. 9), the HDMI dongle 920 and the laptop computer 930 each are in an idle state monitoring for tasks in the peer-to-peer network. The TV 940 is in an off state and not currently an active device on the peer-to-peer network. The smartphone 910 is not currently an active device on the peer-to-peer network and is maintained in a sleep state that monitors for an alarm to be triggered, which awakens the smartphone 910 from the sleep state.

At a second time (Time 2 in FIG. 9), the alarm clock on the smartphone 910 is triggered in the morning any time Monday through Friday. Based on the alarm clock trigger, the smartphone 910 awakens and detects the presence of the other two devices (e.g., the HDMI dongle 920 and the laptop 930) in the same network and each of the other two devices also simultaneously detects the addition of the smartphone 910 to the network. The smartphone 910 communicates, to the other two devices, its device and service descriptions and the application it is currently running while the HDMI dongle 920 and the laptop computer 930 communicate, to the smartphone 910, their respective device and service descriptions.

The smartphone 910, the HDMI dongle 920, and the laptop computer 930 then perform a user profile synchronization process. During the user profile synchronization process, the smartphone 910 obtains the latest user profile from either the HDMI dongle 920 or the laptop 930 and stores a local copy of the user profile in its storage.

The smartphone 910, the HDMI dongle 920, and the laptop computer 930 then identify desired user functions. All three devices look up the user profile and recognize the desired user scenario is to automatically turn on the TV 940 and automatically play, in reverse chronological order, all photos and videos included in the user's social network (e.g., Facebook) newsfeed, followed by the user's calendar for the current date, followed by any power point presentations scheduled to be presented in one of the meetings set on the user's calendar for the current date.

All of the devices also check the current date and time and agree that the current date and time meet the timing requirements for the wake up service and agree to proceed. Based on the agreement, the HDMI dongle 920 automatically turns on the TV 940 via, for example, the Consumer Electronics Control (CEC) interface on the HDMI interface. The CEC capability is available, for example, in HDMI dongles, such as the Google Chromecast device. The TV 940 then joins the network upon being powered on. The TV 940 obtains the latest user profile from either the HDMI dongle 920, the laptop 930, or the smartphone 910 and stores a local copy of the user profile in its storage.

The smartphone 910, the HDMI dongle 920, the laptop computer 930, and the TV 940 then engage in peer negotiations. The HDMI dongle 920 determines when it is ready to login to the user's social network (e.g., Facebook) account and retrieve photos and stream videos from the user's social network (e.g., Facebook) account according to reverse chronological order. Social network platforms, such as Facebook, LinkedIn, Twitter, Pinterest, etc., offer a rich set of Application Programming Interfaces (APIs) available to retrieve photos and videos uploaded by users and shown in the user's newsfeed on the user's social network. The HDMI dongle 920 informs the TV 940, the smartphone 910, and the laptop 930 of its current state. The TV 940 informs the HDMI dongle 920 that it is idle and ready to accept content from the HDMI dongle 920.

The HDMI dongle 920 then notifies the smartphone 910 it is now playing photos and streaming videos from the user's social network (e.g., Facebook) account and the smartphone 910 immediately launches a remote control application to help the user navigate the photo and video playback on the TV 940 via the HDMI dongle 920.

The HDMI dongle 920 continuously monitors the progress of photo playback and video streaming from the user's social network (e.g., Facebook) account including monitoring any possible user input, such as fast forward, pause, stop, or rewind commands sent from the smartphone 910.

At an end of the social network newsfeed, the HDMI dongle 920 detects that it has reached the end of the user's photos or video streams and updates the TV 940, the smartphone 910, and the laptop 930 of this condition. The HDMI dongle 920 recognizes, from the user's profile, that the next item to be displayed on the TV 940 is the user's calendar. The HDMI dongle 920 notifies the laptop computer 930, which upon receiving notification from the HDMI dongle 920, retrieves the user's calendar from, for example, calendar software on a computer, such as Microsoft Outlook. The laptop computer 930 renders the user's calendar in a format displayable on the TV 940 and sends the rendered calendar image from the laptop computer 930 to the HDMI dongle 920, which in turn causes the calendar image to be displayed on the TV 940. After a predetermined time (e.g., two minutes), the HDMI dongle 920 and the laptop computer 930 determine that a particular power point presentation is associated with a calendar event and the HDMI dongle 920 notifies the smartphone 910 to change its remote control from a TV style remote control to a power point style remote control. Meanwhile, the laptop computer 930 retrieves the particular power point presentation from the disk storage of the laptop 930 and renders it into a slide show format suitable for display on the TV 940. The laptop computer 930 streams the rendered power point page by page to the HDMI dongle 920 for display on the TV 940 subject to the control of the playback by the power point style remote control now operating on the smartphone 910. When the last page of the power point is reached, the laptop computer 930 notifies the HDMI dongle 920 of this condition and the HDMI dongle 920, in turn, turns off the TV 940 and notifies the smartphone 910. The TV 940 is now turned off and removed from the network. The smartphone 910, upon receiving notification of the end of the power point presentation, terminates the power point style remote control application. With the TV 940 off the network, the smartphone 910, the HDMI dongle 920, and the laptop computer 930 each return to their original state prior to the invocation of the wake up service.

In some implementations, a peer-to-peer network is capable of supporting more than one user. That is, each user may have his private user profile and each peer device may be capable of storing multiple user profiles for different users, such as different members of a family in a living room. Multiple user support enables friends or family members to share the same home entertainment devices in a property (e.g., a home) or in a particular room of the property (e.g., the living room of the home). Each user profile may be uniquely identified by an alphanumeric user name. When more than one user profile is created, the active user may use his or her web browser to select which user profile to use.

Figure 10:
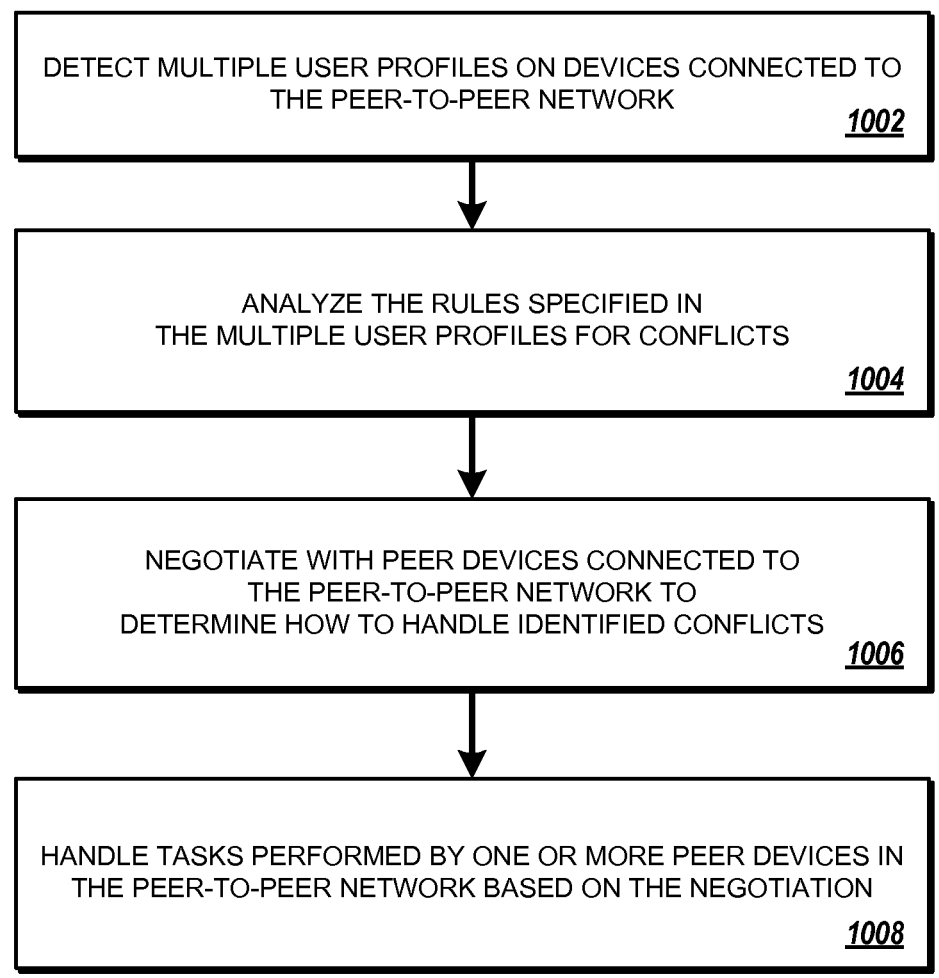

FIG. 10 illustrates an example process 1000 for handling multiple user profiles in a peer-to-peer network. The operations of the process 1000 are described generally as being performed by an electronic device, such as one of the electronic devices included in the system 100. The operations of the process 1000 may be performed by multiple electronic devices connected to a peer-to-peer electronic network or may be performed by one or more processors included in one or more electronic devices.

The electronic device detects multiple user profiles on peer devices connected to the peer-to-peer network (1002). For instance, the electronic device detects that profiles with different user identifiers are present in the electronic storage of the electronic device and/or in user profile information exchanged with other peer devices in a user profile synchronization process.

The electronic device analyzes the rules specified in the multiple user profiles for conflicts (1004). For example, for each user profile, the electronic device compares the rules/preferences in that user profile against the rules/preferences in the other user profiles and determines whether any rules/preferences conflict. In this example, conflicts may exist when the user profiles specify different preferred output devices, specify different music or seasonal preferences, and/or define automated actions that conflict (e.g., different wake up services).

The electronic device negotiates with peer devices connected to the peer-to-peer network to determine how to handle identified conflicts (1006). If no conflicts are detected, the electronic device merely uses all of the multiple user profiles in providing the preferred user experience for all users without conflict. If conflicts are detected, the electronic device may identify priorities associated with the multiple user profiles and use the identified priorities to resolve the conflicts.

In some implementations, although each device in the network may store multiple user profiles with the highest priority profile superseding all lower priority profiles, there may be situations that arise when the user scenario of a high priority profile does not conflict with the user scenario of a lower priority profile. In this case, the devices may intelligently consult and negotiate with one another and jointly determine that the network can simultaneously support more than one active profile with different priorities.

For example, FIGS. 3A and 3B illustrate two profiles, one for user "John" and one for user "John Jr." The priority of the profile for "John" is higher than the priority of the profile for "John Jr." However, when user "John" is engaged in a user scenario as described in FIG. 7 above and, at the same time, user "John Jr." takes his smartphone #3 to the vicinity of his tablet #3, the devices on the network determine that the smartphone #3 and tablet #3 do not conflict with the operations being performed for user "John" and, hence, the smartphone #3 and tablet #3, after seeking permission from the rest of the devices on the network and consulting the user profiles for "John" and for "John Jr.", may begin a separate operation according to the user scenario described in the profile for "John Jr." where the photos taken on John Jr.'s smartphone #3 are automatically played on the tablet #3.

The electronic device handles tasks performed by one or more peer devices in the peer-to-peer network based on the negotiation (1008). For instance, the electronic device handles tasks in a manner that complies with the resolution of the conflicts in the negotiation.

Figure 11A:
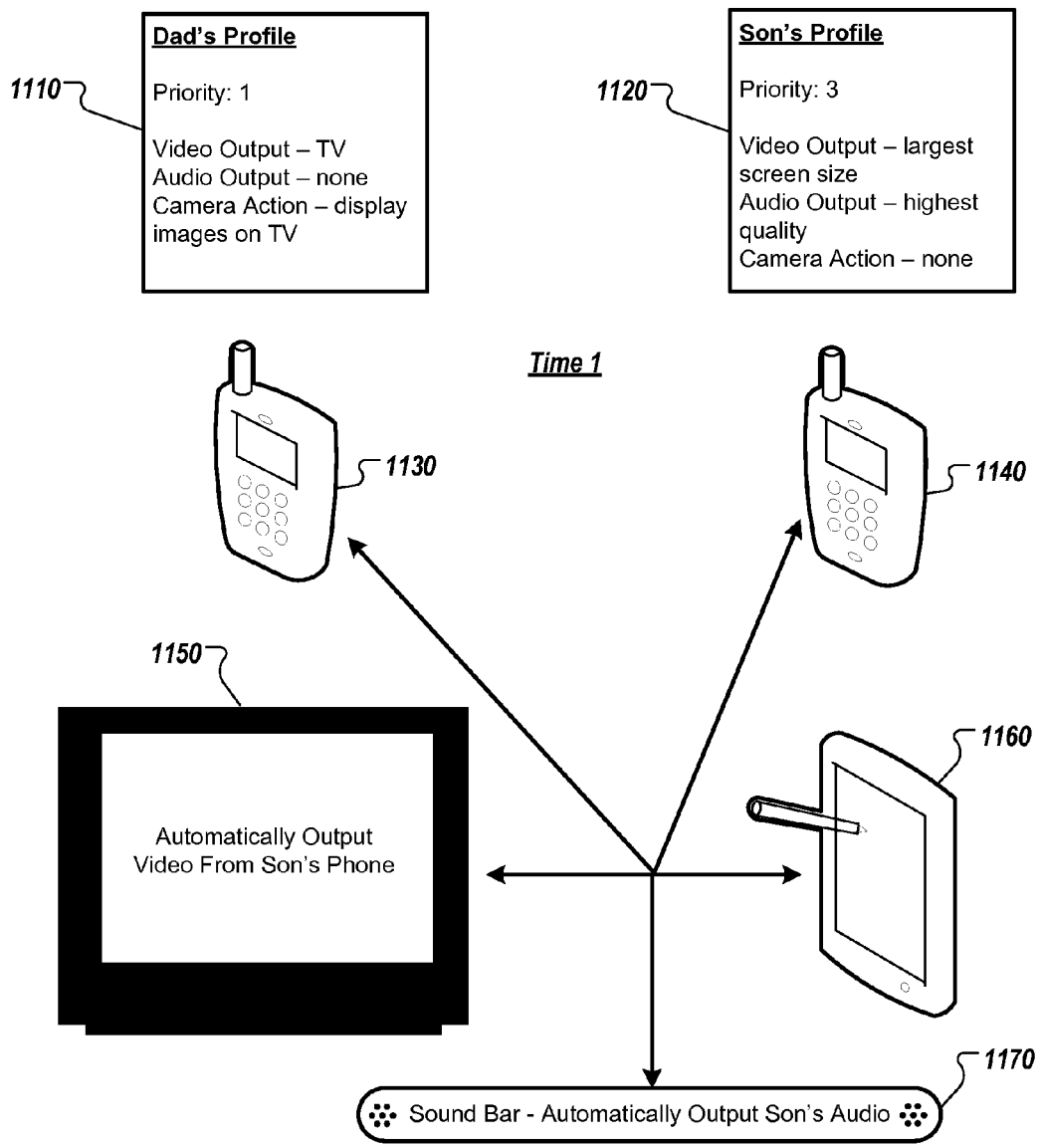
Figure 11B:
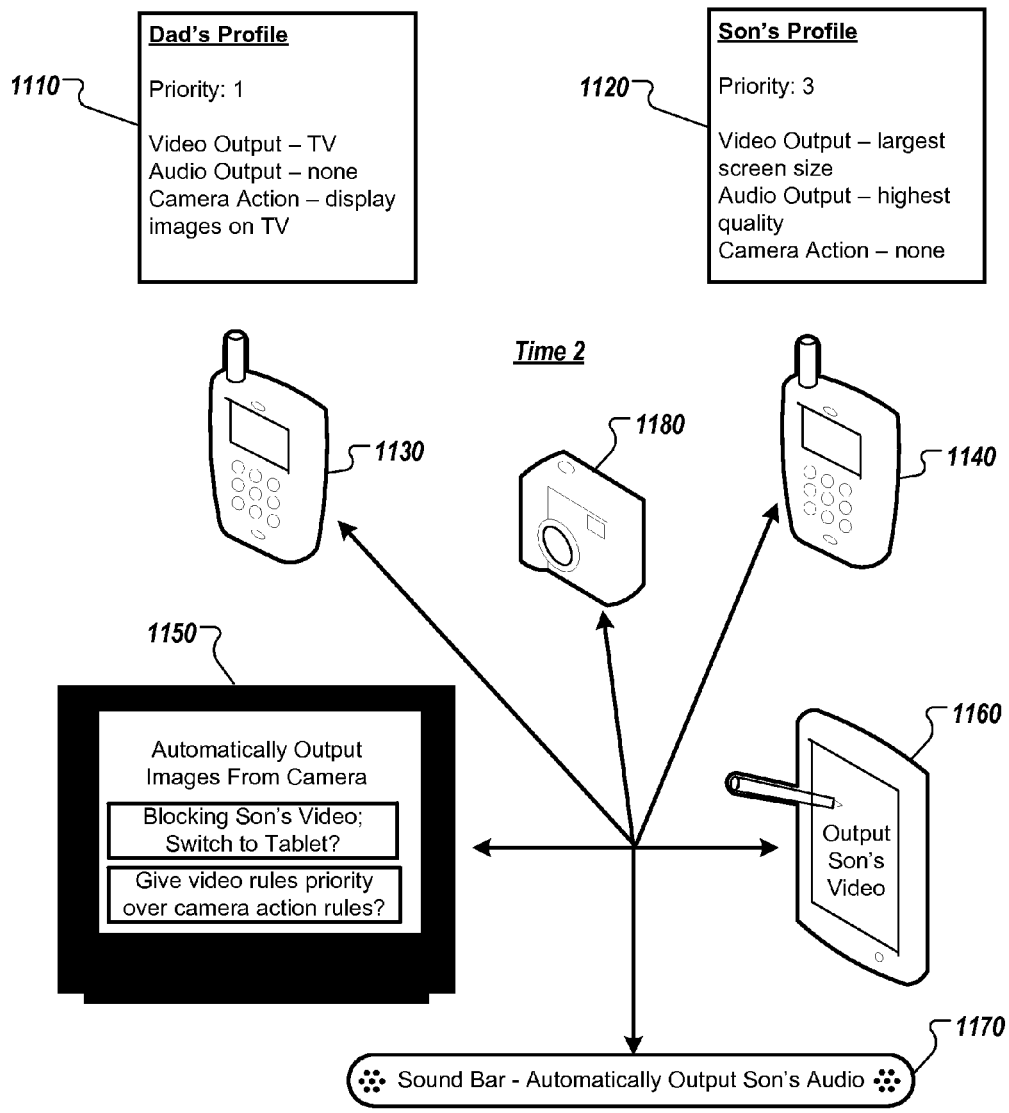

FIGS. 11A and 11B illustrate an example of electronic devices performing automated collaboration based on resolving conflicts in multiple user profiles that exist for the peer-to-peer network. As shown, a first user profile 1110 indicates that the user profile 1110 is associated with a Dad and has a priority level of one. The first user profile 1110 indicates a preference that video output occurs on the TV, no preference for audio output, and a camera action to display images from a digital camera on the TV when a digital camera joins the peer-to-peer network. A second user profile 1120 indicates that the user profile 1120 is associated with a Son and has a priority level of three. The second user profile 1120 indicates a preference that video output occurs on the peer device with the largest screen size, a preference that audio output occurs on the peer device with the highest quality speaker, and no camera action.

At a first time (Time 1 in FIG. 11A), an initialization has been performed by a first smartphone 1130, a second smartphone 1140, a TV 1150, a tablet 1160, and a sound bar 1170. In this regard, the first smartphone 1130, the second smartphone 1140, the TV 1150, the tablet 1160, and the sound bar 1170 are already on the network and all are connected via an Ethernet or Wi-Fi connection.

The first user profile 1110 is maintained on the first smartphone 1130 and the first smartphone 1130 attempts to register the first user profile 1110 on the peer-to-peer network any time the first smartphone 1130 joins the peer-to-peer network. The second user profile 1120 is maintained on the second smartphone 1140 and the second smartphone 1140 attempts to register the second user profile 1120 on the peer-to-peer network any time the second smartphone 1140 joins the peer-to-peer network. In this regard, at the first time (Time 1 in FIG. 11A), the first smartphone 1130 has attempted to register the first user profile 1110 on the peer-to-peer network and the second smartphone 1140 has attempted to register the second user profile 1120 on the peer-to-peer network such that two profiles exist on the peer-to-peer network and are stored on each of the peer devices connected to the peer-to-peer network.

At the first time, the second smartphone 1140 receives input to output a movie that includes video and audio. Because the second smartphone 1140 received the request, the second smartphone 1140 messages the other peer devices of the task to output the movie with an indication that the task is associated with the Son user and the second user profile 1120 should be used for handling the task as long as it does not conflict with the first user profile 1110, which has the higher priority. The first smartphone 1130, the second smartphone 1140, the TV 1150, the tablet 1160, and the sound bar 1170 automatically engage in negotiation to determine how to handle the task of outputting audio and video of the movie. Based on exchanged device capabilities and statuses of the devices connected to the network, each device independently determines that the TV 1150 is the device with the largest screen size and is the device preferred for video output according to the second user profile 1140 and determines that the sound bar 1170 is the device with the highest quality speakers and is the device preferred for audio output according to the second user profile 1140. Because the first user profile 1110 has a higher priority than the second user profile 1120, the devices consult the first user profile 1110 to determine whether the selection of the TV 1150 as the preferred video output device and the selection of the sound bar 1170 as the preferred audio output device conflict with the preferences of the first user profile 1110. Because the first user profile 1110 defines the TV 1150 as the preferred video output device, has no preference for audio output, and the statuses exchanged among the devices in the peer-to-peer network do not indicate that the TV 1150 or the sound bar 1170 are performing tasks for the Dad user at the present time, each device determines that the selection of the TV 1150 as the preferred video output device and the selection of the sound bar 1170 as the preferred audio output device do not conflict with the preferences of the first user profile 1110. The devices connected to the peer-to-peer network then complete the negotiation by exchanging messages indicating the determinations made and reach an agreement that the TV 1150 is the preferred video output device and the sound bar 1170 is the preferred audio output device.

As shown in FIG. 11A, based on the negotiation and agreement, the second smartphone 1140 sends the video content for the movie to the TV 1150 with a request to output the video content and sends the audio content for the movie to the sound bar 1170 with a request to output the audio content. The TV 1150 receives the video content and the request and begins outputting the video of the movie selected on the second smartphone 1140. The sound bar 1170 receives the audio content and the request and begins outputting the audio of the movie selected on the second smartphone 1140. Other than user input to define the second user profile 1120 and select the movie on the second smartphone 1140, all of the actions shown and described with respect to FIG. 11A occur automatically without user input or intervention.

At a second time (Time 2 in FIG. 11B), the first smartphone 1130, the second smartphone 1140, the TV 1150, the tablet 1160, and the sound bar 1170 discover the digital camera 1180 joining the peer-to-peer network. In this regard, when the digital camera 1180 is connected to the network, the first smartphone 1130, the second smartphone 1140, the TV 1150, the tablet 1160, and the sound bar 1170 simultaneously discover the digital camera 1180 and the digital camera 1180 simultaneously discovers the presence of the first smartphone 1130, the second smartphone 1140, the TV 1150, the tablet 1160, and the sound bar 1170 on the same network. The digital camera 1180 communicates, to the first smartphone 1130, the second smartphone 1140, the TV 1150, the tablet 1160, and the sound bar 1170, its device and service descriptions while the first smartphone 1130, the second smartphone 1140, the TV 1150, the tablet 1160, and the sound bar 1170 communicate, to the digital camera 1180, their respective device and service descriptions.

The first smartphone 1130, the second smartphone 1140, the TV 1150, the tablet 1160, the sound bar 1170, and the digital camera 1180 then perform a user profile synchronization process. During the user profile synchronization process, the digital camera 1180 obtains the first user profile 1110 and the second user profile 1120 from either the first smartphone 1130, the second smartphone 1140, the TV 1150, the tablet 1160, or the sound bar 1170 and stores local copies of the first user profile 1110 and the second user profile 1120 in its electronic storage. For instance, the digital camera 1180 may receive the first user profile 1110 from the first smartphone 1130 and receive the second user profile 1120 from the second smartphone 1140 as part of the first smartphone 1130 and the second smartphone 1140 attempting to register their profiles with any new devices that join the peer-to-peer network.

The first smartphone 1130, the second smartphone 1140, the TV 1150, the tablet 1160, the sound bar 1170, and the digital camera 1180 then perform a status synchronization process. During the status synchronization process, the TV 1150 updates the first smartphone 1130, the second smartphone 1140, the tablet 1160, the sound bar 1170, and the digital camera 1180 that it is currently playing video content of a movie. The sound bar 1170 updates the first smartphone 1130, the second smartphone 1140, the TV 1150, the tablet 1160, and the digital camera 1180 that it is currently playing audio content of the movie. The second smartphone 1140 updates the first smartphone 1130, the TV 1150, the tablet 1160, the sound bar 1170, and the digital camera 1180 that it is sending video content of the movie to the TV 1150 and audio content of the movie to the sound bar 1170. The first smartphone 1130, the tablet 1160, and the digital camera 1180 update the devices on the network that they are each on standby and not currently performing a task.

The first smartphone 1130, the second smartphone 1140, the TV 1150, the tablet 1160, the sound bar 1170, and the digital camera 1180 then identify desired user functions. In this regard, all of the devices look up the first user profile 1110 and the second user profile 1120, recognize the desired user scenario for the first user profile 1110 is to output images from the digital camera 1180 on the TV 1150, and recognize the desired user scenario for the second user profile 1120 is to continue outputting video content of the movie on the TV 1150 and audio content of the movie on the sound bar 1170. The devices identify that the two, desired user scenarios conflict and determine that the desired user scenario for the first user profile 1110 should be executed as having the higher priority.

The devices then identify the next best user scenario for the second user profile 1120. In this regard, the devices determine that the audio content of the movie may continue to be output on the sound bar 1170 because that action does not conflict with the desired user scenario for the first user profile 1110. Because the TV 1150 is being used to execute the desired user scenario for the first user profile 1110 and is, thus, not available to execute the desired user scenario for the second user profile 1120, the devices assess the screen sizes of the devices other than the TV 1150 and, based on the assessment, determine that the tablet 1160 has the next largest screen size and should be used as the video output device, other than the TV 1150, that most closely matches the preference of the second user profile 1120. The devices connected to the peer-to-peer network then complete the negotiation by exchanging messages indicating the determinations made and reach an agreement that the TV 1150 is to output images from the digital camera 1180, the tablet 1160 is to output video content of the movie, and the sound bar 1170 is to output audio content of the movie.

As shown in FIG. 11B, based on the negotiation and agreement, the digital camera 1180 sends images to the TV 1150 with a request to output the images. The second smartphone 1140 sends the video content for the movie to the tablet 1160 with a request to output the video content and sends the audio content for the movie to the sound bar 1170 with a request to output the audio content. The TV 1150 receives the images from the digital camera 1180 and the request and begins outputting the images. The tablet 1160 receives the video content and the request and begins outputting the video of the movie selected on the second smartphone 1140. The sound bar 1170 receives the audio content and the request and continues outputting the audio of the movie selected on the second smartphone 1140.

In addition to the automated change of the desired user functions driven by the camera action defined in the first user profile 1110 that has the highest priority, the devices connected to the peer-to-peer network recognize that the desired user scenario for the second user profile 1120 has been preempted and determine to output messages based on the recognition. For instance, as shown, the TV 1150 may recognize that display of the Son's video content of the movie has been preempted by the automated display of the images of the camera in accordance with the Dad's preferred camera action. Based on this recognition, the TV 1150 may output a message indicating that the output of the camera images is blocking the Son's video and provide a control that enables the camera images to be switched to the tablet 1160. In this regard, the Dad user is given the option of easily allowing the Son's video to play in this instance and still view the camera images on a display with a larger size, such as the tablet 1160. The TV 1150 may only allow the switch to occur if the user input to complete the switch is received from the first smartphone 1130, which is the device associated with the Dad user. Based on receiving input from the first smartphone 1130 to complete the switch, the TV 1150 initiates a new negotiation process with the devices connected to the peer-to-peer network, which results in the TV 1150 outputting the video of the movie and the tablet 1160 outputting the camera images.

In addition, the TV 1150 may present the Dad user with the option of demoting the preferred camera action such that the preferred camera action occurs, unless it conflicts with preferred video output of another user profile on the peer-to-peer network. For example, as shown, the TV 1150 may provide a control that enables the Dad user to give video rules priority over camera action rules. In this example, the TV 1150 may only allow the update in priority to occur if the user input to update the priority is received from the first smartphone 1130, which is the device associated with the Dad user. Based on receiving input from the first smartphone 1130 to update the priority, the TV 1150 changes the first user profile 1110 to indicate the change in priority of camera actions relative to video output preferences and sends the update to the other devices connected to the peer-to-peer network. Based on the change, the preferred camera action of the Dad user automatically occurs, unless it conflicts with a video output preference of another user profile that is being used in a desired user scenario that includes video output at the time of the camera action. The first user profile 1110 continues to have higher priority than the second user profile 1120 in areas other than the desired camera action in the first user profile 1110 relative to the video output preference in the second user profile 1120. Other than the described user input to define the user profiles and select actions/controls, all of the actions shown and described with respect to FIG. 11B occur automatically without user input or intervention.

FIG. 12 illustrates an example process 1200 for providing automated device collaboration based on a guest peer device joining the peer-to-peer network. The operations of the process 1200 are described generally as being performed by an electronic device, such as one of the electronic devices included in the system 100. The operations of the process 1200 may be performed by multiple electronic devices connected to a peer-to-peer electronic network or may be performed by one or more processors included in one or more electronic devices.

The electronic device discovers a new electronic device that has a user profile associated with a network other than the peer-to-peer network (1202). For example, the electronic device discovers a new electronic device joining the network and performs a user profile synchronization process with the new electronic device. In this example, the electronic device detects that the user profile of the new electronic device exchanged in the user profile synchronization process is associated with a different network and determines that the new electronic device is a guest to the peer-to-peer network.

The electronic device queries whether the new electronic device would like to accept the registered profile for the peer-to-peer network or negotiate a temporary guest profile (1204). For instance, the electronic device sends a message to the new electronic device asking the new electronic device whether the new electronic device would like to accept the registered profile for the peer-to-peer network or negotiate a temporary guest profile. The new electronic device may respond either accepting the registered profile, in which case the new electronic device complies with the registered profile, or requesting that a temporary guest profile be negotiated.

The electronic device, based on a request to negotiate a temporary guest profile, accesses information from the user profile of the new electronic device (1206). For example, the electronic device may receive the entire user profile from the new electronic device. In another example, the electronic device may receive only a portion of the user profile from the new electronic device. In this example, the new electronic device may have privacy settings defined that indicate which portions of the user profile to share when the new electronic device is a guest of another peer-to-peer network.

The electronic device analyzes the accessed information from the user profile of the new electronic device and the registered profile with respect to guest profile rules defined in the registered profile (1208). For instance, the electronic device compares the information from the user profile of the new electronic device and the registered profile against each other, detects conflicts, and resolves the conflicts by consulting the guest profile rules defined in the registered profile. The guest profile rules also may identify portions of the registered profile that cannot be changed in negotiating a temporary guest profile and the electronic device may ignore the portions of the information from the user profile of the new electronic device that correspond to the portions of the registered profile that cannot be changed.

The electronic device, based on the analysis, defines a temporary guest profile for the peer-to-peer network (1210). For instance, the electronic device determines and stores a temporary guest profile that complies with the guest profile rules and, otherwise, best meets the preferences and user scenarios desired by the user of the electronic device and the guest user of the new electronic device.

The electronic device registers, for the peer-to-peer network, the temporary guest profile (1212). For example, the electronic device stores the temporary guest profile as a registered version and sends the temporary guest profile to other devices connected to the peer-to-peer network. In this example, the electronic device may make the guest profile temporary by assigning a time limit to the guest profile and/or indicating that the guest profile becomes invalid upon the new electronic device leaving the peer-to-peer network.

The electronic device detects the new electronic device leaving the peer-to-peer network (1214). For instance, the electronic device detects that the new electronic device has disconnected from the peer-to-peer network. The discovery of the new electronic device leaving the peer-to-peer network may be performed in accordance with the UPnP and DLNA architectures.

The electronic device, based on detection that new electronic device has left the peer-to-peer network, removes the temporary guest profile and reverts to the previously-registered profile (1216). For example, the electronic device deletes the temporary guest profile from storage and sends messages to other devices connected to the peer-to-peer network indicating that the temporary guest profile is no longer valid. In this example, the electronic device may send messages to the other devices connected to the peer-to-peer network asking the other devices to revert to the previously-stored user profile and/or requesting that another user profile synchronization process be performed.

Figure 13A:
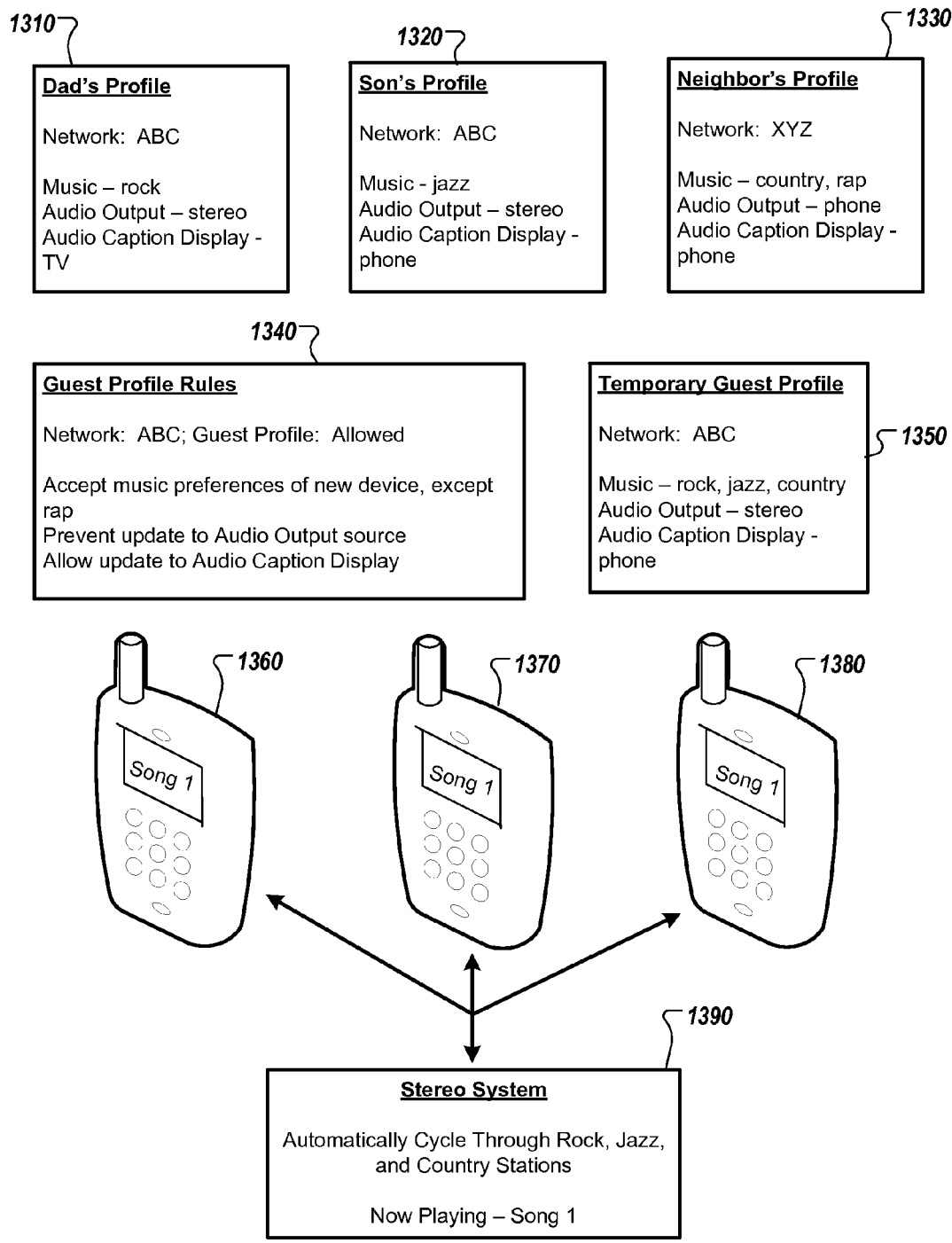
Figure 13B:
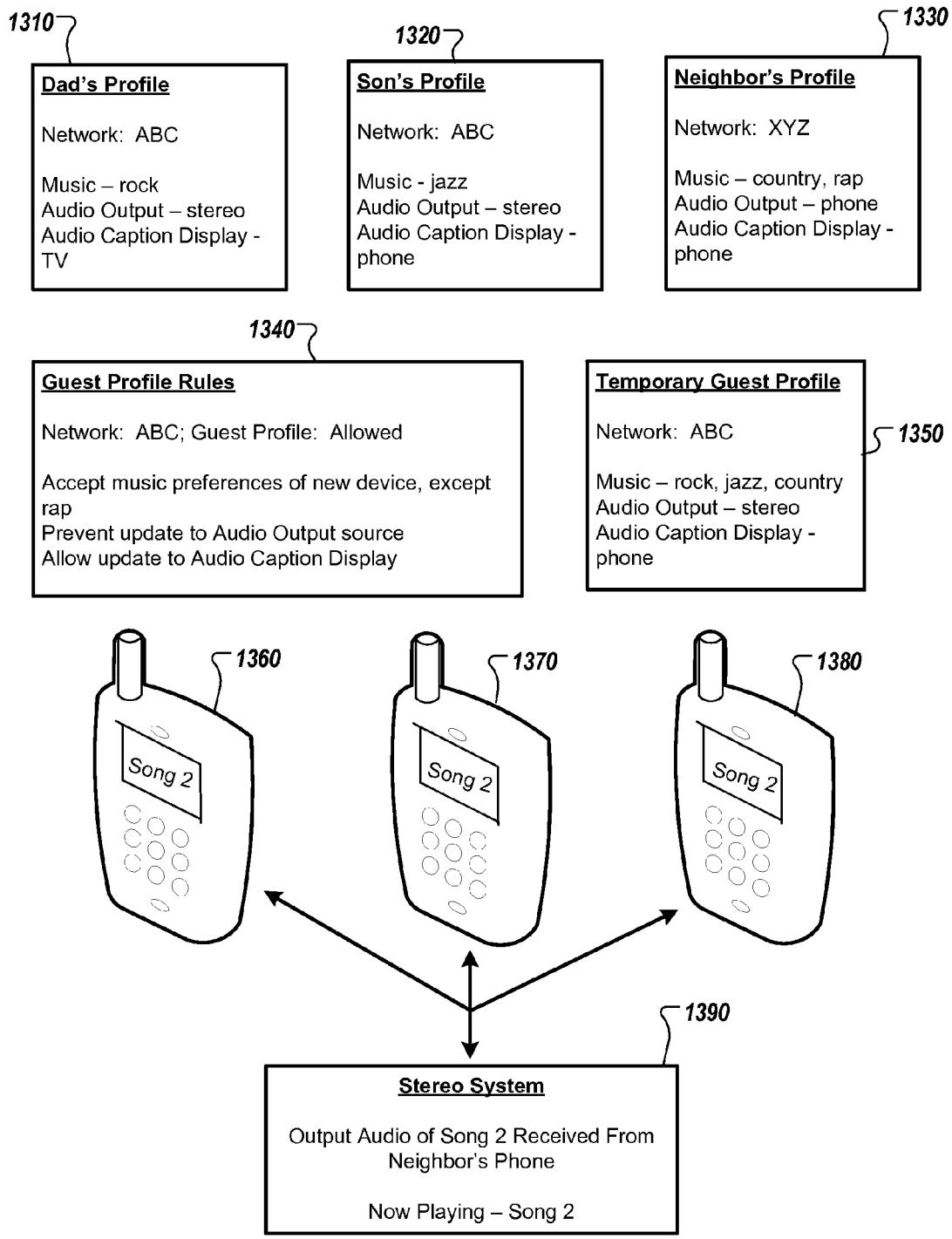

FIGS. 13A and 13B illustrate an example of electronic devices performing automated collaboration based on a temporary guest profile negotiated for the peer-to-peer network. As shown, a first user profile 1310 indicates that the user profile 1310 is associated with a Dad and a network named ABC. The first user profile 1310 indicates a music preference of rock music, a preference for audio output of a stereo system, and an audio caption display preference of a TV. A second user profile 1320 indicates that the user profile 1320 is associated with a Son and the network named ABC. The second user profile 1320 indicates a music preference of jazz music, a preference for audio output of a stereo system, and an audio caption display preference of a phone. A third user profile 1330 indicates that the user profile 1330 is associated with a Neighbor and a network named XYZ. The third user profile 1330 indicates music preferences of country and rap music, a preference for audio output of a phone, and an audio caption display preference of a phone.

As shown in FIG. 13A, an initialization has been performed by a first smartphone 1360, a second smartphone 1370, a third smartphone 1380, and a stereo system 1390. In this regard, the first smartphone 1360, the second smartphone 1370, the third smartphone 1380, and the stereo system 1390 are already on the network and all are connected via an Ethernet or Wi-Fi connection.

The first user profile 1310 is maintained on the first smartphone 1360, the second user profile 1320 is maintained on the second smartphone 1370, and the third user profile 1330 is maintained on the third smartphone 1380. During a user profile synchronization process, the devices recognize that the third user profile 1330 is associated with a different network (e.g., the network in the neighbor's home) than the current peer-to-peer network to which the devices are connected. Based on the recognition that the third user profile 1330 is associated with a different network, the devices determine that the third smartphone 1380 is a guest device and exchange communications regarding whether a temporary guest profile should be established. Because the first smartphone 1360 and the second smartphone 1370 are non-guest members of the peer-to-peer network, the first smartphone 1360 and the second smartphone 1370 negotiate with one another to determine whether a guest profile should be allowed. In this regard, the first smartphone 1360 and the second smartphone 1370 access guest profile rules 1340 defined for the current peer-to-peer network and determine that guest profiles are allowed as long as certain rules are followed. Based on the determination that guest profiles are allowed, the first smartphone 1360 or the second smartphone 1370 send the guest profile rules 1340 to the third smartphone 1380 and initiate a negotiation of a temporary guest profile among the first smartphone 1360, the second smartphone 1370, and the third smartphone 1380. Alternatively, in some examples, the first smartphone 1360 or the second smartphone 1370 may request the third user profile 1330 from the third smartphone 1380 and negotiate the temporary guest profile themselves without input from the third smartphone 1380. In these examples, the first smartphone 1360 or the second smartphone 1370 may simply send the temporary guest profile to the third smartphone 1380 for use after the negotiation completes.

During negotiation of the temporary guest profile, the devices involved in the negotiation exchange profile information for all of the user profiles under consideration in developing the temporary guest profile (e.g., the first user profile 1310, the second user profile 1320, and the third user profile 1330 in FIG. 3). Each device evaluates the exchanged user profile information against the guest profile rules 1340 and attempts to determine a temporary guest profile that best meets the preferences of all users while complying with the guest profile rules 1340.

As shown, the guest profile rules 1340 indicate that music preferences of guest devices should be accepted, unless the music preference corresponds to rap music. The guest profile rules 1340 prevent any update to the preferred audio output source and allow an update to the preferred audio caption display.

In evaluating user profile information against the guest profile rules 1340, the devices involved in the negotiation arrive at a temporary guest profile 1350 assigned to the network ABC. The temporary guest profile 1350 includes music preferences of rock, jazz, and country. The rock portion of the music preferences was taken from the first user profile 1310, the jazz portion of the music preferences was taken from the second user profile 1320, and the country portion of the music preferences was taken from the third user profile 1330. The rap portion of the music preferences in the third user profile 1330 was excluded from the temporary guest profile 1350 based on the guest profile rules 1340. The temporary guest profile 1350 also includes a preferred audio output device of the stereo system 1390, which was determined based on the first user profile 1310 and the second user profile 1320. The preferred audio output device of the third smartphone 1380 from the third user profile 1330 was ignored in determining the temporary guest profile 1350 based on the guest profile rules 1340 preventing any update to the preferred audio output source. The temporary guest profile 1350 further includes a preferred audio caption display device of all phones connected to the network, which was determined based on the first user profile 1310, the second user profile 1320, and the third user profile 1330. The third user profile 1330 was taken into consideration because the guest profile rules 1340 allow an update to the preferred audio caption display device. Because the second user profile 1320 and the third user profile 1330 each define an audio caption display preference of a phone, the phone preference trumps the audio caption display preference of a TV defined by the first user profile 1310. Without the presence of the third user profile 1330, the audio caption display preference of the network would have a conflict between the first user profile 1310 and the second user profile 1320, which would be resolved using any of the techniques described throughout this disclosure for resolving conflicts.

After the temporary guest profile 1350 has been negotiated, the temporary guest profile 1350 is temporarily registered on the peer-to-peer network and tasks related to the peer-to-peer network are carried out in accordance with the temporary guest profile 1350. For example, the first smartphone 1360, the second smartphone 1370, the third smartphone 1380, and the stereo system 1390 all store a copy of the temporary guest profile 1350 and begin taking action in accordance with the temporary guest profile 1350. In this example, as shown in FIG. 13A, the stereo system 1390 (the preferred audio output source) automatically begins cycling through rock, jazz, and country music stations in accordance with the music preferences defined in the temporary guest profile 1350. In addition, because the temporary guest profile 1350 includes a preferred audio caption display device of all phones connected to the network, the stereo system 1390 delivers audio caption information to each of the first smartphone 1360, the second smartphone 1370, and the third smartphone 1380 for display.

The peer-to-peer network also is able to automatically process tasks initiated by guest devices in accordance with the temporary guest profile 1350. As shown in FIG. 13B, the third smartphone 1380 receives a request to play a song (Song 2) that is stored on the third smartphone 1380. Based on the request, the third smartphone 1380 determines that the stereo system 1390 is the preferred audio output source on the peer-to-peer network and begins streaming audio content of the selected song to the stereo system 1390 with a request to output the streaming audio content. The stereo system 1390 receives the streaming audio content and the request and begins outputting the streaming audio content. In addition, the third smartphone 1380 determines that the preferred audio caption display device is all phones connected to the peer-to-peer network. In response to that determination, the third smartphone 1380 outputs the audio caption information for the selected song on its own display and sends the audio caption information for the selected song to the first smartphone 1360 and the second smartphone 1370. The first smartphone 1360 and the second smartphone 1370 receive the audio caption information from the third smartphone 1380 and output the received audio caption information on their own displays.

With this type of guest profile configuration, the peer-to-peer network may provide intelligent and automated coordination of devices when guests come to the property in which the peer-to-peer network is located. When the guest device leaves the network, the temporary guest profile is removed and the peer-to-peer network reverts to the previously-registered profile or resynchronizes the user profiles of the devices that remain connected to the network when the guest leaves. Other than the described user input to define the user profiles/rules and select actions/controls, all of the actions shown and described with respect to FIG. 13B occur automatically without user input or intervention.

Figure 14:
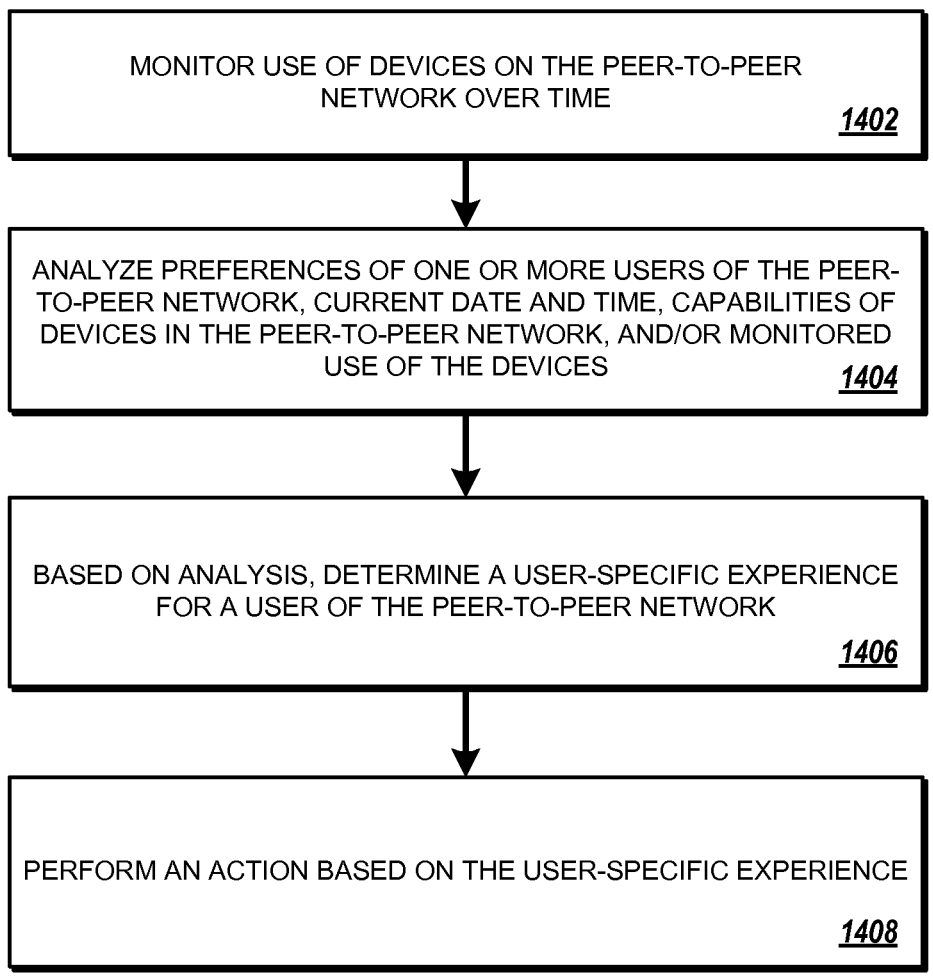

FIG. 14 illustrates an example process 1400 for determining a user-specific experience for a user of the peer-to-peer network. The operations of the process 1400 are described generally as being performed by an electronic device, such as one of the electronic devices included in the system 100. The operations of the process 1400 may be performed by multiple electronic devices connected to a peer-to-peer electronic network or may be performed by one or more processors included in one or more electronic devices.

The electronic device monitors, over time, use of electronic devices on the peer-to-peer network (1402). For example, the electronic device tracks its own actions on the peer-to-peer network and also receives and tracks status updates that describe actions completed by other devices connected to the peer-to-peer network. In this example, the electronic device tracks the actions relative to date and time and generates a log descriptive of the actions taken by devices on the peer-to-peer network over a period of time.

The electronic device analyzes preferences of one or more users of the peer-to-peer network, a current date and time, capabilities of devices in the peer-to-peer network, and/or monitored use of the devices (1404) and, based on the analysis, determines a user-specific experience for a user of the peer-to-peer network (1406). For instance, the electronic device compares the preferences of one or more users of the peer-to-peer network, the current date and time, the capabilities of devices in the peer-to-peer network, and the monitored use of the devices and determines whether the comparison indicates that a user-specific experience is possible for the user. The user-specific experience may be a user-specific recommendation related to how to better use the devices connected to the peer-to-peer network. In addition, the user-specific experience may be a user-specific action that the devices automatically take on the peer-to-peer network.

In some examples, although the user profile provides a general description of desired user scenarios, the peer devices may be equipped with more intelligence to enhance the user's media consumption and sharing experience not explicitly set out in the user profile. For example, the profile for "John" in FIG. 3A generally describes his music preference as follows: Use Seasonal Theme (Yes (enables themes for Christmas, Thanksgiving, Valentine, Halloween, etc.), Music Preference (Classic, Light Rock, Jazz), and Mood Preference (Happy).

The above parameters set out some general guidelines on the user's music preference without explicitly dictating a particular set of songs to play. This provides some leeway for the peer devices to generate a specific user experience based on an analysis of the current time, date, user's mood, and genre and metadata associated with the user's music collection. The peer devices may be able to, based on the results of the analysis, generate a specific music playlist which is suitable for the user's currently stated mood, season (for example, happy and romantic songs if current date is Valentine's day), and other factors. The peer devices may be equipped with the ability to receive and process analytics data on user's viewing or listening behavior (for example, songs repeated, songs skipped, etc. as reported by a peer remote control device) and automatically adjust the process used to generate playlists for the user.

The electronic device performs an action based on the user-specific experience (1408). For instance, the electronic device may provide a user-specific recommendation and/or initiate an automated action on the peer-to-peer network.

Figure 15:
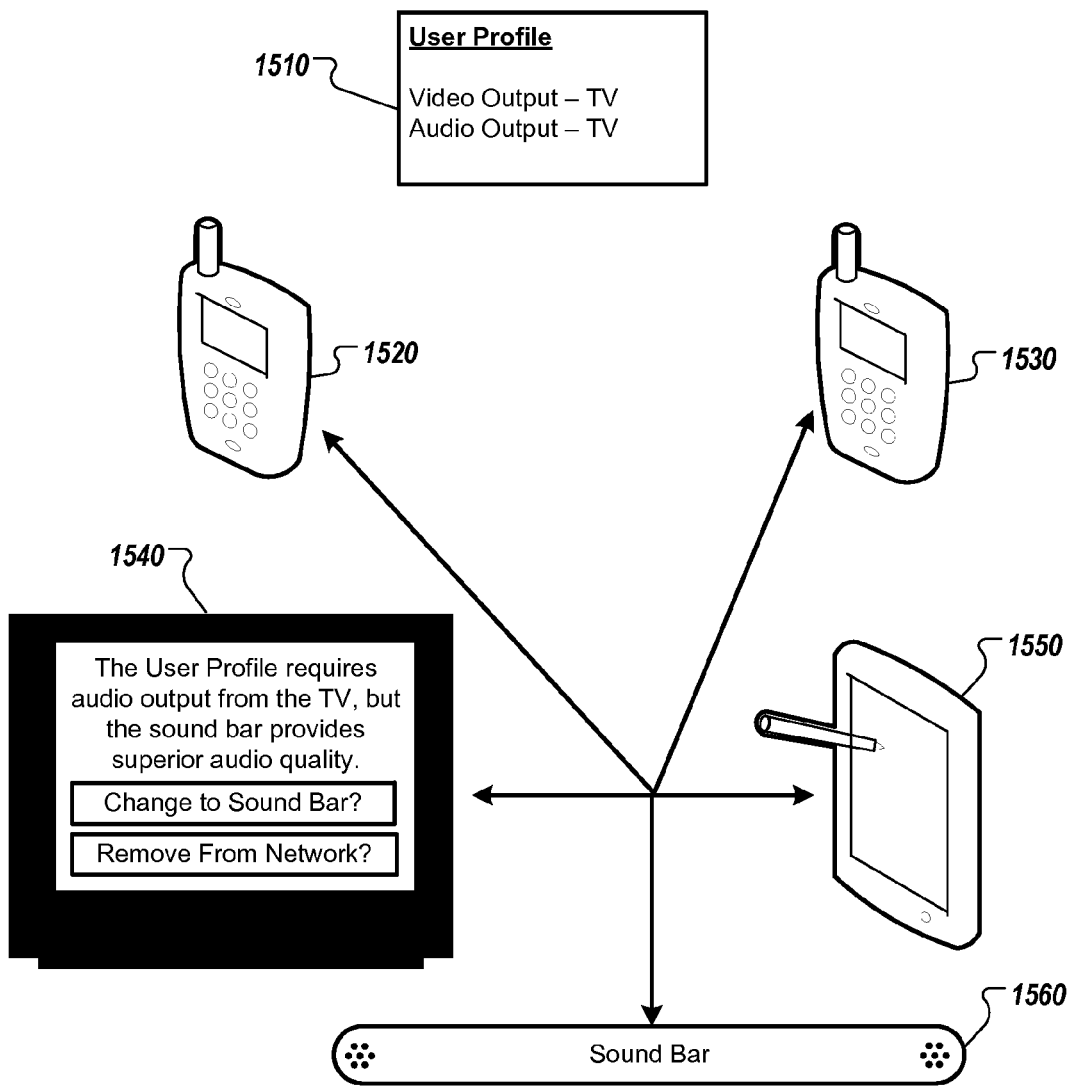

FIG. 15 illustrates an example of providing a user-specific recommendation for configuration of the user profile that controls automated collaboration between the electronic devices connected to the peer-to-peer network. As shown, a user profile 1510 indicates that video content on any device connected to the peer-to-peer network is to be output by a TV and also indicates that audio content on any device connected to the peer-to-peer network is to be output by the TV.

In FIG. 15, an initialization has been performed by a first smartphone 1520, a second smartphone 1530, a TV 1540, a tablet 1550, and a sound bar 1560. In this regard, the first smartphone 1520, the second smartphone 1530, the TV 1540, the tablet 1550, and the sound bar 1560 are connected to the network and store the user profile 1510. The first smartphone 1520, the second smartphone 1530, the TV 1540, the tablet 1550, and the sound bar 1560 perform a negotiation process that involves exchanging capabilities with each other and assessing the exchanged capabilities against the user profile 1510 to determine which device should output video content and which device should output audio content. The first smartphone 1520, the second smartphone 1530, the TV 1540, the tablet 1550, and the sound bar 1560 agree that the TV 1540 should be the device to output video and audio content in accordance with the user profile 1510.

However, the first smartphone 1520, the second smartphone 1530, the TV 1540, the tablet 1550, and the sound bar 1560 also agree that the TV 1540 has the best video output capability of the devices on the network and the sound bar 1560 has the best audio output capability of the devices on the network. Based on the determinations that the TV 1540 should be the device to output video content and that the TV 1540 has the best video output capability, the devices collectively determine that the video output source defined in the user profile 1510 maximizes the display capabilities of the peer-to-peer network and no recommendation should be made related to the video output source preference. However, based on the determinations that the TV 1540 should be the device to output audio content and that the sound bar 1560 has the best audio output capability, the devices collectively determine that the audio output source defined in the user profile 1510 does not maximize the audio capabilities of the peer-to-peer network and a recommendation should be made related to the audio output source preference.

Based on the collective decision to make a recommendation related to the audio output source preference, the television 1540 automatically, without user input, displays a message indicating that the user profile requires audio output from the TV 1540, but that the sound bar 1560 has superior audio output capability. The TV 1540 also displays a first control that enables a user to change the preferred audio output source setting in the user profile 1510 to the sound bar 1560 and displays a second control that enables a user to remove the sound bar 1560 from the network (e.g., if the user does not like audio from the sound bar 1560 or the sound bar 1560 has become obsolete). Based on user input selecting the first control, the TV 1540 updates its local copy of the user profile 1510 and sends changes to the user profile 1510 to the other devices connected to the peer-to-peer network. Based on user input selecting the second control, the TV 1540 updates its peer-to-peer network configuration data to remove the sound bar 1560 from the network and sends requests to the other devices connected to the peer-to-peer network to remove the sound bar 1560. Using the techniques described with respect to FIG. 15, the devices of the peer-to-peer network may effectively collaborate to assist a user in maximizing the capabilities of his or her network and/or manage devices connected to the network.

Figure 16:
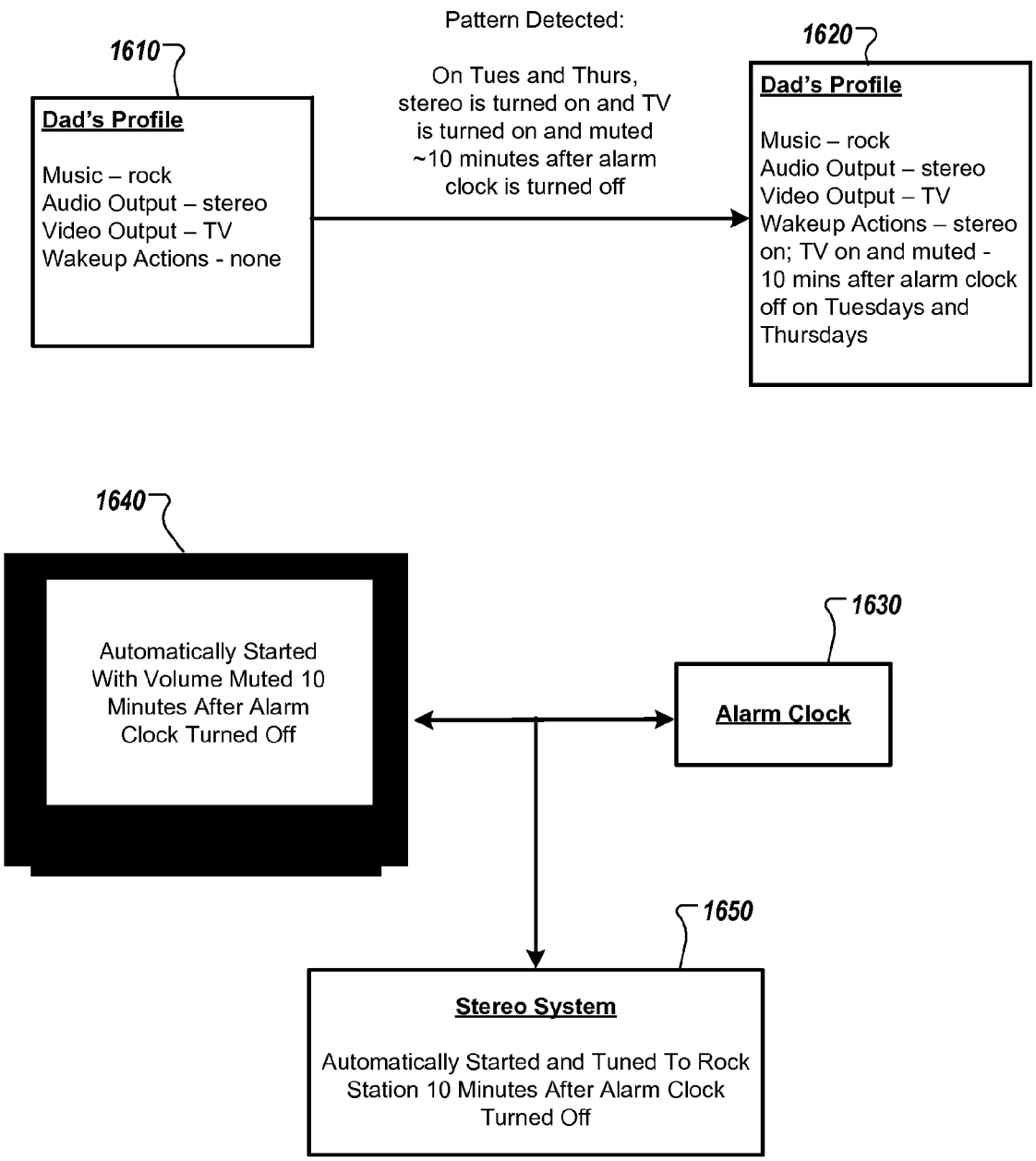

FIG. 16 illustrates an example of a user-specific action taken by electronic devices connected to the peer-to-peer network. As shown, a user profile 1610 initially includes a music preference of rock music, indicates that video content on any device connected to the peer-to-peer network is to be output by a TV, indicates that audio content on any device connected to the peer-to-peer network is to be output by a stereo system, and that no wakeup actions are defined.

In FIG. 16, an initialization has been performed by an alarm clock 1630, a TV 1640, and a stereo system 1650. In this regard, the alarm clock 1630, the TV 1640, and the stereo system 1650 are connected to the network and store the user profile 1610. The alarm clock 1630, the TV 1640, and the stereo system 1650 exchange status communications related to tasks performed on the peer-to-peer network and track, over time, actions taken by each device in relation to the time and date of the action. Over time, each device (or one device agreed upon by the devices connected to the network) develops a log of actions taken by the devices over time. Each device (or the one device agreed upon by the devices connected to the network) then periodically analyzes the log in an attempt to detect a pattern of actions that may be leveraged to provide enhanced convenience to a user of the peer-to-peer network. When one of the electronic devices detects a pattern, that electronic device reports the detected pattern to the other electronic devices connected to the peer-to-peer network and the electronic devices connected to the network negotiate to determine whether to accept the pattern and what action to take if the pattern is accepted.

In the example shown in FIG. 16, the alarm clock 1630, the TV 1640, and the stereo system 1650 have detected a pattern that, on Tuesday and Thursday mornings, the stereo system 1650 is turned and the TV 1640 is turned on and muted on average ten minutes after the alarm clock 1630 is turned off. The alarm clock 1630, the TV 1640, and the stereo system 1650 assess whether the detected pattern relates to any of the automated actions the peer-to-peer network is able to perform. In this example, the alarm clock 1630, the TV 1640, and the stereo system 1650 determine that the detected pattern relates to a wakeup action that the peer-to-peer network is able to perform since the actions occur in response to an alarm clock event. Accordingly, the alarm clock 1630, the TV 1640, and the stereo system 1650 determine to automatically update the user profile 1610 to include a wakeup action that corresponds to the detected pattern. As shown, the user profile 1610 is modified to an updated user profile 1620 to include a wake up action that corresponds to the detected pattern. The updated user profile 1620 is registered on the network and the alarm clock 1630, the TV 1640, and the stereo system 1650 begin using the updated user profile 1620 for automated collaboration. In this regard, as shown in FIG. 16, on Tuesday and Thursday mornings, the alarm clock 1620 reports its status of being turned off to the TV 1640 and the stereo system 1650. The TV automatically turns on with the volume muted ten minutes after it receives the turned off status from the alarm clock 1630. The stereo system 1650 automatically turns on and tunes to a rock station ten minutes after it receives the turned off status from the alarm clock 1630. The stereo system 1650 tunes to a rock station based on the music preference in the updated user profile 1620 being a preference for rock music. The update to the user profile and performance of the wakeup action described with respect to FIG. 16 occur without user input or intervention.

FIG. 17 illustrates an example process 1700 for determining how to handle a task in a peer-to-peer network based on a location of a user within a property in which the peer-to-peer network resides. The operations of the process 1700 are described generally as being performed by an electronic device, such as one of the electronic devices included in the system 100. The operations of the process 1700 may be performed by multiple electronic devices connected to a peer-to-peer electronic network or may be performed by one or more processors included in one or more electronic devices.

The electronic device determines a location of a user within a property in which the peer-to-peer network is located (1702). For example, the electronic device may determine the location of the user within the property based on output of sensors that are connected to the peer-to-peer network. In this example, the peer-to-peer network may include one or more presence sensors (e.g., motion sensors) that detect presence of users in the property. The presence sensors may be assigned to specific locations in the property and may be defined as being located near certain devices in the peer-to-peer network.

In some implementations, the electronic device may determine the location of the user within the property based on pinging communications exchanged with a mobile device of the user. In these implementations, the mobile device of the user may send communications over a short-range wireless communication protocol, the other devices on the peer-to-peer network may or may not receive the communications, and the other devices on the peer-to-peer network negotiate with each other to determine which devices the mobile device of the user is near based on which devices received communications and the timing of receipt of those communications.

The electronic device determines how to handle a task based on the user profile and the determined location (1704). For example, the electronic device determines which devices the user that is experiencing the action performed by the peer-to-peer network is near and determines how to handle a task based on the user profile and the devices that are near the user. In this example, the electronic device only may consider the devices that are near the user in assessing the user profile and determining how to handle a particular task.

The electronic device handles the task based on the determination (1706). For instance, the electronic device handles the task using one or more devices that are near the user associated with the task.

Figure 18:
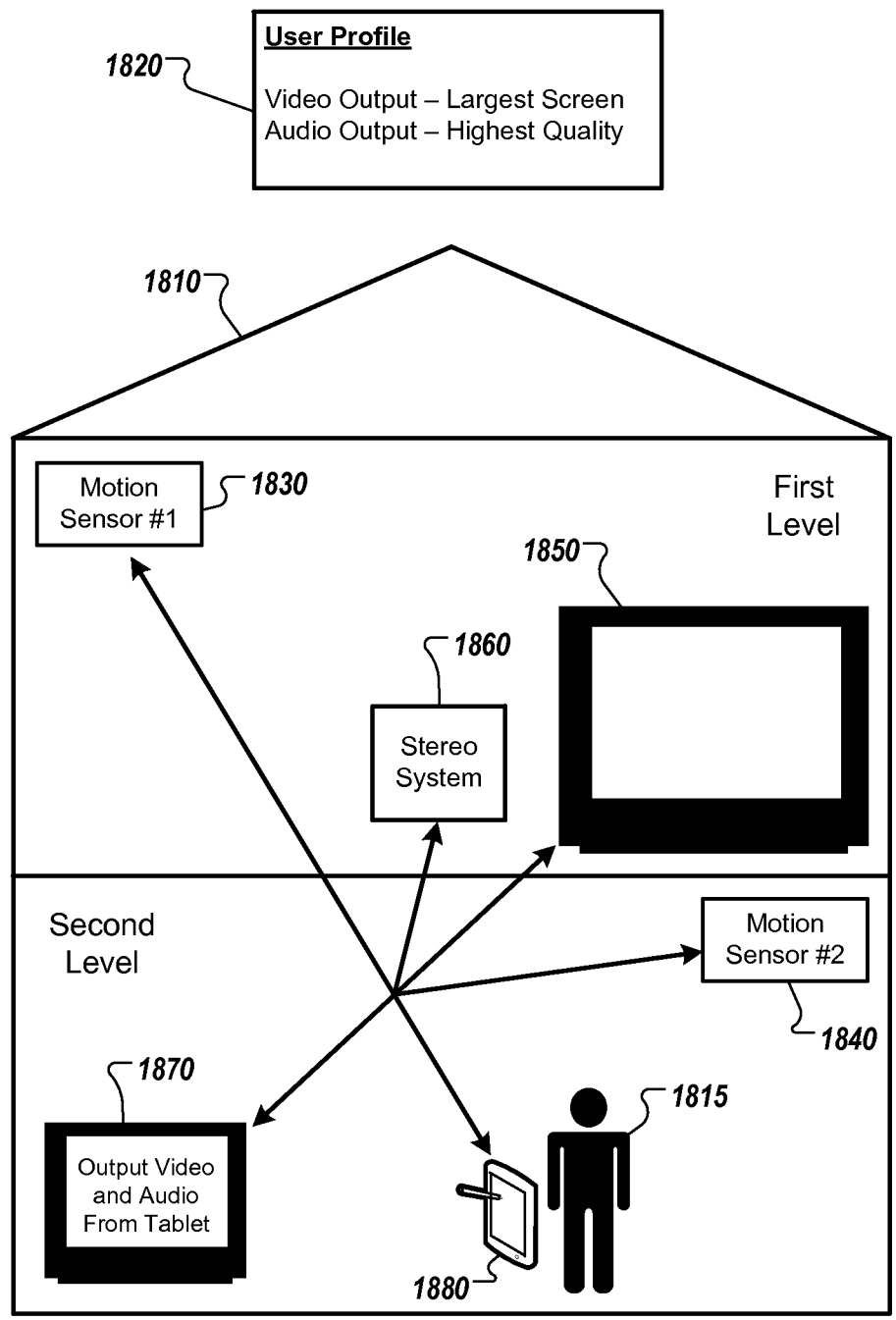

FIG. 18 illustrates an example of determining how to handle a task in a peer-to-peer network based on a location of a user within a property in which the peer-to-peer network resides. As shown, a peer-to-peer network is located in a property 1810 of a user 1815. In this example, the property 1810 is a home with several consumer electronic devices located in the home.

Automated collaboration of devices in the peer-to-peer network is governed by a user profile 1820 that indicates that video content on any device connected to the peer-to-peer network is to be output by the device on the peer-to-peer network that has the largest screen size. The user profile 1820 also indicates that audio content on any device connected to the peer-to-peer network is to be output by the device on the peer-to-peer network that has the highest quality speaker.

In FIG. 18, an initialization has been performed by a first motion sensor 1830, a second motion sensor 1840, a first TV 1850, a stereo system 1860, a second TV 1870, and a tablet 1880. In this regard, the first motion sensor 1830, the second motion sensor 1840, the first TV 1850, the stereo system 1860, the second TV 1870, and the tablet 1880 are connected to the network. The user profile 1820 resides on the first motion sensor 1830, the second motion sensor 1840, the first TV 1850, the stereo system 1860, the second TV 1870, and the tablet 1880. The first motion sensor 1830, the second motion sensor 1840, the first TV 1850, the stereo system 1860, the second TV 1870, and the tablet 1880 perform a negotiation process that involves exchanging capabilities with each other and assessing the exchanged capabilities against the user profile 1820 to determine which device should output video content and which device should output audio content. In this regard, the devices exchange screen size information and quality ratings for audio output capability. Each device independently compares the received screen sizes and quality ratings against its own screen size and quality rating and makes a determination that the first TV 1850 is the device that should output video content and the stereo system 1860 is the device that should output audio content to best meet the desired functionality of the user profile 1820 because the first TV 1850 has the largest screen size and the stereo system 1860 has the highest quality speakers. The first motion sensor 1830, the second motion sensor 1840, the first TV 1850, the stereo system 1860, the second TV 1870, and the tablet 1880 exchange communications to confirm the agreement that the first TV 1850 is the device that should output video content and the stereo system 1860 is the device that should output audio content when a location of a user is unknown.

In addition, the first motion sensor 1830, the second motion sensor 1840, the first TV 1850, the stereo system 1860, the second TV 1870, and the tablet 1880 are intelligent enough to recognize that the first motion sensor 1830 has been assigned to detect user presence in an area proximate to the first TV 1850 and the stereo system 1860 (e.g., the first level of the property 1810) and that the second motion sensor 1840 has been assigned to detect user presence in an area proximate to the second TV 1870 (e.g., the second level of the property 1810). With this recognition, the first motion sensor 1830, the second motion sensor 1840, the first TV 1850, the stereo system 1860, the second TV 1870, and the tablet 1880 agree to establish intelligent automation that provides the best user experience in accordance with user presence. Accordingly, the first motion sensor 1830, the second motion sensor 1840, the first TV 1850, the stereo system 1860, the second TV 1870, and the tablet 1880 agree that the first TV 1850 is the device that should output video content and the stereo system 1860 is the device that should output audio content when the first motion sensor 1830 detects motion proximate to the first TV 1850 and the stereo system 1860 (e.g., motion on the first level of the property 1810). Also, the first motion sensor 1830, the second motion sensor 1840, the first TV 1850, the stereo system 1860, the second TV 1870, and the tablet 1880 agree that the second TV 1870 is the device that should output video and audio content when the second motion sensor 1840 detects motion proximate to the second TV 1870 (e.g., motion on the second level of the property 1810). The second TV 1870 is selected because the second TV 1870 has the largest screen size and highest audio output capability of devices proximate to the second motion sensor 1840.

In the example shown in FIG. 18, the tablet 1880 receives input to output a movie that includes video and audio. As shown, the user 1815 is located on the second level proximate to the second TV 1870 when the input is received. Based on the negotiations described above (which may occur before or after the input to output the movie is received), the tablet 1880 monitors for status events communicated by the first motion sensor 1830 and the second motion sensor 1840. Because no one is located on the first level of the property 1810, the first motion sensor 1830 does not report any status events and the tablet 1880 determines that no users are known to be located on the first level of the property proximate to the first TV 1850 and the stereo system 1860. Because the user 1815 is located on the second level of the property 1810, the second motion sensor 1840 reports one or more motion events and the tablet 1880 determines that a user is known to be located on the second level of the property proximate to the second TV 1870. Based on the analysis of the motion sensor events, the tablet 1880 determines that the second TV 1870 should output video content and audio content for the movie, even though the first TV 1850 has a larger screen size and the stereo system 1860 has better audio output capability. The tablet 1880 sends the video content and the audio content for the movie to the second TV 1870 with a request to output the video content and the audio content. The second TV 1870 receives the video content, the audio content, and the request and begins outputting the video and audio of the movie selected on the tablet 1880. Other than user input to define the user profile 1820, assign the motion sensors to locations in the property relative to devices in the property, and select the movie on the tablet 1880, all of the actions shown and described with respect to FIG. 18 occur automatically without user input or intervention.

Figure 19:
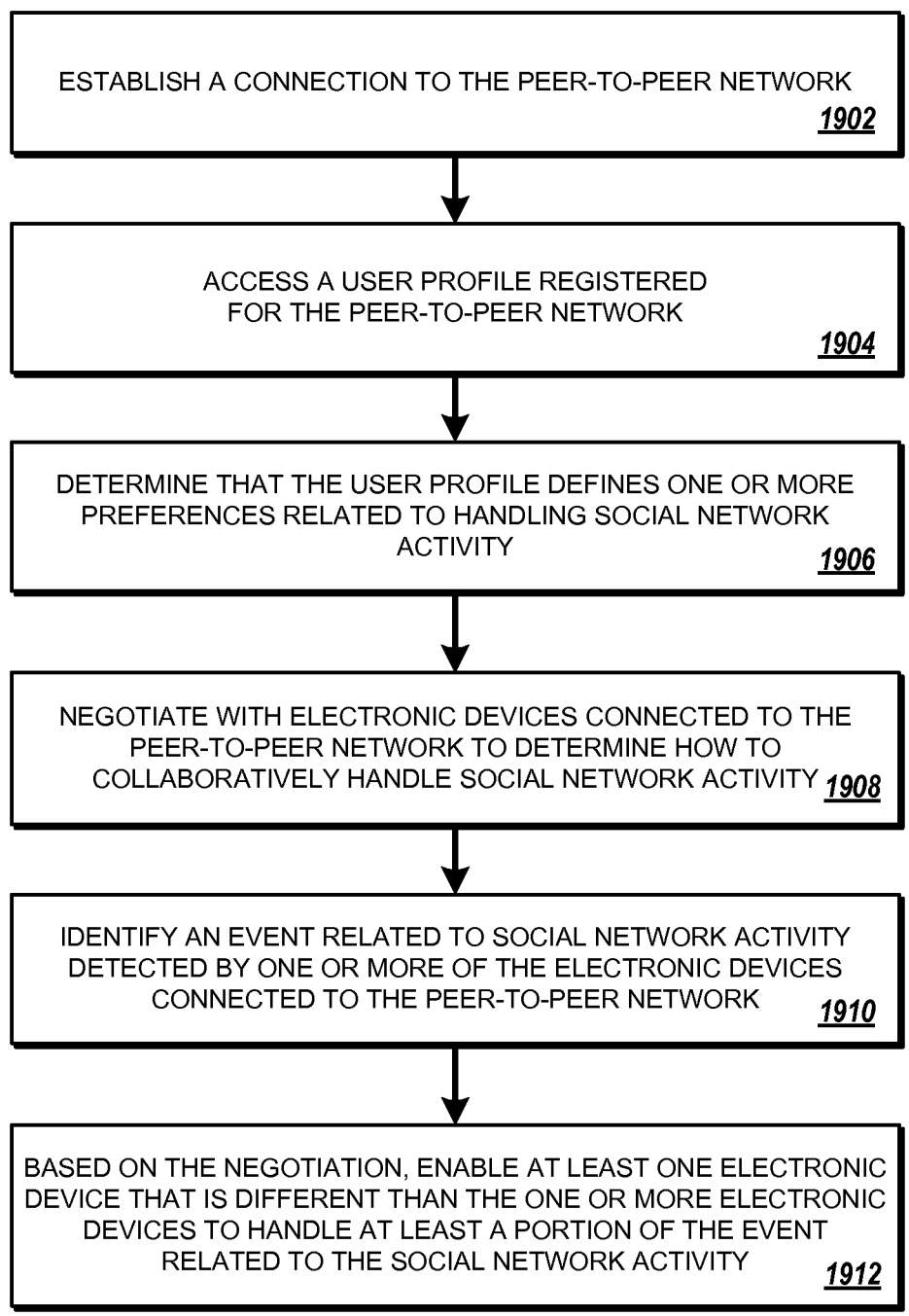

FIG. 19 illustrates an example process 1900 for providing automated device collaboration to handle social network activity within a peer-to-peer network. The operations of the process 1900 are described generally as being performed by an electronic device, such as one of the electronic devices included in the system 100. The operations of the process 1900 may be performed by multiple electronic devices connected to a peer-to-peer electronic network or may be performed by one or more processors included in one or more electronic devices.

The electronic device establishes a connection to the peer-to-peer network (1902). The electronic device may establish a connection to the peer-to-peer network using techniques similar to those described above with respect to reference numeral 202 in FIG. 2.

The electronic device accesses a user profile registered for the peer-to-peer network (1904). For instance, the electronic device accesses a user profile from its electronic storage or receives a user profile from another electronic device connected to the peer-to-peer network as part of a user profile synchronization process.

The electronic device determines that the user profile defines one or more preferences related to handling social network activity (1906). For example, the electronic device evaluates the user profile for provisions related to social network activity and identifies provisions in the user profile that relate to social network activity. In this example, the electronic device identifies portions of the user profile that define how to handle, on the peer-to-peer network, social network activity detected by one or more of the electronic devices connected to the peer-to-peer network.

The electronic device negotiates with electronic devices connected to the peer-to-peer network to determine how to collaboratively handle social network activity (1908). For example, the user profile for the peer-to-peer network may include rules for automated handling of social network activity that are controlled by capabilities (e.g., screen size, audio output quality, connectivity speed, processing power, battery life, etc.) of electronic devices connected to the peer-to-peer network. In this example, the electronic device may exchange, with the electronic devices connected to the peer-to-peer network, capabilities of the electronic devices connected to the peer-to-peer network, evaluate the exchanged capabilities against the rules for automated collaboration that are controlled by capabilities of electronic devices connected to the peer-to-peer network, and determine how to collaboratively handle social network activity based on the evaluation of the exchanged capabilities against the rules for automated collaboration that are controlled by capabilities of electronic devices connected to the peer-to-peer network.

In some implementations, the electronic device detects a conflict between a first electronic device and a second electronic device each requesting handling of a particular type of social networking task. In these implementations, the electronic device may resolve to the conflict in a variety of ways. For example, the electronic device may resolve the detected conflict in a manner specified in the peer-to-peer intelligence for resolving conflicts. In this example, the electronic device may receive, from devices connected to the peer-to-peer network, votes for how to resolve the detected conflict and resolve the detected conflict based on the votes received from devices connected to the peer-to-peer network. Further, in this example, the devices connected to the peer-to-peer network agree to abide by the votes of the other devices and the device receiving the most votes accepts responsibility for performing the particular type of action with respect to social network activity.

In another example, the electronic device accesses a first priority associated with a first electronic device and a second priority associated with a second electronic device, compares the first priority with the second priority, and resolves the detected conflict based on the comparison of the first priority with the second priority. In this example, the first and second priorities may be assigned by a user in the user profile and the electronic device resolves the conflict in favor of the device with the higher priority. The first and second priorities also may relate to timing priorities associated with how long ago the devices joined the peer-to-peer network. In some cases, devices that joined the network more recently will be given higher priority and, in other cases, devices that have been part of the network for a longer duration will be given higher priority.

The electronic device identifies an event related to social network activity detected by one or more of the electronic devices connected to the peer-to-peer network (1910). For example, the electronic device detects a posting on the user's social network. In this example, the posting on the social network may relate to any information that may be exchanged over a social network. The event may be detected directly by the electronic device or communicated to the electronic device by another electronic device that directly detected the event. In addition, the event related to social network activity may be an event of a device logged into a social networking platform joining the network.

The electronic device, based on the negotiation, collaborates with at least one electronic device that is unable to access the social network in a manner that results in the at least one electronic device handling at least a portion of the event related to the social network activity (1912). For instance, the electronic device may collaborate with the at least one electronic device in a manner that results in the at least one electronic device handling all of the event related to the social network activity at the at least one electronic device. Alternatively, in some examples, the electronic device may collaborate with the at least one electronic device in a manner that results in the at least one electronic device handling a first portion of the event related to the social network activity at the at least one electronic device by performing a part of an action related to the social network activity at the at least one electronic device. In these examples, the electronic device handles a second portion of the event at the electronic device by performing a second part of the action related to the social network activity at the electronic device.

Figure 20:
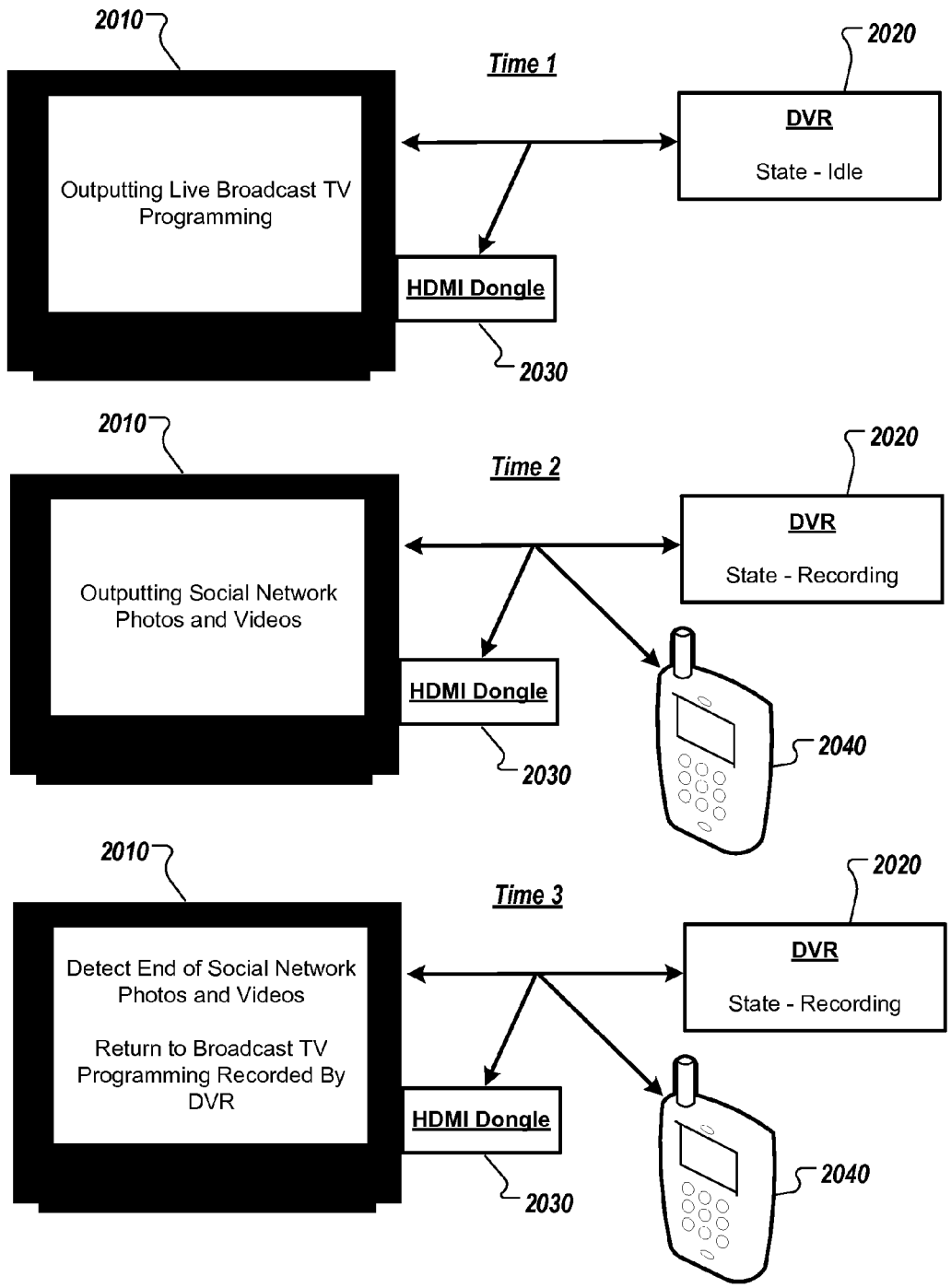

FIG. 20 illustrates an example of providing automated device collaboration to handle social network activity within a peer-to-peer network. In this example, devices on the peer-to-peer network automatically collaborate to perform social network feed viewing on a TV via an HDMI dongle.

As shown in FIG. 20, a home environment includes four connected consumer electronic devices with each device having the peer-to-peer intelligence described throughout this disclosure embedded therein. The devices include an HDMI dongle 2030 connected to a TV, a TV 2010 (Internet connected), a smartphone 2040 (currently running a social network application, such as a Facebook application), and a DVR 2020 (Internet connected).

A user has already specified in his user profile the desired use scenarios when these four devices are connected. For example, the user profile 300 shown in FIG. 3A is an example of a user profile that defines the desired use scenarios when the four devices are connected. The desired user scenario is that, when the user's smartphone 2040 is running a social network application, such as a Facebook application and is brought to the vicinity of the HDMI dongle 2030, which is plugged into the TV 2010, the user wants all photos and videos included in the user's social network (e.g., FaceBook newsfeed) to be automatically played on the TV 2010 via the HDMI dongle 2030. In some examples, the HDMI dongle 2030 may be an Android based device, such as Chromecast from Google.

At a first time (Time 1 in FIG. 20), an initialization has been performed by the TV 2010, the DVR 2020, and the HDMI dongle 2030. In this regard, the HDMI dongle 2030, the TV 2010, and the DVR 2020 are already on the network and all are connected via an Ethernet or a wireless connection. The user has previously entered his user profile information (e.g., the user profile 300 shown in FIG. 3A) via a web interface using the TV 2010. The user profile resides on the TV 2010, the DVR 2020, and the HDMI dongle 2030. At the first time, the TV 2010 is outputting live broadcast television programming and the DVR 2020 and the HDMI dongle 2030 are idle.

At a second time (Time 2 in FIG. 20), the smartphone 2040 running the user's social network (e.g., FaceBook) application is brought to the vicinity of the network and connected to the network via a wireless connection, such as Wi-Fi, and the TV 2010, the HDMI dongle 2030, and the DVR 2020 simultaneously discover the presence of the smartphone 2040 and the smartphone 2040 simultaneously discovers the presence of the TV 2010, the HDMI dongle 2030, and the DVR 2020 on the same network. The smartphone 2040 communicates with the other three devices its device and service descriptions and the application it is currently running (e.g., the social network application) while the TV 2010, the HDMI dongle 2030, and the DVR 2020 communicate with the smartphone 2040 their respective device and service descriptions.

The TV 2010, the DVR 2020, the HDMI dongle 2030, and the smartphone 2040 then perform a user profile synchronization process. During the user profile synchronization process, the smartphone 2040 obtains the latest user profile from either the TV 2010, the DVR 2020, or the HDMI dongle 2030 and stores a local copy of the user profile in its storage.

The TV 2010, the DVR 2020, the HDMI dongle 2030, and the smartphone 2040 then perform a status synchronization process. During the status synchronization process, the TV 2010 updates the smartphone 2040, the HDMI dongle 2030, and the DVR 2020 that it is currently playing a particular television program. The DVR 2020 updates the TV 2010, the HDMI dongle 2030, and the smartphone 2040 that it is on standby and there are no active recording sessions.

The TV 2010, the DVR 2020, the HDMI dongle 2030, and the smartphone 2040 then identify desired user functions. All four devices look up the user profile and recognize the desired user scenario is to play chronologically all photos and videos included in the user's social network (e.g., Facebook) newsfeed to the HDMI dongle 2030 controlled TV 2010 and that any program currently playing on the TV 2010 is to be preempted and redirected to the DVR 2020.

The TV 2010, the DVR 2020, the HDMI dongle 2030, and the smartphone 2040 then engage in peer negotiations. The HDMI dongle 2030 determines when it is ready to login to the user's social network account (e.g., account on FaceBook) and retrieve photos and stream videos from the user's social network account (e.g., account on FaceBook) according to a certain playback sequence. Social networking platforms, such as Facebook, LinkedIn, Twitter, Pinterest, etc., offer a rich set of API's available to retrieve photos and videos uploaded by users and shown in the user's newsfeed. The HDMI dongle 2030 informs the TV 2010 and the smartphone 2040 of its current state. The TV 2010 determines it is currently playing a TV program and negotiates with the DVR 2020 to begin recording the currently playing TV program on the DVR 2020. The DVR 2020 replies that it is currently idle and can immediately accept the TV's 2010 request. The DVR 2020 starts recording the currently playing TV program.

The TV 2010 and the HDMI dongle 2030 reply to the smartphone 2040 that each are now available to play photos and stream videos from the user's social network (e.g., Facebook) account and the smartphone 2040 immediately launches a remote control application to help the user navigate the user's photo and video playback on the TV 2010 via the HDMI dongle 2030.

The HDMI dongle 2030 continuously monitors the progress of photo playback and video streaming from the user's social network (e.g., Facebook) account including monitoring any possible user input, such as fast forward, pause, stop, or rewind commands sent from the smartphone 2040. At a third time (Time 3 in FIG. 20), the HDMI dongle detects that it has reached the end of the user's photos or video streams and updates the TV 2010, the smartphone 2040, and the DVR 2020 of this condition. The TV 2010 negotiates with the DVR 2020 to start playing the preempted TV program already recorded on the DVR 2020 to the TV 2010. The DVR 2020 replies to the TV's 2010 request and begins playing, on the TV 2010, the program just recorded. The smartphone 2040 exits the remote control application.

The smartphone 2040 exits the network. The TV 2010, the HDMI dongle 2030, and the DVR 2020 detect the departure of the smartphone 2040 and remove the presence of the smartphone 2040 from their respective internal data store.

Figure 21:
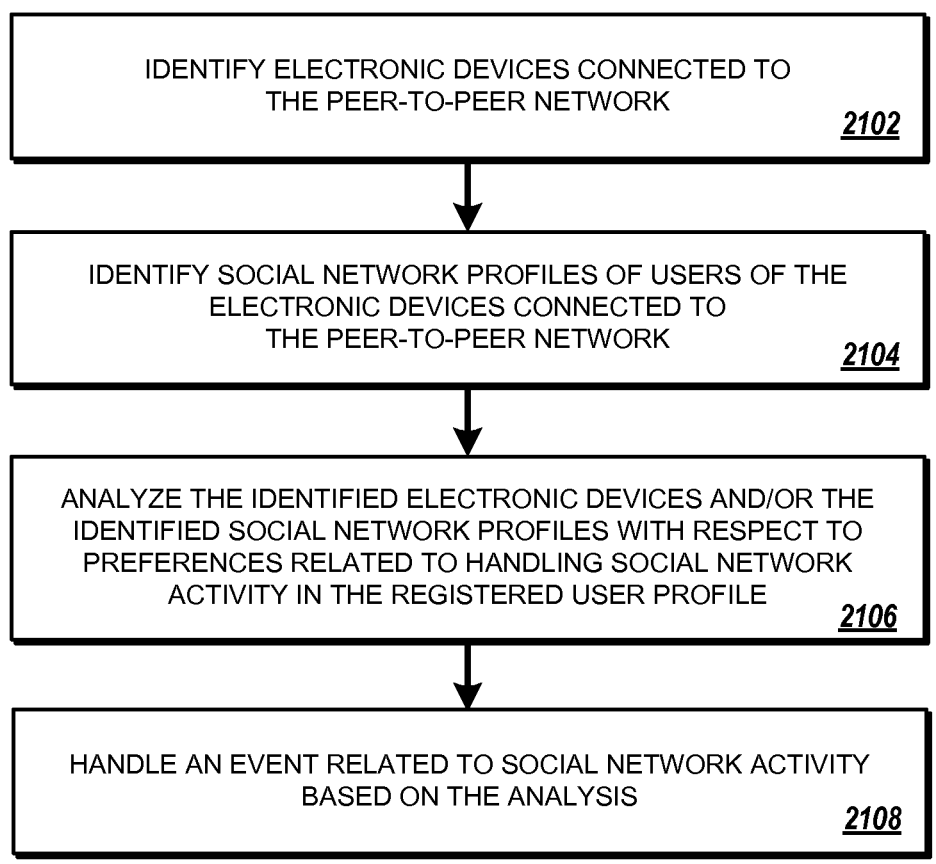

FIG. 21 illustrates an example process 2100 for accounting for presence of electronic devices and/or social network profiles in handling social network activity within a peer-to-peer network. The operations of the process 2100 are described generally as being performed by an electronic device, such as one of the electronic devices included in the system 100. The operations of the process 2100 may be performed by multiple electronic devices connected to a peer-to-peer electronic network or may be performed by one or more processors included in one or more electronic devices.

The electronic device identifies electronic devices connected to the peer-to-peer network (2102). For instance, the electronic device accesses device identifiers from the electronic devices connected to the peer-to-peer network.

The electronic device identifies social network profiles of users of the electronic devices connected to the peer-to-peer network (2104). For example, the electronic device identifies devices that are connected to the peer-to-peer network and that are running an application connected to a social network. In this example, the electronic device queries the identified devices for information related to the social network profile of the user connected to the social network and receives one or more social network profiles based on the queries.

The electronic device analyzes the identified electronic devices and/or the identified social network profiles with respect to preferences related to handling social network activity in the registered user profile (2106). For instance, the electronic device compares the identified electronic devices to a list of devices that are allowed to view social network activity of the user and devices that are not allowed to view social network activity of the user. The electronic device also determines whether the users associated with the identified social network profiles are connected to the user in the user's social network. If the electronic devices are allowed to view social network activity of the user or are connected to the user in the user's social network, the electronic device determines that the corresponding devices are able to view the social network activity of the user. If the electronic devices are not allowed to view social network activity of the user or are not connected to the user in the user's social network, the electronic device determines that the corresponding devices are not able to view the social network activity of the user.

The electronic device handles an event related to social network activity based on the analysis (2108). For example, the electronic device may maintain the event related to social network activity as a private event that is viewable only on the mobile device to which the social network is accessible. In another example, the electronic device may publish the event related to social network activity as a public event on a common device, such as a television, that is potentially viewable by multiple users. The common device may not be able to access the social network.

Figure 22A:
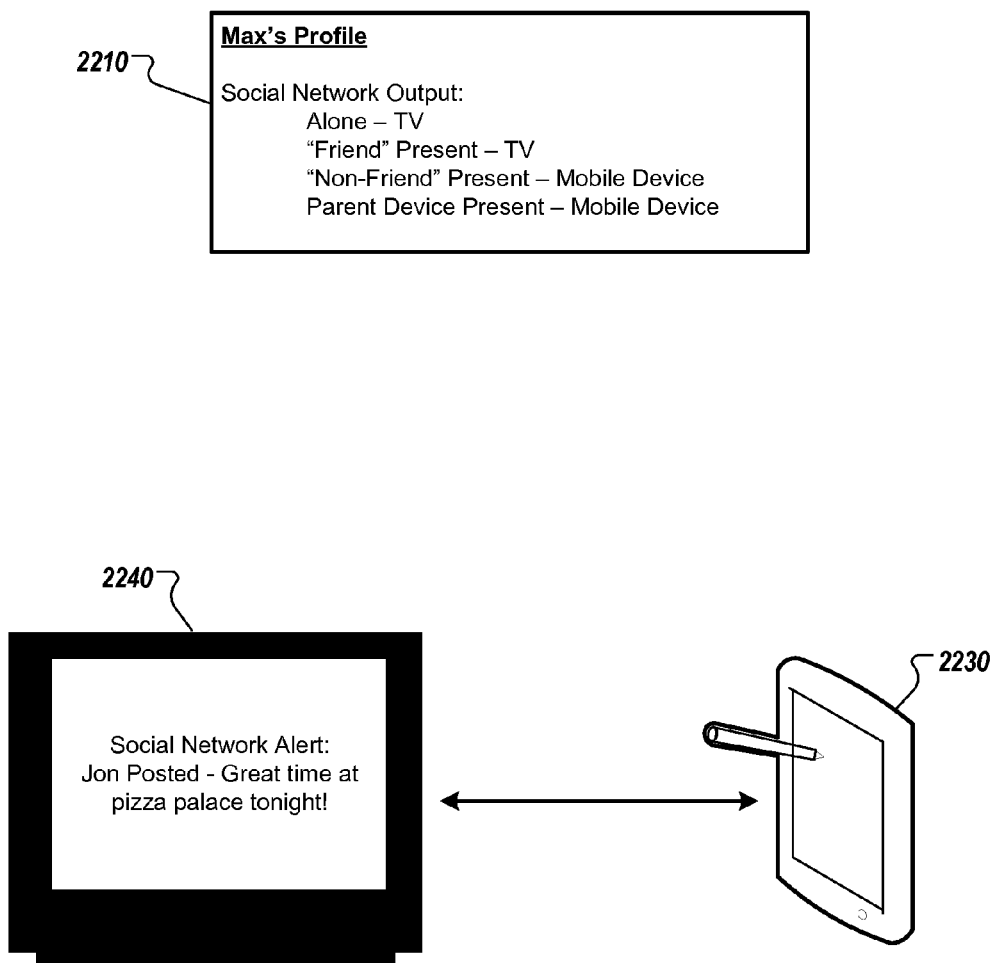
Figure 22B:
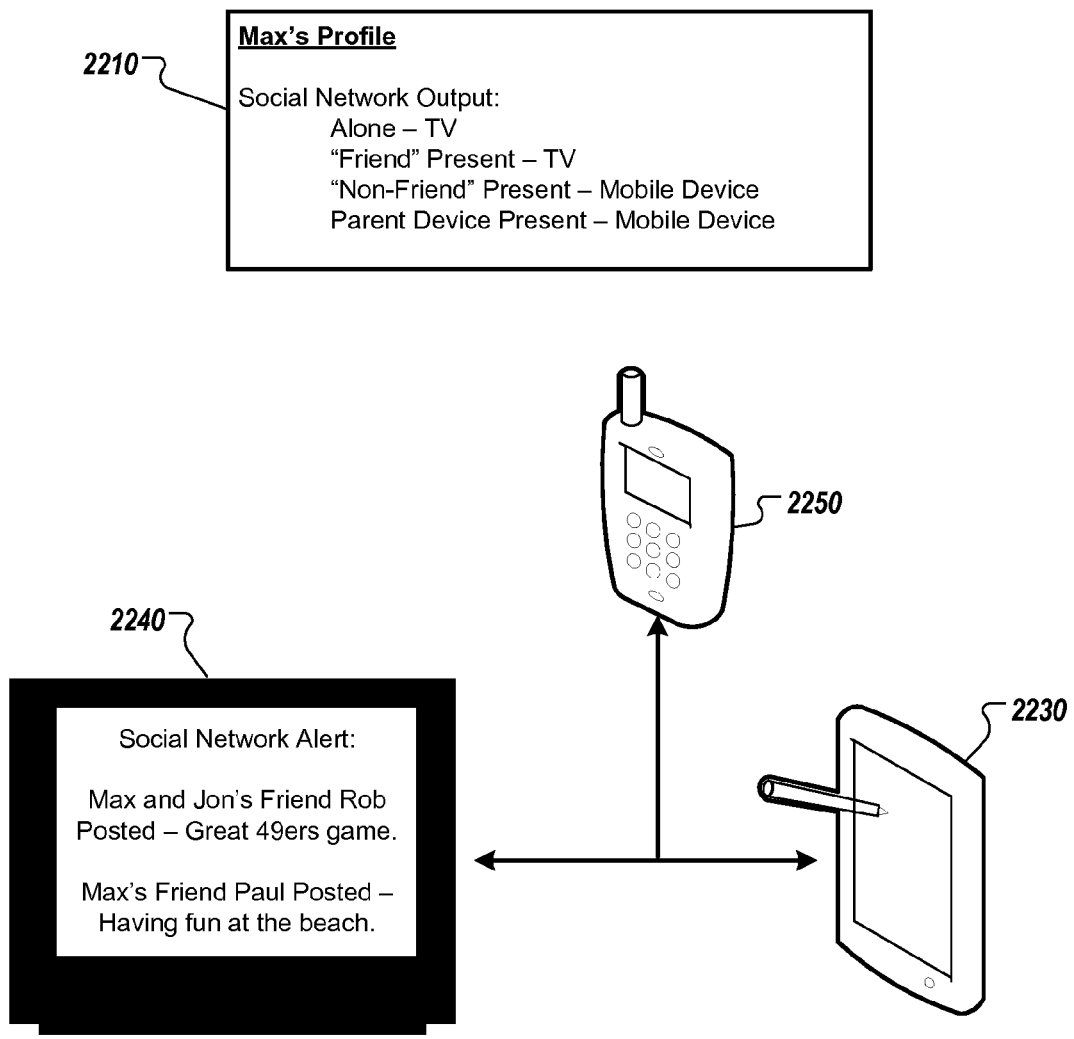
Figure 22C:
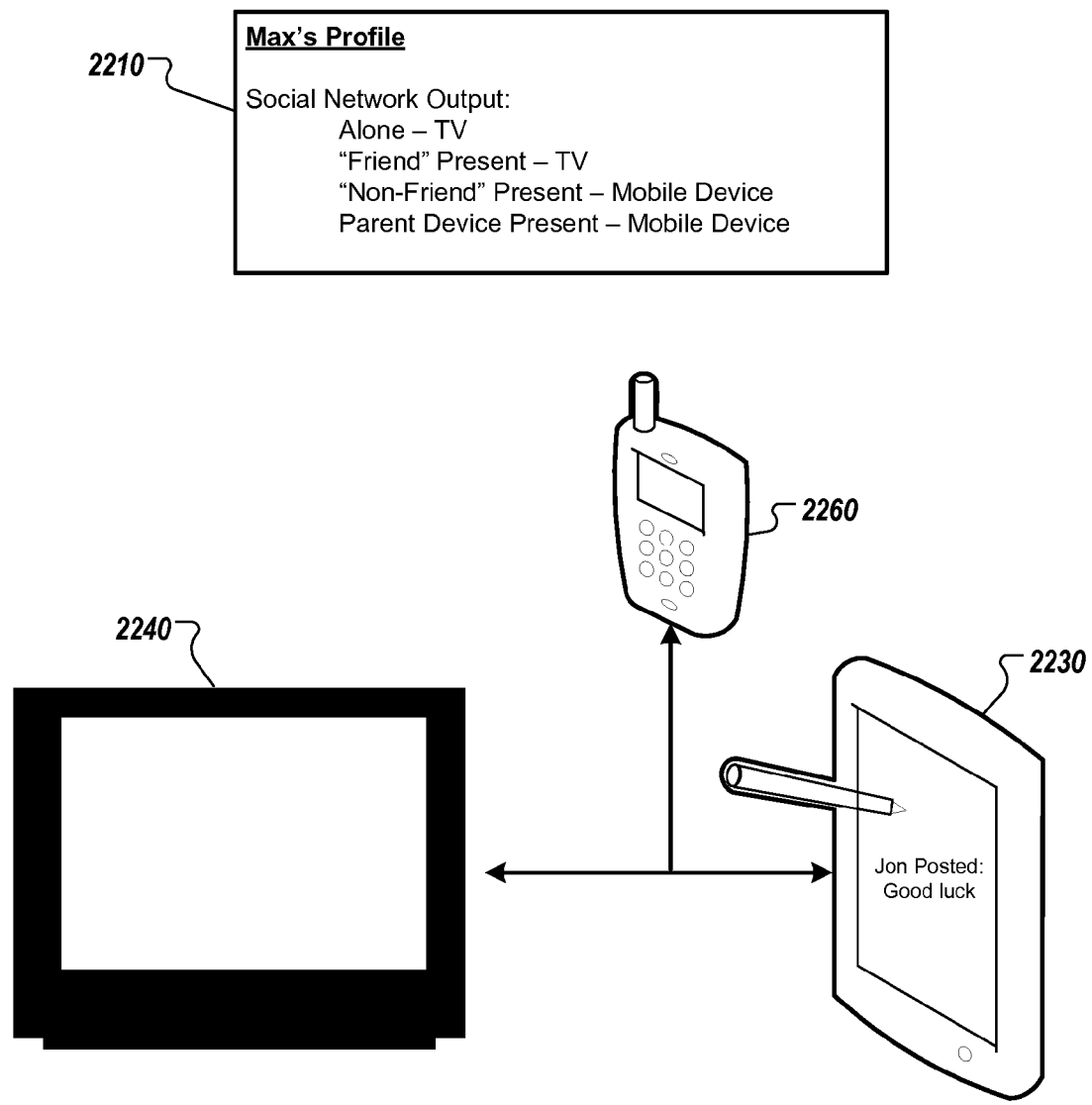

FIGS. 22A-22C illustrate examples of accounting for presence of electronic devices and/or social network profiles in handling social network activity within a peer-to-peer network. As shown in FIG. 22A, a user profile 2210 indicates preferences for a user Max on how to handle social network output based on presence of other electronic devices and/or social network profiles in the peer-to-peer network. The user profile 2210 indicates that social network output should be on a TV when Max's mobile device is alone on the peer-to-peer network (e.g., no other identified mobile devices or mobile devices that are running a social networking application with a different profile are present on the network). The user profile 2210 also indicates that social network output should be on a TV when Max's mobile device is joined on the peer-to-peer network by a mobile device that is running a social networking application with a different profile that is associated with a user that is a friend of Max's in his social network. The user profile 2210 further indicates that social network output should be on Max's mobile device when Max's mobile device is joined on the peer-to-peer network by a mobile device that is running a social networking application with a different profile that is associated with a user that is not a friend of Max's in his social network. In addition, the user profile 2210 indicates that social network output should be on Max's mobile device when Max's mobile device is joined on the peer-to-peer network by a particular mobile device (e.g., a mobile device of one of Max's parents).

In FIG. 22A, an initialization has been performed by a TV 2240 and a tablet 2230. In this regard, the TV 2240 and the tablet 2230 are connected to the network and the user profile 2210 resides on both the TV 2240 and the tablet 2230. The TV 2240 and the tablet 2230 perform a negotiation process in which the tablet 2230 indicates that the tablet 2230 is running a social networking application that is currently logged into Max's account. Based on the indication, the TV 2240 and the tablet 2230 agree to use the user profile 2210 to handle social network activity detected by the tablet 2230. In this regard, the TV 2240 and the tablet 2230 agree to display social network activity detected by the tablet 2230 on the TV 2240. As shown in FIG. 22A, the tablet 2230 detects an alert on Max's social network account. Based on detection of the alert and the negotiation, the tablet 2230 sends the social network activity related to the alert to the TV 2040 for display. The TV 2040 receives the social network activity related to the alert and, as shown, displays the social network activity related to the alert. In this regard, Max may be automatically alerted to social network activity while Max is watching a television program and not actively checking his mobile device, which may enhance the convenience of watching television by eliminating the need to check a mobile device for social network alerts or having to perform any type of setup to have the social network alerts displayed on the TV 2040.

In FIG. 22B, a smartphone 2250 has joined the network and is automatically discovered by the TV 2240 and the tablet 2230. The TV 2240, the tablet 2230, and the smartphone 2250 perform a negotiation process in which the smartphone 2250 indicates that the smartphone 2250 is running a social networking application that is currently logged into a user Jon's account. Based on the indication, the tablet 2230 checks whether Jon is a friend of Max's in Max's social network and provides an indication to the TV 2240 and the smartphone 2250 that indicates whether Jon is a friend of Max. If Jon is not a friend of Max, the TV 2240, the tablet 2230, and the smartphone 2250 agree to maintain output of social network activity detected by the tablet 2230 on the tablet 2230 and maintain output of social network activity detected by the smartphone 2250 on the smartphone 2250. However, as shown in FIG. 22B, Jon is a friend of Max and the TV 2240, the tablet 2230, and the smartphone 2250 agree to use the TV 2240 to output social network activity detected by the tablet 2230 and output social network activity detected by the smartphone 2250. As shown, the tablet 2230 detects two alerts on Max's social network account that are close in time and detects one alert on Jon's social network account that is close in time. Based on detection of the alerts and the negotiation, the tablet 2230 sends the social network activity related to its alerts to the TV 2040 for display and the smartphone 2250 sends the social network activity related to its alert to the TV 2040 for display. The TV 2040 receives the social network activity related to the alerts and determines that the alert detected by the smartphone 2250 is the same as one of the alerts detected by the tablet 2230. To reduce the amount of screen real estate occupied by the alert, the TV 2040 combines the information from the alert and presents the alert in a manner that indicates that the alert corresponds to both Max and Jon. For the alert that only corresponds to Max, the TV 2040 displays the alert in a manner that indicates that the alert corresponds to only Max.

In FIG. 22C, a smartphone 2260 has joined the network and is automatically discovered by the TV 2240 and the tablet 2230. The TV 2240, the tablet 2230, and the smartphone 2260 perform a negotiation process in which the smartphone 2260 provides device identification information. Based on the device identification information, the tablet 2230 and the TV 2040 determine that the device identification information is for the particular mobile device labeled as the parent device in the user profile 2210. Based on the determination that the device identification information is for the particular mobile device labeled as the parent device in the user profile 2210, the TV 2240, the tablet 2230, and the smartphone 2260 agree to maintain output of social network activity detected by the tablet 2230 on the tablet 2230. Accordingly, as shown in FIG. 22C, the tablet 2230 detects an alert on Max's social network account. Based on detection of the alert and the negotiation, the tablet 2230 outputs the social network activity related to the alert itself and withholds the social network activity related to the alert from the TV 2040. Using the techniques described with respect to FIGS. 22A-22C, a user may be able to experience the enhancement of having social network activity automatically communicated to the user in a manner that best utilizes the capabilities of devices connected to the peer-to-peer network while maintaining privacy when other devices are connected to the peer-to-peer network.

FIG. 23 is a schematic diagram of an example of a computer system 2300. The system 2300 can be used for the operations described in association with the processes 200, 600, 1000, 1200, 1400, 1700, 1900, and 2100 according to some implementations. For example, the system 2300 may be included partially or entirely in one or more of the electronic devices in the system 100.

The system 2300 includes a processor 2310, a memory 2320, a storage device 2330, and an input/output device 2340. Each of the components 2310, 2320, 2330, and 2340 are interconnected using a system bus 2350. The processor 2310 is capable of processing instructions for execution within the system 2300. In one implementation, the processor 2310 is a single-threaded processor. In another implementation, the processor 2310 is a multi-threaded processor. The processor 2310 is capable of processing instructions stored in the memory 2320 or on the storage device 2330 to display graphical information for a user interface on the input/output device 2340.

The memory 2320 stores information within the system 2300. In one implementation, the memory 2320 is a computer-readable medium. In one implementation, the memory 2320 is a volatile memory unit. In another implementation, the memory 2320 is a non-volatile memory unit.

The storage device 2330 is capable of providing mass storage for the system 2300. In one implementation, the storage device 2330 is a computer-readable medium. In various different implementations, the storage device 2330 may be a floppy disk device, a hard disk device, an optical disk device, or a tape device.

The input/output device 2340 provides input/output operations for the system 2300. In one implementation, the input/output device 2340 includes a keyboard and/or pointing device. In another implementation, the input/output device 2340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. An electronic device comprising:
at least one hardware processor configured to execute software or firmware that is embedded in the electronic device to execute one or more operations comprising:
establishing a wireless network connection to a peer-to-peer network;
defining a user profile for the peer-to-peer network based on user input that configures rules for collaboration among electronic devices connected to the peer-to-peer network, the user input being received through a second electronic device connected to the electronic device;
storing the user profile in a memory accessible by the electronic device to register, for the peer-to-peer network, the user profile as the user profile that configures rules for collaboration among electronic devices connected to the peer-to-peer network;
detecting a first event that results in performance of a particular type of action using one or more electronic devices connected to the peer-to-peer network;
based on the user profile, handling the first event at the electronic device by causing performance of the particular type of action at the electronic device;
discovering a new electronic device joining the peer-to-peer network, the new electronic device being different than and separate from the electronic device;
based on discovering the new electronic device joining the peer-to-peer network, wirelessly sending, to the new electronic device and over the peer-to-peer network, the user profile registered for the peer-to-peer network;
automatically, without receiving user input at the electronic device or the new electronic device, communicating with the new electronic device to determine how the electronic device and the new electronic device will collaboratively work together to satisfy the rules configured by the user profile registered for the peer-to-peer network;
detecting a second event that results in performance of the particular type of action using one or more electronic devices connected to the peer-to-peer network, the second event being different from and occurring after the first event; and
based on the communication with the new electronic device, collaborating with the new electronic device in a manner that results in the new electronic device handling at least a portion of the second event at the new electronic device by performing at least part of the particular type of action at the new electronic device.

2. The electronic device of claim 1, wherein collaborating with the new electronic device in a manner that results in the new electronic device handling at least the portion of the second event at the new electronic device by performing at least part of the particular type of action at the new electronic device comprises collaborating with the new electronic device in a manner that results in the new electronic device handling all of the second event at the new electronic device by performing the particular type of action at the new electronic device.

3. The electronic device of claim 1, wherein collaborating with the new electronic device in a manner that results in the new electronic device handling at least the portion of the second event at the new electronic device by performing at least part of the particular type of action at the new electronic device comprises:
collaborating with the new electronic device in a manner that results in the new electronic device handling a first portion of the second event at the new electronic device by performing a first part of the particular type of action at the new electronic device; and
handling a second portion of the second event at the electronic device by causing performance of a second part of the particular type of action at the electronic device.

4. The electronic device of claim 3:
wherein handling the first event at the electronic device by causing performance of the particular type of action at the electronic device comprises handling the first event at the electronic device by outputting media content associated with the particular type of action at the electronic device;
wherein collaborating with the new electronic device in a manner that results in the new electronic device handling the first portion of the second event at the new electronic device by performing the first part of the particular type of action at the new electronic device comprises collaborating with the new electronic device in a manner that results in the new electronic device handling the first portion of the second event at the new electronic device by outputting a first portion of the media content associated with the particular type of action at the new electronic device; and
wherein handling a second portion of the second event at the electronic device by causing performance of a second part of the particular type of action at the electronic device comprises handling the second portion of the second event at the electronic device by outputting a second portion of the media content associated with the particular type of action at the electronic device.

5. The electronic device of claim 1:
wherein detecting the first event that results in performance of the particular type of action using one or more devices connected to the peer-to-peer network comprises detecting a first user or network based event to output content using one or more devices connected to the peer-to-peer network; and
wherein detecting the second event that results in performance of the particular type of action using one or more devices connected to the peer-to-peer network comprises detecting a second user or network based event to output content using one or more devices connected to the peer-to-peer network.

6. The electronic device of claim 1:
wherein detecting the first event that results in performance of the particular type of action using one or more devices connected to the peer-to-peer network comprises detecting that a particular device has joined the peer-to-peer network; and
wherein detecting the second event that results in performance of the particular type of action using one or more devices connected to the peer-to-peer network comprises detecting that the particular device has rejoined the peer-to-peer network subsequent to being removed from the peer-to-peer network after the handling of the first event at the electronic device.

7. The electronic device of claim 1:
wherein detecting the first event that results in performance of the particular type of action using one or more devices connected to the peer-to-peer network comprises detecting a first instance of a timing event tracked by one or more devices connected to the peer-to-peer network; and
wherein detecting the second event that results in performance of the particular type of action using one or more devices connected to the peer-to-peer network comprises detecting a second instance of the timing event tracked by one or more devices connected to the peer-to-peer network, the second instance of the timing event occurring after the first instance of the timing event.

8. The electronic device of claim 1:
wherein detecting the first event that results in performance of the particular type of action using one or more devices connected to the peer-to-peer network comprises detecting receipt of a first communication of a particular type by one or more devices connected to the peer-to-peer network; and
wherein detecting the second event that results in performance of the particular type of action using one or more devices connected to the peer-to-peer network comprises detecting receipt of a second communication of the particular type by one or more devices connected to the peer-to-peer network, the second communication being different than the first communication and being received subsequent to receipt of the first communication.

9. The electronic device of claim 1, wherein the one or more operations executed by the at least one hardware processor further comprise:
receiving, from the new electronic device, an indication of a change to the user profile registered for the peer-to-peer network that was made based on user input provided to the new electronic device;
updating, at the electronic device, the user profile registered for the peer-to-peer network based on the indication of the change received from the new electronic device; and
automatically, without receiving user input at any of the electronic devices connected to the peer-to-peer network, communicating with the electronic devices connected to the peer-to-peer network to determine how the electronic devices connected to the peer-to-peer network will collaboratively work together to satisfy the rules configured by the updated user profile registered for the peer-to-peer network.

10. The electronic device of claim 9:
wherein updating, at the electronic device, the user profile registered for the peer-to-peer network based on the indication of the change received from the new electronic device comprises updating, at the electronic device, the user profile registered for the peer-to-peer network to change how the particular type of action is handled by the peer-to-peer network; and
wherein the one or more operations executed by the at least one hardware processor further comprise:
detecting a third event that results in performance of the particular type of action using one or more devices connected to the peer-to-peer network, the third event being different from and occurring after the first event and the second event; and
based on the communication with the electronic devices connected to the peer-to-peer network to determine how the electronic devices connected to the peer-to-peer network will collaboratively work together to satisfy the rules configured by the updated user profile registered for the peer-to-peer network, collaborating with the new electronic device and a third electronic device in a manner that results in the new electronic device and the third electronic device collaboratively handling the second event at the new electronic device and the third electronic device by performing a first part of the particular type of action at the new electronic device and performing a second part of the particular type of action at the third electronic device.

11. The electronic device of claim 9:
wherein updating, at the electronic device, the user profile registered for the peer-to-peer network based on the indication of the change received from the new electronic device comprises updating, at the electronic device, the user profile registered for the peer-to-peer network to change how the particular type of action is handled by the peer-to-peer network; and
wherein the one or more operations executed by the at least one hardware processor further comprise:
detecting a third event that results in performance of the particular type of action using one or more devices connected to the peer-to-peer network, the third event being different from and occurring after the first event and the second event; and
based on the communication with the electronic devices connected to the peer-to-peer network to determine how the electronic devices connected to the peer-to-peer network will collaboratively work together to satisfy the rules configured by the updated user profile registered for the peer-to-peer network, handling the third event at the electronic device by causing performance of the particular type of action at the electronic device.

12. The electronic device of claim 1:
wherein defining the user profile for the peer-to-peer network based on the user input that configures rules for collaboration among electronic devices connected to the peer-to-peer network comprises defining a user profile for the peer-to-peer network that includes rules for collaboration that are controlled by capabilities of electronic devices connected to the peer-to-peer network; and
wherein automatically communicating with the new electronic device to determine how the electronic device and the new electronic device will collaboratively work together to satisfy the rules configured by the user profile registered for the peer-to-peer network comprises:
exchanging, with the new electronic device, capabilities of the electronic device and the new electronic device;
evaluating the exchanged capabilities against the rules for collaboration that are controlled by capabilities of electronic devices connected to the peer-to-peer network; and
determining how the electronic device and the new electronic device will collaboratively work together based on the evaluation of the exchanged capabilities against the rules for collaboration that are controlled by capabilities of electronic devices connected to the peer-to-peer network.

13. The electronic device of claim 1, wherein automatically communicating with the new electronic device to determine how the electronic device and the new electronic device will collaboratively work together to satisfy the rules configured by the user profile registered for the peer-to-peer network comprises:
   detecting a conflict between the new electronic device and the electronic device each requesting handling of the particular type of action; and
   resolving the detected conflict by:
      receiving, from electronic devices connected to the peer-to-peer network other than the electronic device and the new electronic device, selections for how to resolve the detected conflict between the electronic device and the new electronic device; and
      resolving the detected conflict based on the selections received from electronic devices connected to the peer-to-peer network other than the electronic device and the new electronic device.

14. The electronic device of claim 1, wherein automatically communicating with the new electronic device to determine how the electronic device and the new electronic device will collaboratively work together to satisfy the rules configured by the user profile registered for the peer-to-peer network comprises:
   detecting a conflict between the new electronic device and the electronic device each requesting handling of the particular type of action; and
   resolving the detected conflict by:
      accessing a first priority associated with the electronic device and a second priority associated with the new electronic device;
      comparing the first priority with the second priority; and
      resolving the detected conflict based on the comparison of the first priority with the second priority.

15. The electronic device of claim 1, wherein the one or more operations executed by the at least one hardware processor further comprise:
   detecting multiple user profiles on electronic devices connected to the peer-to-peer network;
   analyzing rules configured by the multiple user profiles for conflicts in how electronic devices connected to the peer-to-peer network should collaboratively work together to satisfy the rules configured by the multiple user profiles;
   based on the analysis, identifying a conflict in how electronic devices connected to the peer-to-peer network should collaboratively work together to satisfy the rules configured by the multiple user profiles;
   communicating with electronic devices connected to the peer-to-peer network to determine how to handle the identified conflict; and
   handling a task performed by one or more electronic devices in the peer-to-peer network based on the communication on how to handle the identified conflict.

16. The electronic device of claim 1, wherein the one or more operations executed by the at least one hardware processor further comprise:
   discovering a third electronic device joining the peer-to-peer network, the third electronic device being different from the electronic device and the new electronic device and the third electronic device having a different user profile associated with a network other than the peer-to-peer network;
   querying whether the third electronic device would like to accept the user profile registered for the peer-to-peer network or negotiate a temporary guest profile;
   based on a request to negotiate a temporary guest profile, accessing information from the different user profile of the third electronic device;
   analyzing the accessed information from the different user profile of the third electronic device and the user profile registered for the peer-to-peer network with respect to guest profile rules configured by the user profile registered for the peer-to-peer network;
   based on the analysis of the accessed information from the different user profile and the registered user profile with respect to the guest profile rules, defining a temporary guest profile for the peer-to-peer network;
   registering, for the peer-to-peer network, the temporary guest profile;
   detecting the third electronic device leaving the peer-to-peer network; and
   based on the detection of the third electronic device leaving the peer-to-peer network, removing the temporary guest profile and reverting to the previously-registered user profile for the peer-to-peer network.

17. The electronic device of claim 1, wherein the one or more operations executed by the at least one hardware processor further comprise:
   monitoring, over time, use of electronic devices connected to the peer-to-peer network;
   analyzing preferences of one or more users of the peer-to-peer network, a current date and time, capabilities of electronic devices in the peer-to-peer network, and the monitored use of the electronic devices connected to the peer-to-peer network;
   based on the analysis of the preferences of one or more users of the peer-to-peer network, the current date and time, the capabilities of electronic devices in the peer-to-peer network, and the monitored use of the electronic devices connected to the peer-to-peer network, determining a user-specific experience for a user of the peer-to-peer network; and
   performing an action based on the determined user-specific experience for the user of the peer-to-peer network.

18. The electronic device of claim 1, wherein the one or more operations executed by the at least one hardware processor further comprise:
   determining a location of a user within a property in which the peer-to-peer network is located;
   determining how to handle a task based on the user profile registered for the peer-to-peer network and the determined location of the user within the property; and
   handle the task based on the determination of how to handle the task.

19. A method comprising:
   establishing a wireless network connection from an electronic device to a peer-to-peer network;
   defining, by at least one hardware processor of the electronic device, a user profile for the peer-to-peer network based on user input that configures rules for collaboration among electronic devices connected to the peer-to-peer network, the user input being received through a second electronic device connected to the electronic device;

storing the user profile in a memory accessible by the electronic device to register, for the peer-to-peer network, the user profile as the user profile that configures rules for collaboration among electronic devices connected to the peer-to-peer network exists for the peer-to-peer network;

detecting, by the at least one hardware processor of the electronic device, a first event that results in performance of a particular type of action using one or more devices connected to the peer-to-peer network;

based on the user profile, handling the first event at the electronic device by causing performance of the particular type of action at the electronic device;

discovering a new electronic device joining the peer-to-peer network, the new electronic device being different than and separate from the electronic device;

based on discovering the new electronic device joining the peer-to-peer network, wirelessly sending, to the new electronic device and over the peer-to-peer network, the user profile registered for the peer-to-peer network;

automatically, by the at least one hardware processor and without receiving user input at the electronic device or the new electronic device, communicating with the new electronic device to determine how the electronic device and the new electronic device will collaboratively work together to satisfy the rules configured by the user profile registered for the peer-to-peer network;

detecting a second event that results in performance of the particular type of action using one or more devices connected to the peer-to-peer network, the second event being different from and occurring after the first event; and based on the communication with the new electronic device, collaborating with the new electronic device in a manner that results in the new electronic device handling at least a portion of the second event at the new electronic device by performing at least part of the particular type of action at the new electronic device.

20. At least one non-transitory computer-readable storage medium encoded with at least one computer program comprising instructions that, when executed, operate to cause a computer to perform operations comprising:

establishing a wireless network connection from an electronic device to a peer-to-peer network;

determining whether a user profile that configures rules for collaboration among electronic devices connected to the peer-to-peer network exists for the peer-to-peer network;

based on a determination that a user profile does not exist for the peer-to-peer network, prompting, using a display device of the electronic device, for user input that defines a user profile that configures rules for collaboration among electronic devices connected to the peer-to-peer network;

based on the prompting, receiving user input that configures rules for collaboration among electronic devices connected to the peer-to-peer network;

defining a user profile for the peer-to-peer network based on the user input that configures rules for collaboration among electronic devices connected to the peer-to-peer network;

storing the user profile in a memory accessible by the electronic device to register, for the peer-to-peer network, the user profile as the user profile that configures rules for collaboration among electronic devices connected to the peer-to-peer network exists for the peer-to-peer network;

detecting a first event that results in performance of a particular type of action using one or more devices connected to the peer-to-peer network;

based on the user profile, handling the first event at the electronic device by causing performance of the particular type of action at the electronic device;

discovering a new electronic device joining the peer-to-peer network, the new electronic device being different than and separate from the electronic device;

based on discovering the new electronic device joining the peer-to-peer network, wirelessly sending, to the new electronic device and over the peer-to-peer network, the user profile registered for the peer-to-peer network;

automatically, without receiving user input at the electronic device or the new electronic device, communicating with the new electronic device to determine how the electronic device and the new electronic device will collaboratively work together to satisfy the rules configured by the user profile registered for the peer-to-peer network;

detecting a second event that results in performance of the particular type of action using one or more devices connected to the peer-to-peer network, the second event being different from and occurring after the first event; and based on the communication with the new electronic device, collaborating with the new electronic device in a manner that results in the new electronic device handling at least a portion of the second event at the new electronic device by performing at least part of the particular type of action at the new electronic device.

* * * * *